(12) United States Patent
Lee

(10) Patent No.: US 11,053,061 B2
(45) Date of Patent: Jul. 6, 2021

(54) APPARATUS FOR RECEIVING HETEROGENEOUS MATERIALS

(75) Inventor: Seong-Jae Lee, Seoul (KR)

(73) Assignees: Su-Jae Lee, Seoul (KR); Woong Ki Kim, Daegu (KR)

( * ) Notice: Subject to any disclaimer, the term of this patent is extended or adjusted under 35 U.S.C. 154(b) by 63 days.

(21) Appl. No.: 14/124,079

(22) PCT Filed: Nov. 30, 2011

(86) PCT No.: PCT/KR2011/009238
§ 371 (c)(1),
(2), (4) Date: Dec. 5, 2013

(87) PCT Pub. No.: WO2012/074301
PCT Pub. Date: Jun. 7, 2012

(65) Prior Publication Data
US 2014/0110282 A1    Apr. 24, 2014

(30) Foreign Application Priority Data
Nov. 30, 2010    (KR) .................. 10-2010-0120102

(51) Int. Cl.
*B65D 25/08*    (2006.01)
*B65D 81/32*    (2006.01)
(Continued)

(52) U.S. Cl.
CPC ......... *B65D 81/3216* (2013.01); *B65D 25/08* (2013.01); *B65D 51/222* (2013.01);
(Continued)

(58) Field of Classification Search
CPC ........... B65D 81/3216; B65D 81/3222; B65D 81/32; B65D 81/3227; B65D 81/3238;
(Continued)

(56) References Cited

U.S. PATENT DOCUMENTS 3,156,369 A * 11/1964 Bowes ................. B65D 51/285
                                                 206/222
3,220,588 A * 11/1965 Lipari ................... A61J 1/2093
                                                 206/222
(Continued)

FOREIGN PATENT DOCUMENTS

JP    2003-118766    4/2003
JP    2005-138901    6/2005
(Continued)

OTHER PUBLICATIONS

Search Report from PCT/KR2011/009238 along with its translation, dated Jul. 23, 2012.
(Continued)

*Primary Examiner* — Steven A. Reynolds
(74) *Attorney, Agent, or Firm* — IPLA P.A.

(57) ABSTRACT

The prevent invention relates to an apparatus for receiving heterogeneous materials which is coupled to a hole part of a container in which a content such as liquid or the like is contained. The apparatus for receiving the heterogeneous materials includes a main body coupled and fixed to a hole part of a container and a receiving part having a storage space within the main body. In the inner storage space of the receiving part, a foldable connection part is disposed in an upper portion of the storage space and an opening part formed below the foldable connection part breaks a receiving part sealing part sealing a lower end of the receiving part to allow a content within the storage space of the receiving part to drop down into the container, thereby mixing the heterogeneous materials. Here, a foldable soft resin may be added to the foldable connection part.

19 Claims, 100 Drawing Sheets

(51) Int. Cl.
  *B65D 51/28* (2006.01)
  *B65D 51/22* (2006.01)
  *B29C 45/16* (2006.01)

(52) U.S. Cl.
  CPC ......... *B65D 51/28* (2013.01); *B65D 51/2814* (2013.01); *B65D 81/3283* (2013.01); *B29C 45/1676* (2013.01)

(58) Field of Classification Search
  CPC .. B65D 81/325; B65D 81/3255; B65D 25/08; B65D 51/28; B65D 51/2807; B65D 51/2814
  USPC ..................... 206/219, 222, 221; 215/DIG. 8
  See application file for complete search history.

(56) References Cited

U.S. PATENT DOCUMENTS

| | | | | |
|---|---|---|---|---|
| 3,347,410 | A * | 10/1967 | Schwartzman | A45D 19/02 206/222 |
| 3,521,745 | A * | 7/1970 | Schwartzman | B65D 81/3211 206/222 |
| 3,743,520 | A * | 7/1973 | Croner | B65D 81/3216 206/219 |
| 3,768,697 | A * | 10/1973 | Lerner | B67B 7/26 222/80 |
| 4,467,931 | A * | 8/1984 | Gach | B65D 50/045 215/237 |
| 5,950,819 | A * | 9/1999 | Sellars | B65D 51/2885 206/221 |
| 6,003,728 | A * | 12/1999 | Elliott | B65D 47/0804 206/219 |
| 6,305,576 | B1 * | 10/2001 | Leoncavallo | B65D 51/2814 206/222 |
| 9,132,950 | B1 * | 9/2015 | Anderson | B65D 81/32 |
| 2005/0161348 | A1 * | 7/2005 | Morini | B65D 41/3438 206/219 |
| 2009/0261000 | A1 * | 10/2009 | Epp | B65D 51/2821 206/222 |
| 2010/0044377 | A1 * | 2/2010 | Porter | B65D 51/2871 220/212 |

FOREIGN PATENT DOCUMENTS

| | | |
|---|---|---|
| JP | 2007-261685 | 10/2007 |
| KR | 10-2000-0059152 | 10/2000 |
| KR | 10-2005-0008612 | 1/2005 |
| KR | 10-2007-0065169 | 6/2007 |
| KR | 10-2007-0094691 | 9/2007 |
| KR | 10-2007-0110757 | 11/2007 |
| KR | 10-2010-0104423 | 9/2010 |
| KR | 10-2010-0122825 | 11/2010 |

OTHER PUBLICATIONS

Written from PCT/KR2011/009238 along with its translation, dated Jul. 23, 2012.

* cited by examiner

[Fig. 1]
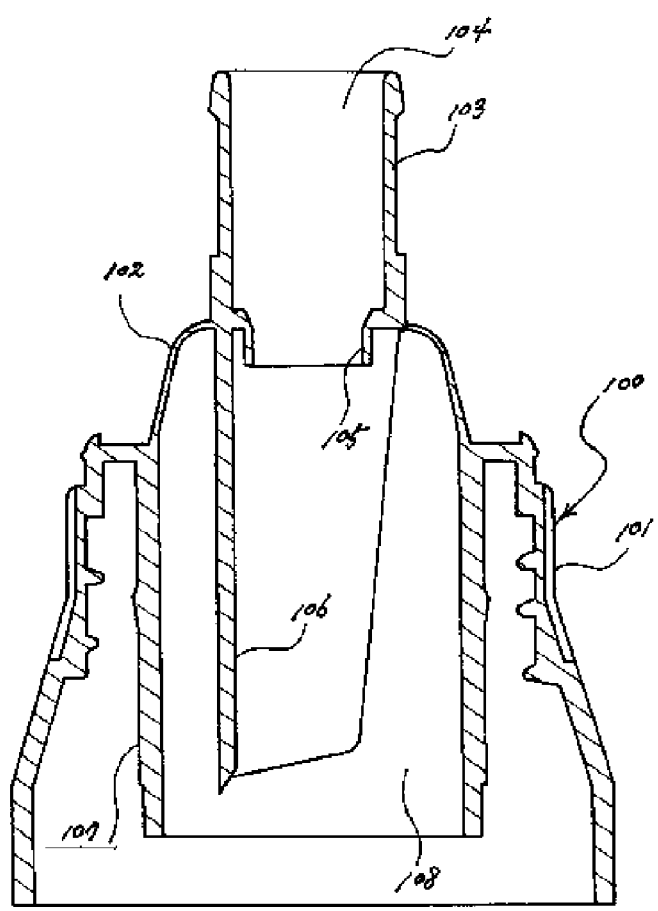

[Fig. 2]
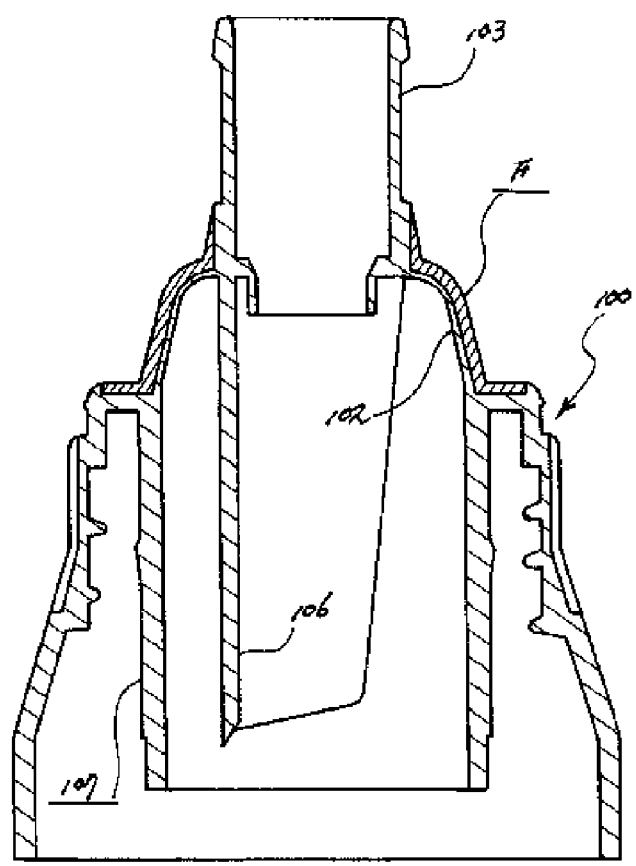

[Fig. 3]
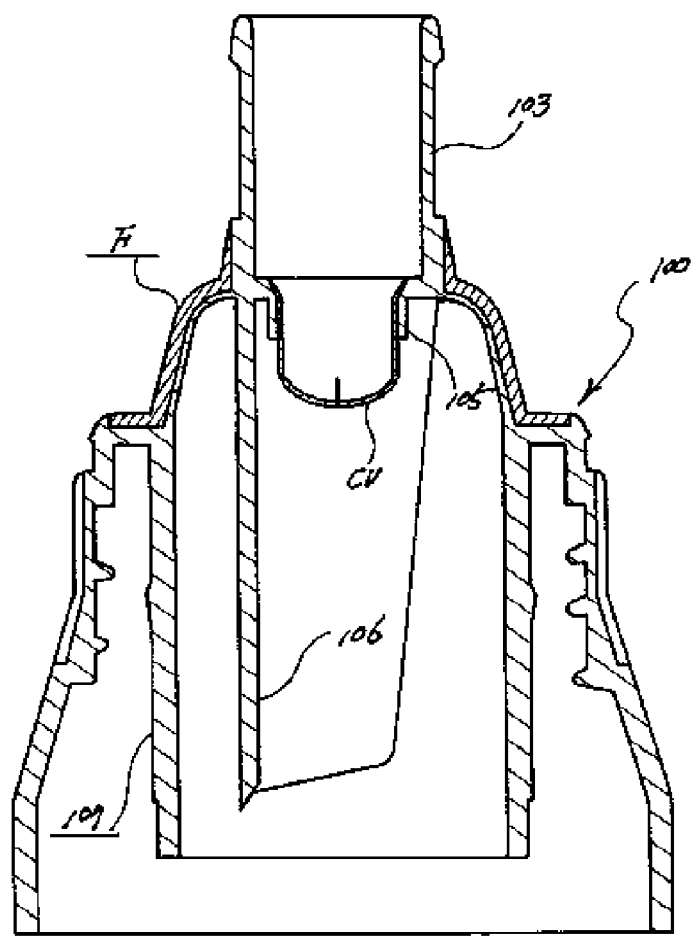

[Fig. 4]
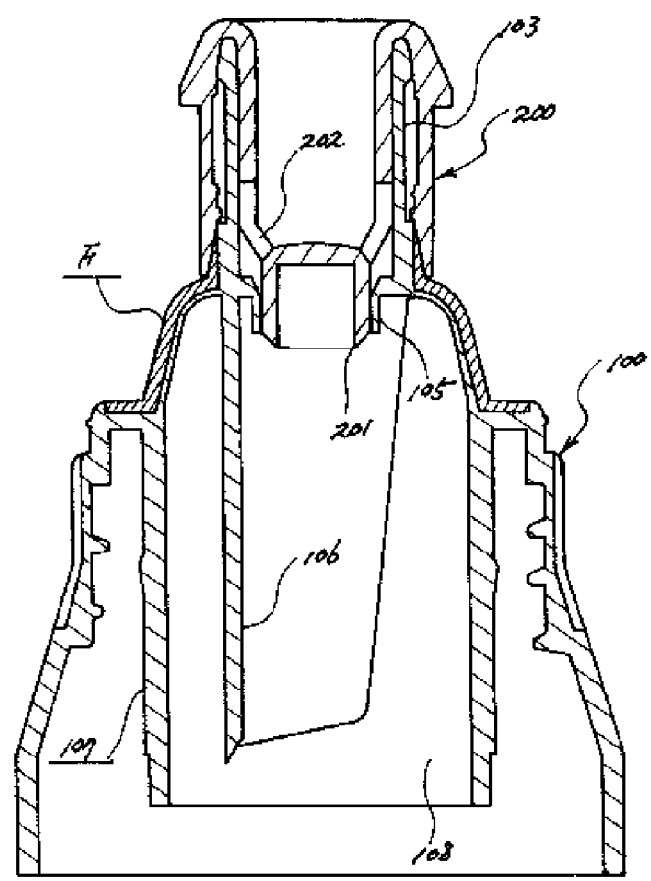

[Fig. 5]
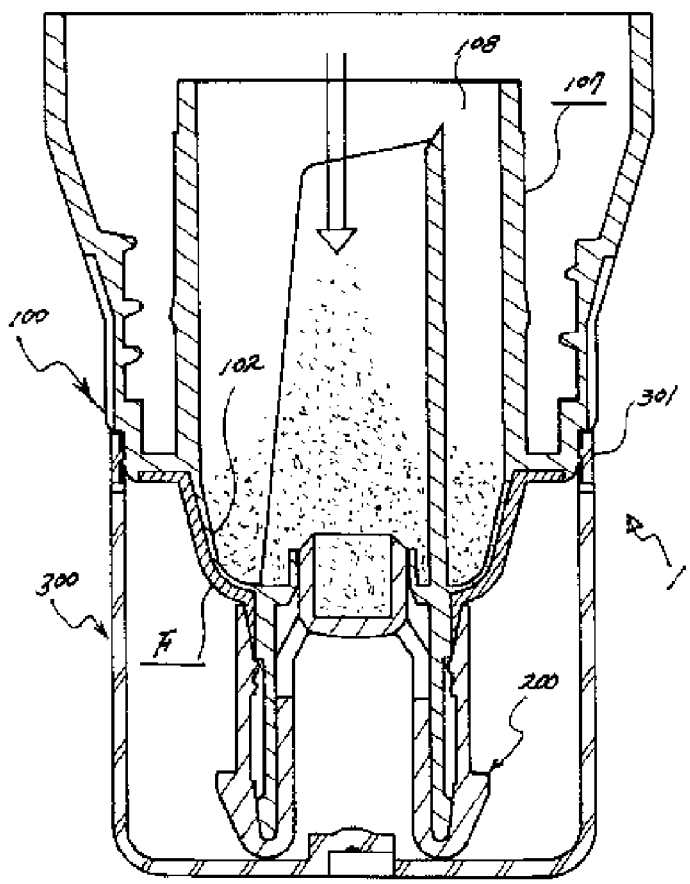

[Fig. 6]
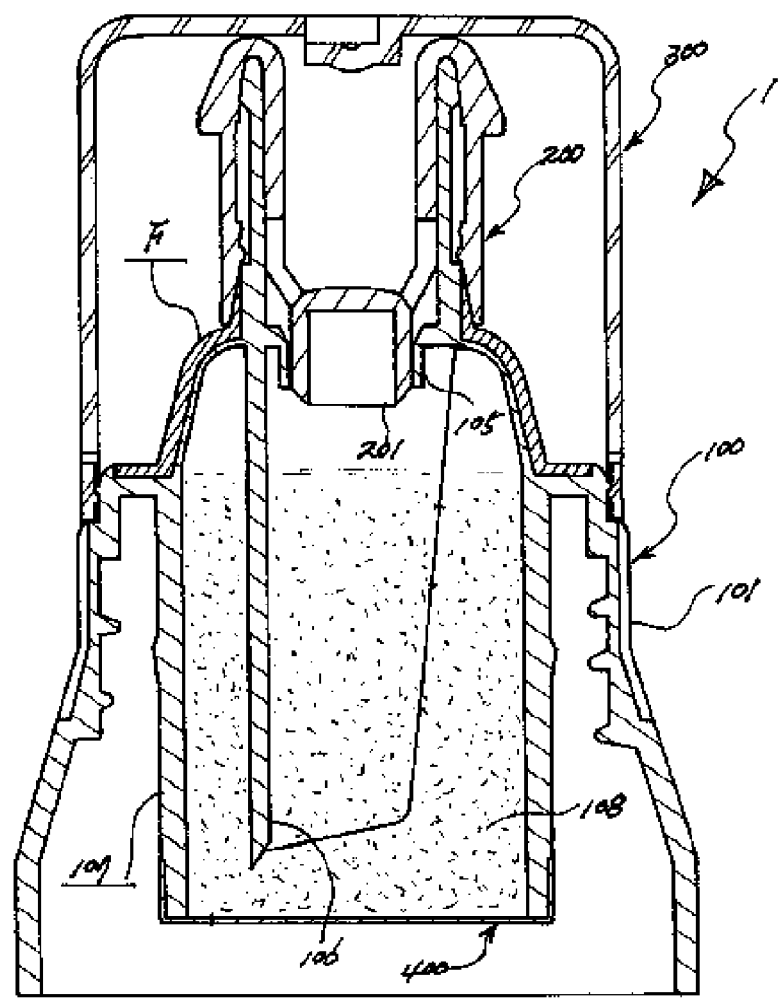

[Fig. 7]
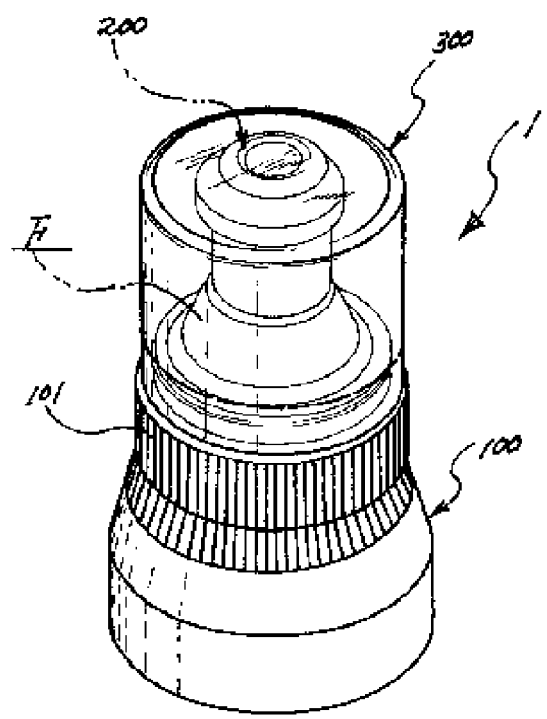

[Fig. 8]
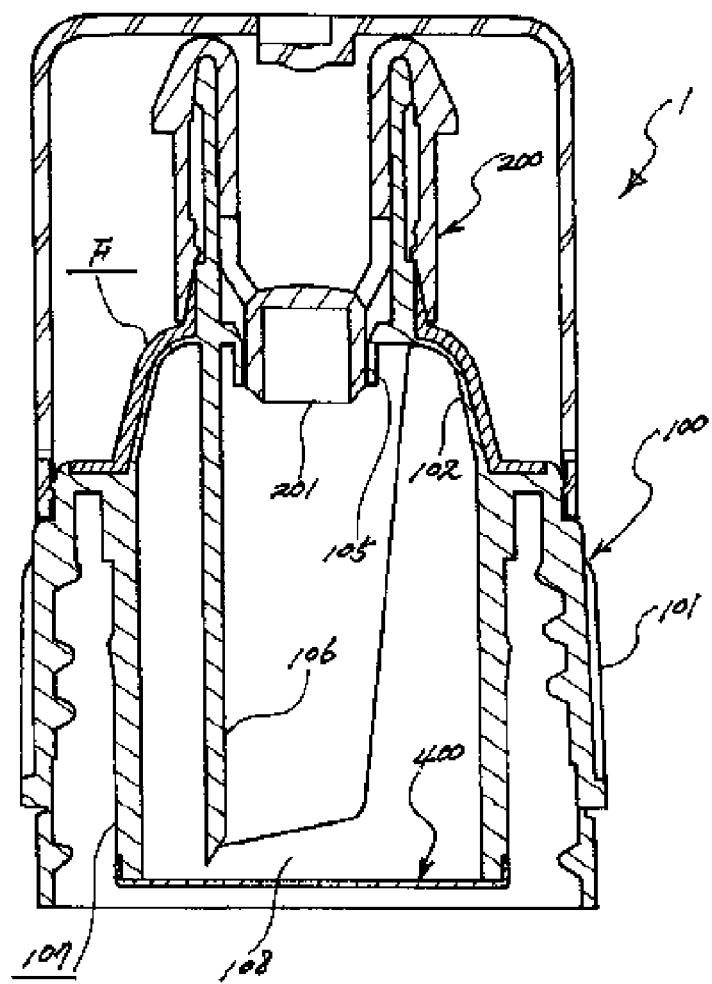

[Fig. 9]
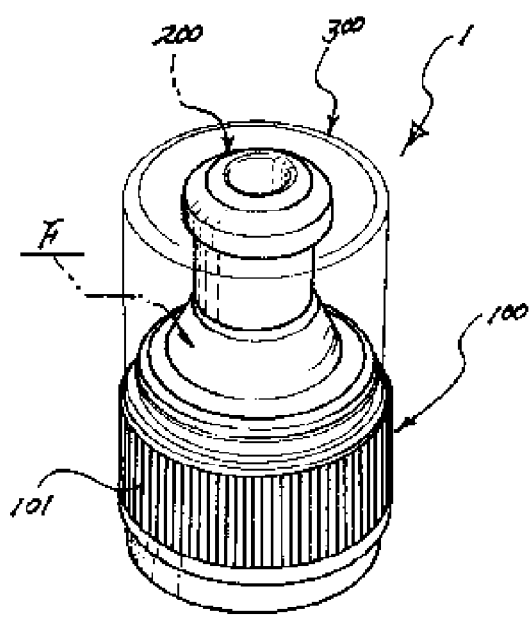
[Fig. 10]
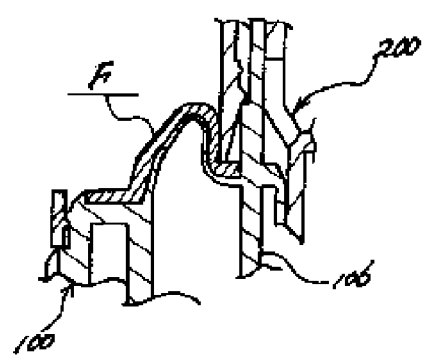

[Fig. 11]
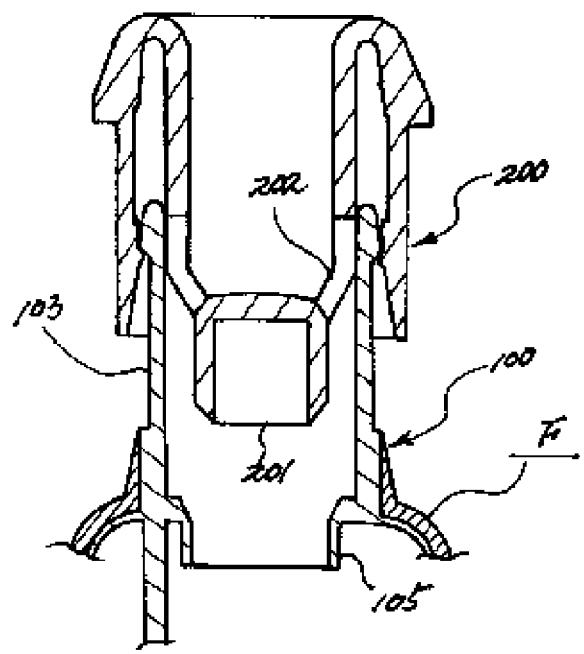

[Fig. 12]
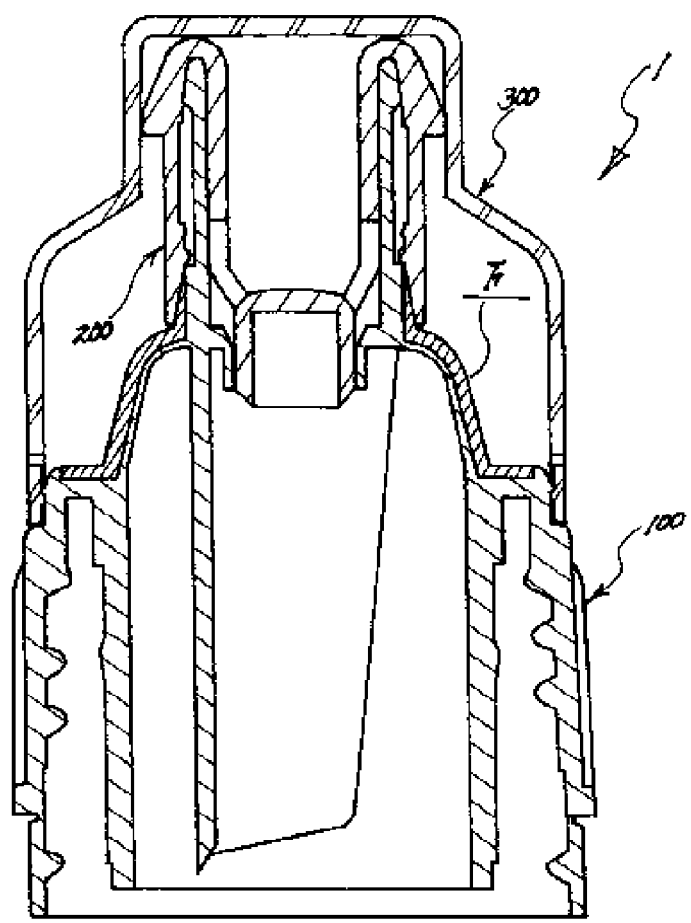

[Fig. 13]
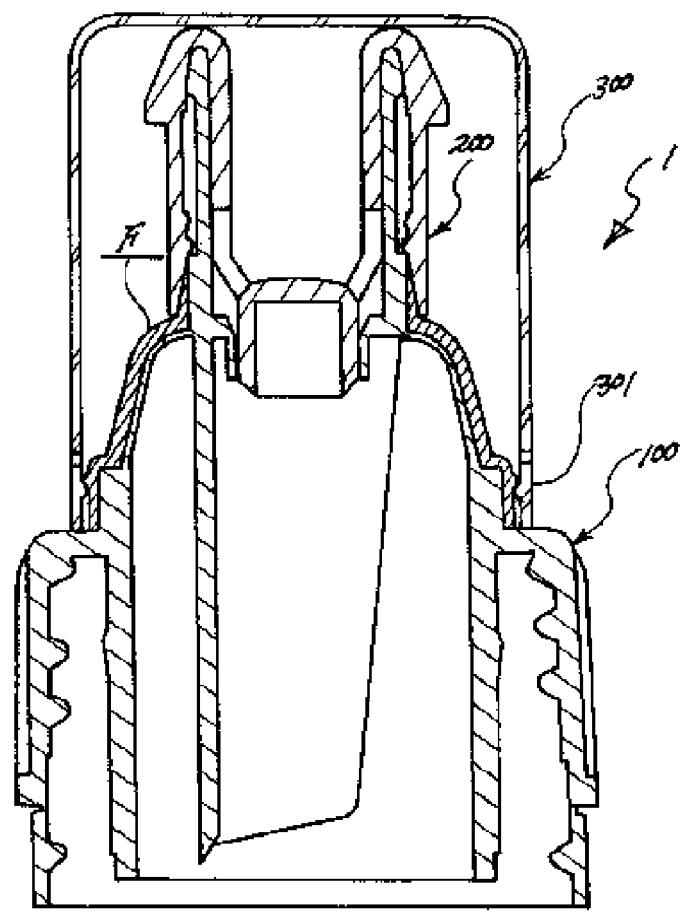

[Fig. 14]
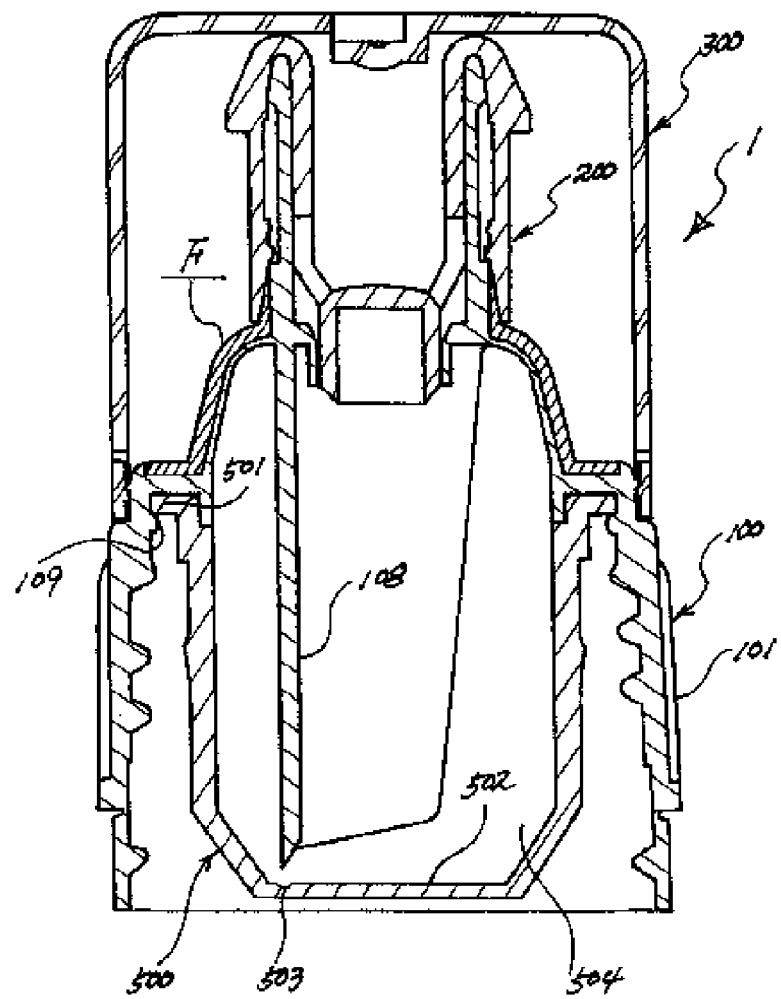

[Fig. 15]
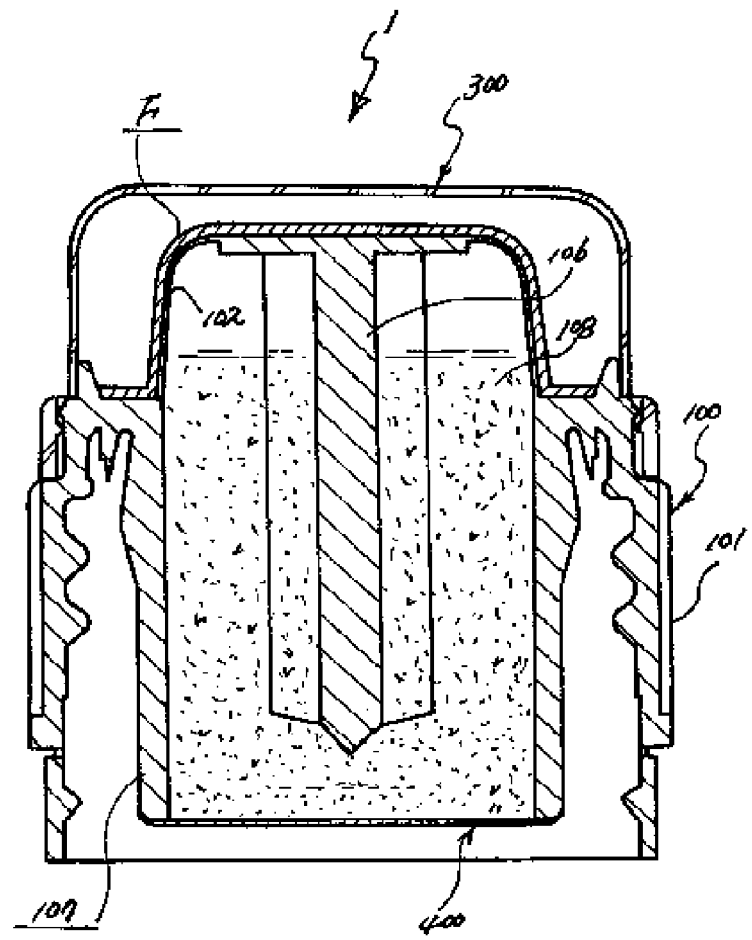
[Fig. 16]
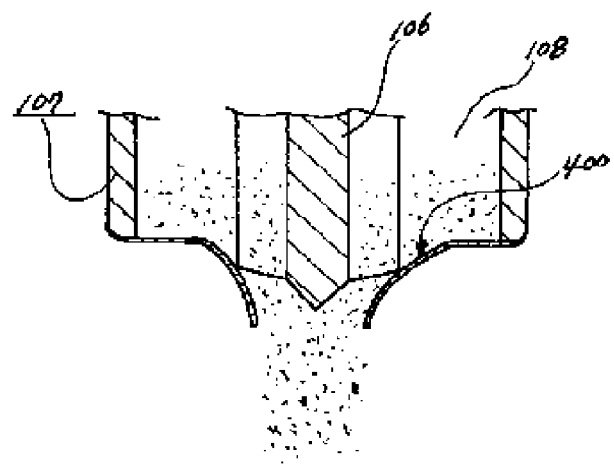

[Fig. 17]
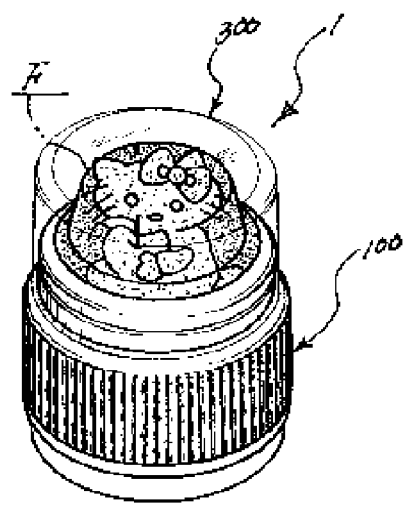
[Fig. 18]
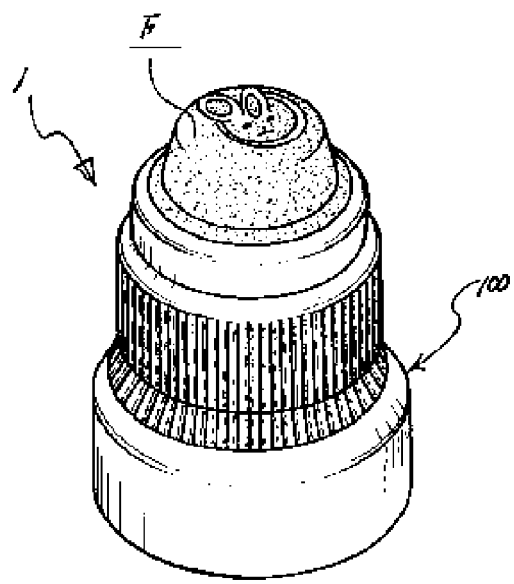

[Fig. 19]
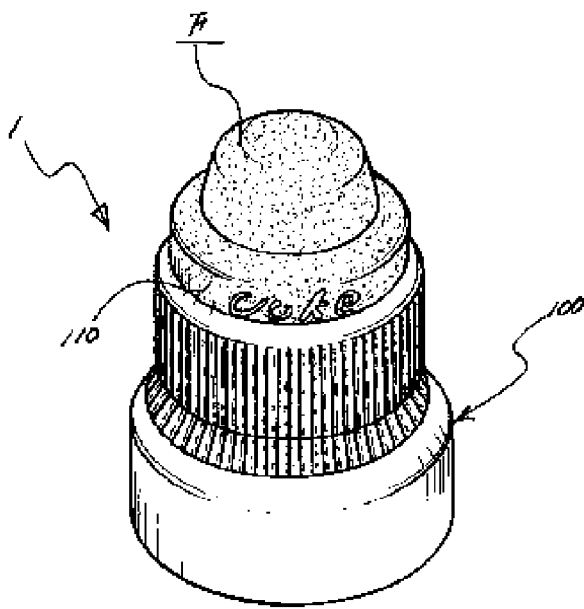
[Fig. 20]
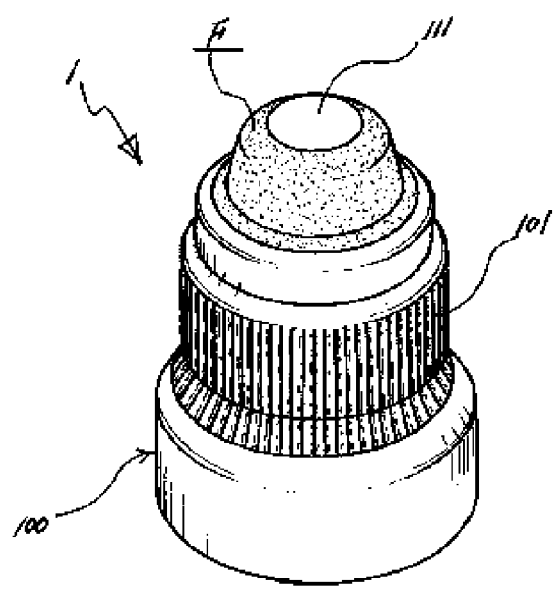

[Fig. 21]
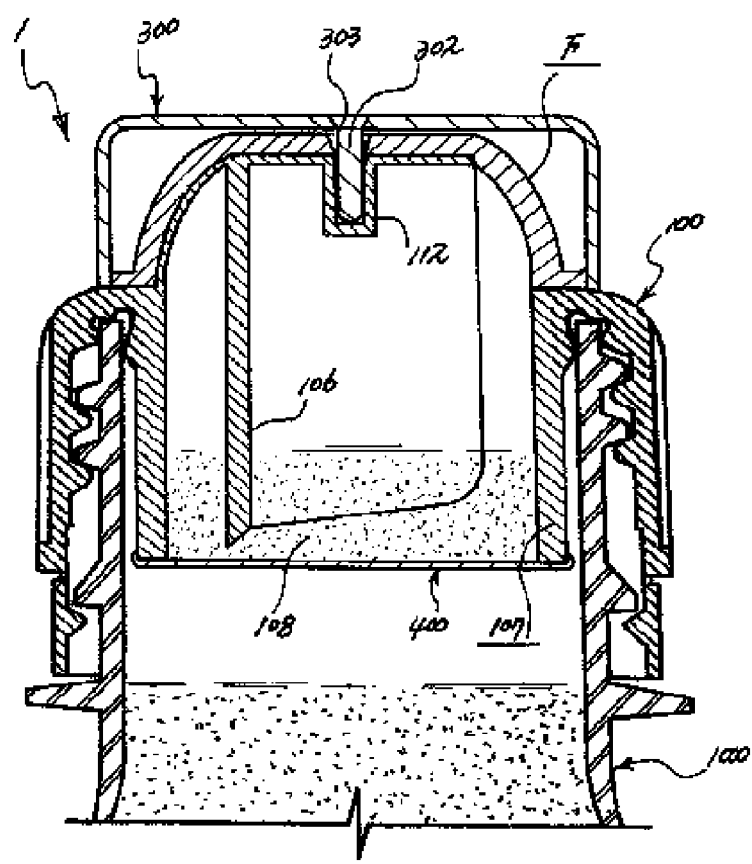

[Fig. 22]
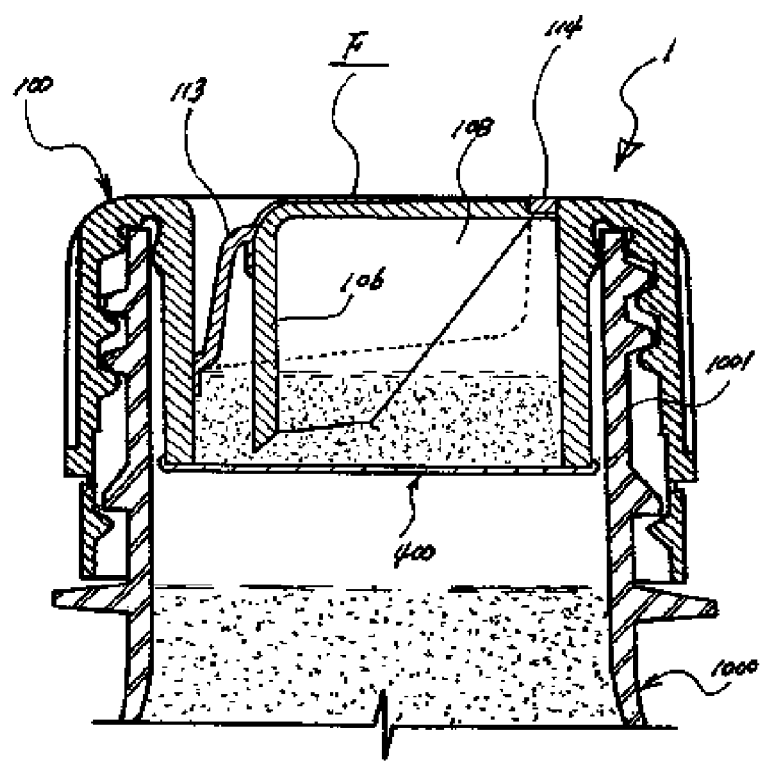

[Fig. 23]
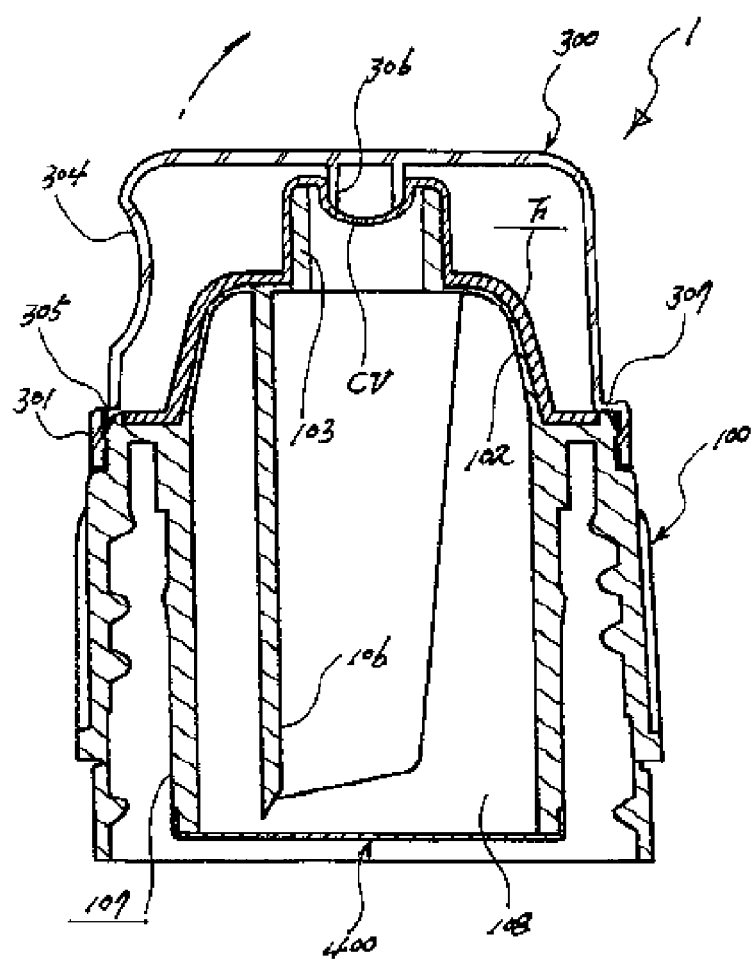

[Fig. 24]
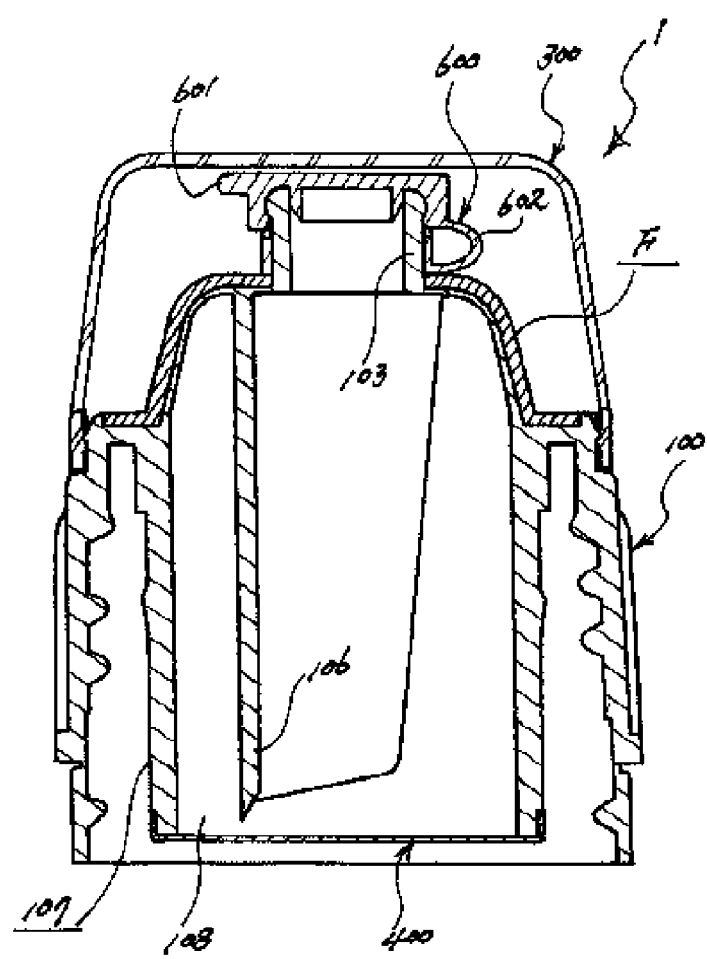

[Fig. 25]
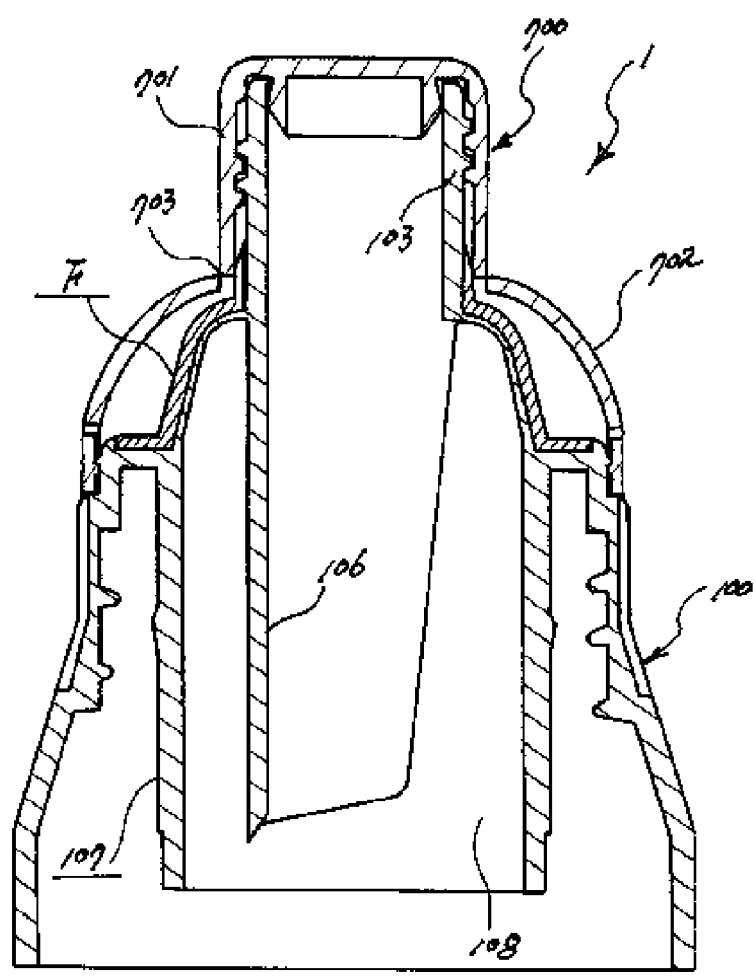

[Fig. 26]
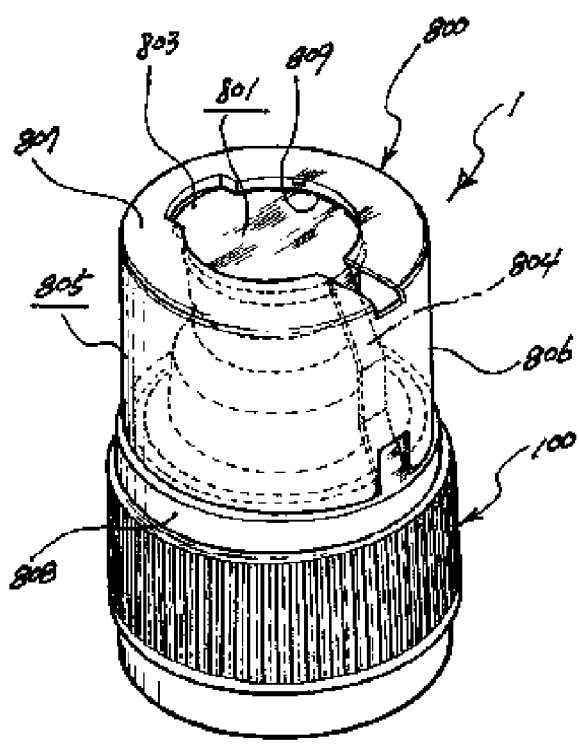
[Fig. 27]
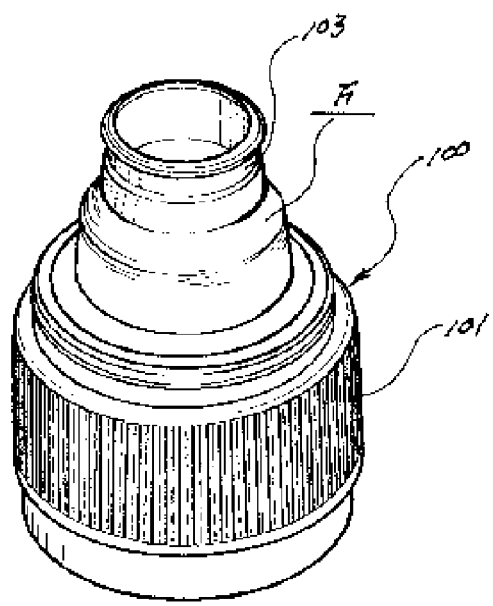

[Fig. 28]
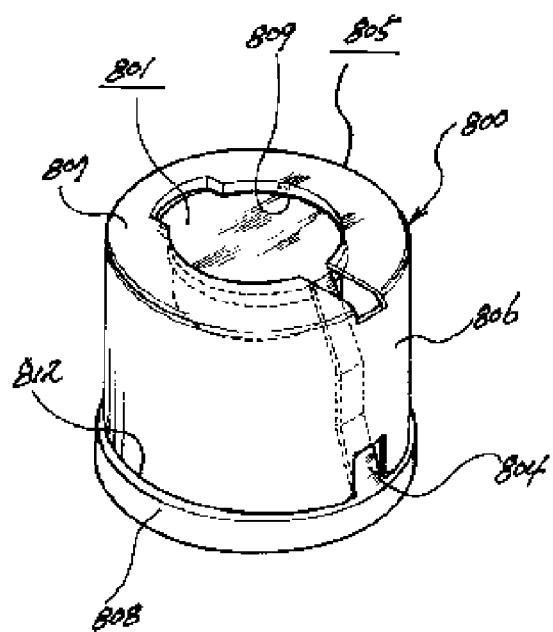
[Fig. 29]
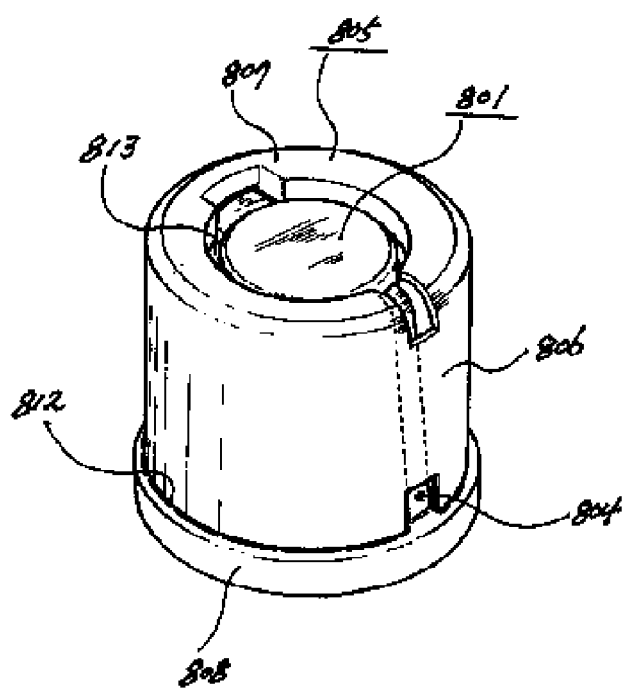

[Fig. 30]
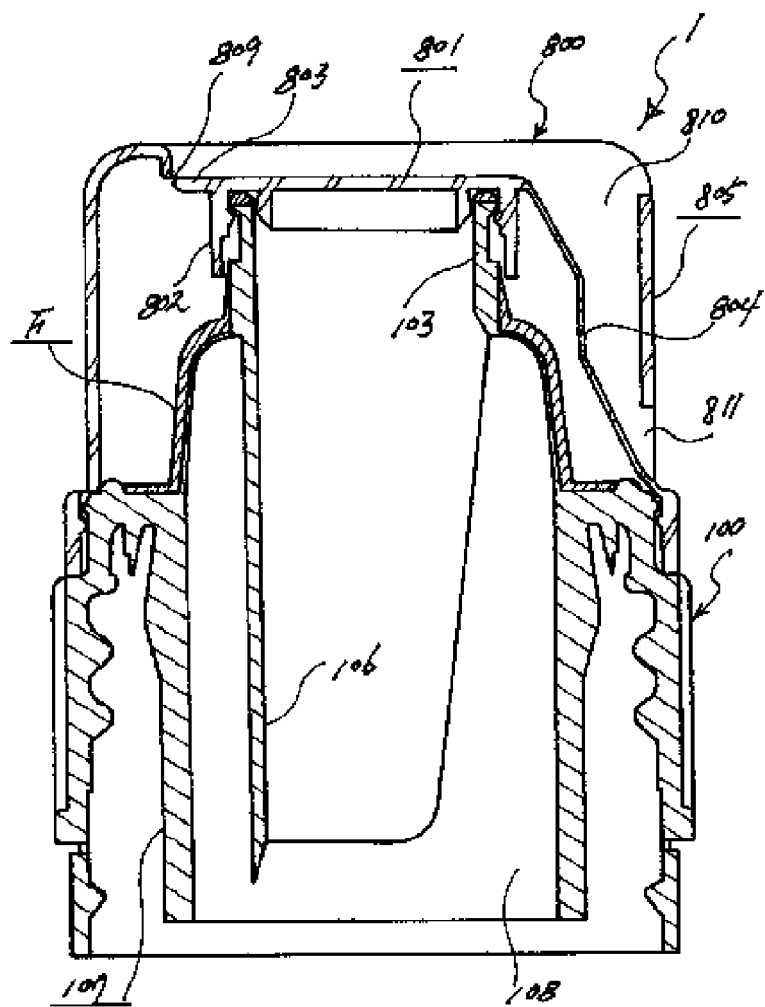

[Fig. 31]
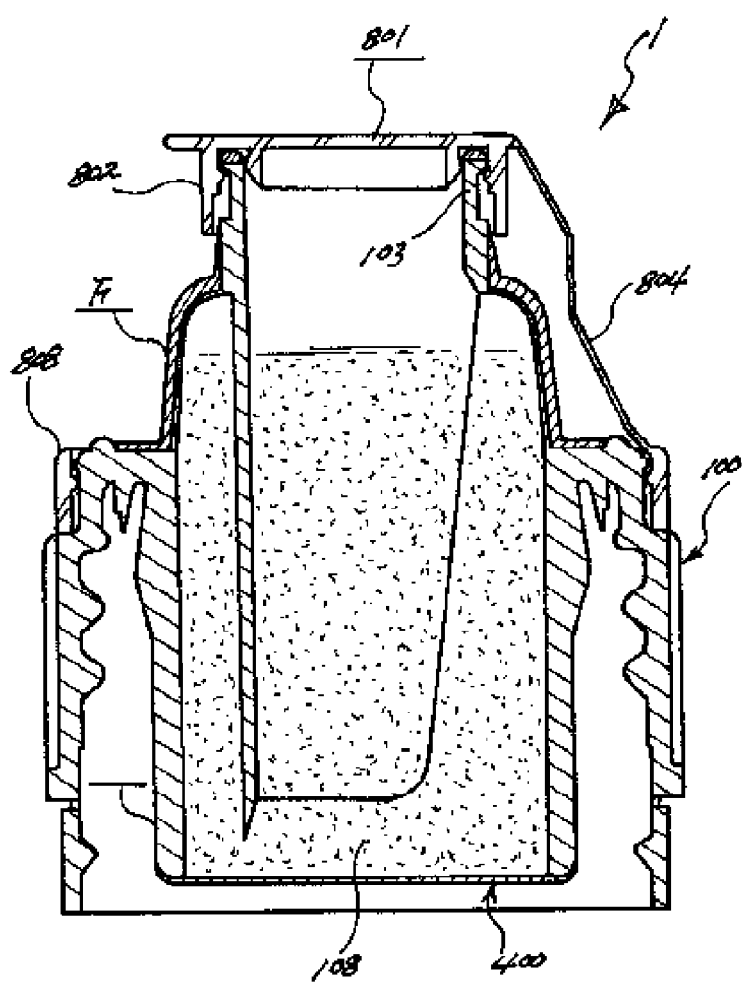

[Fig. 32]
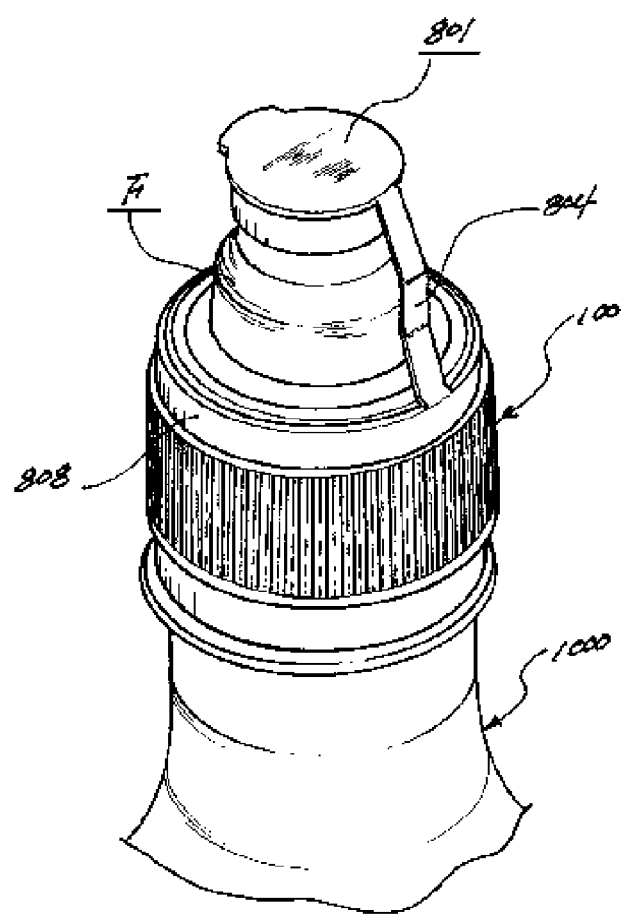

[Fig. 33]
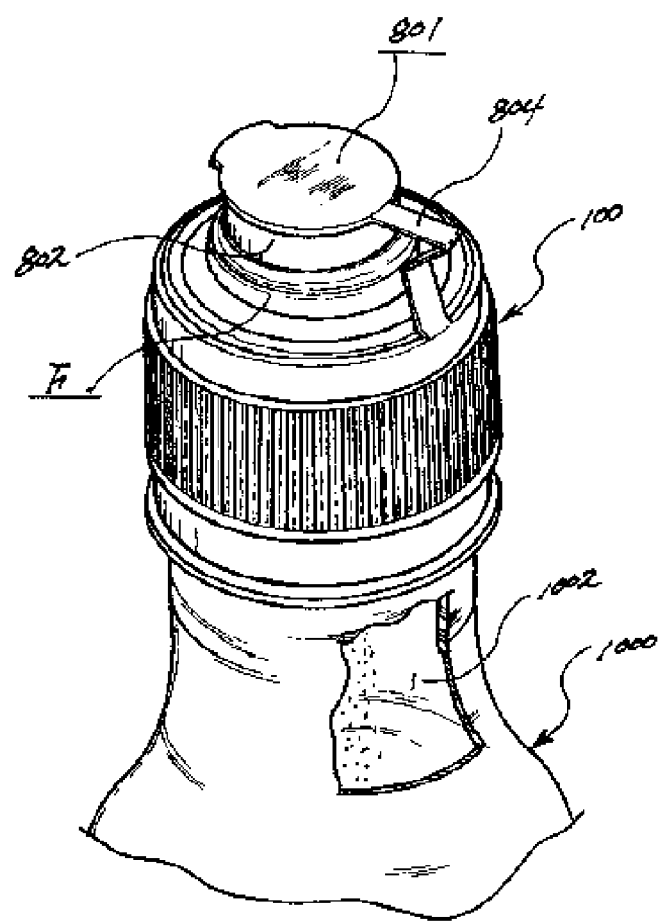

[Fig. 34]
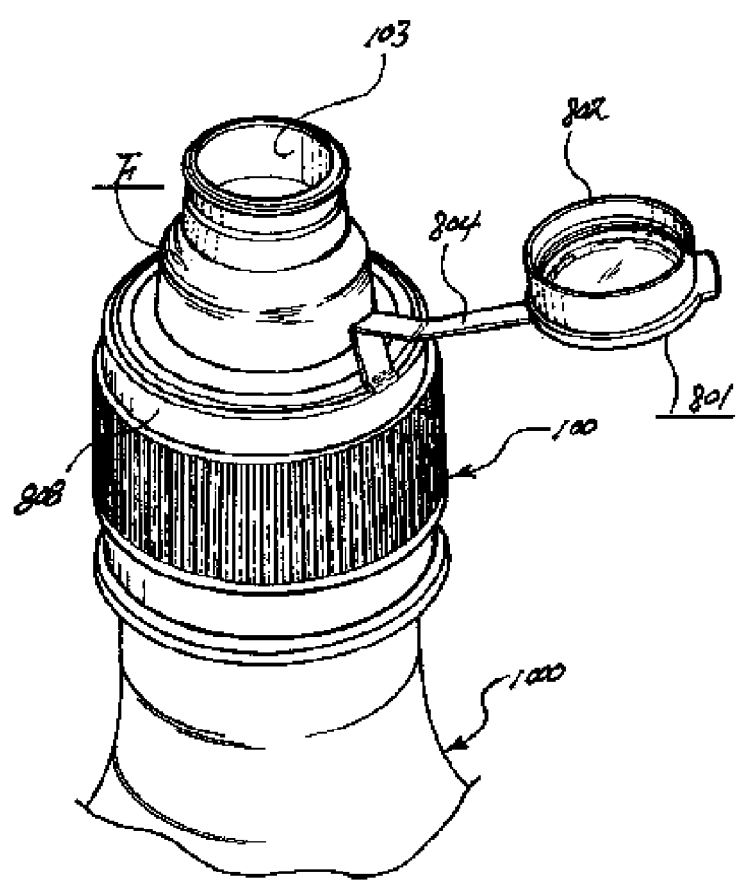

[Fig. 35]
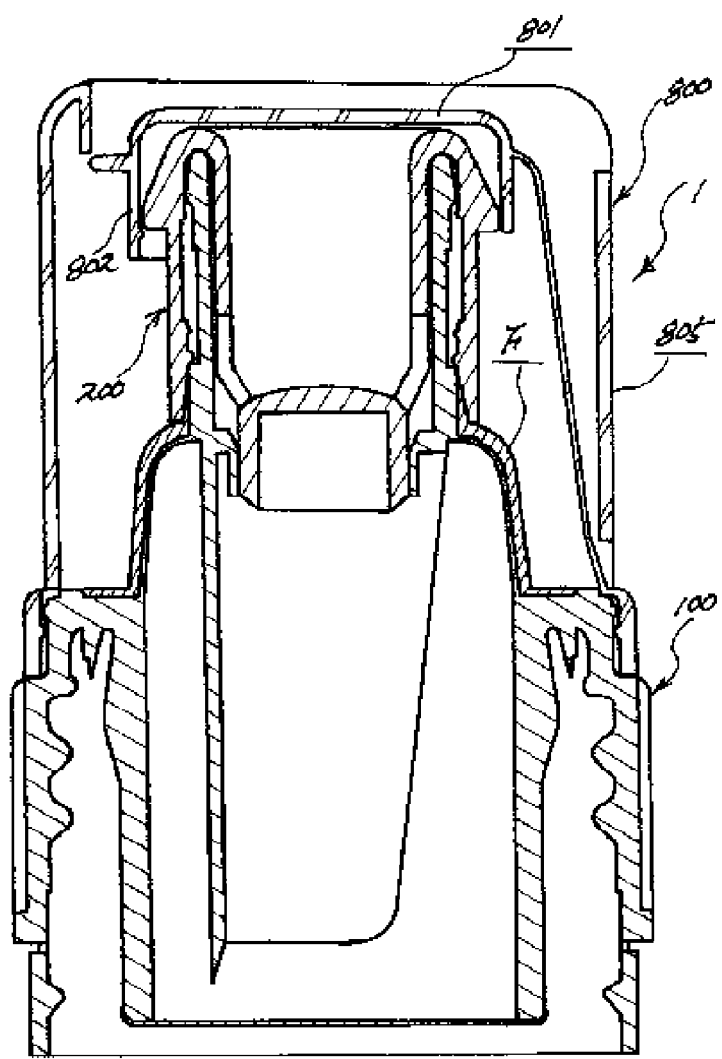

[Fig. 36]
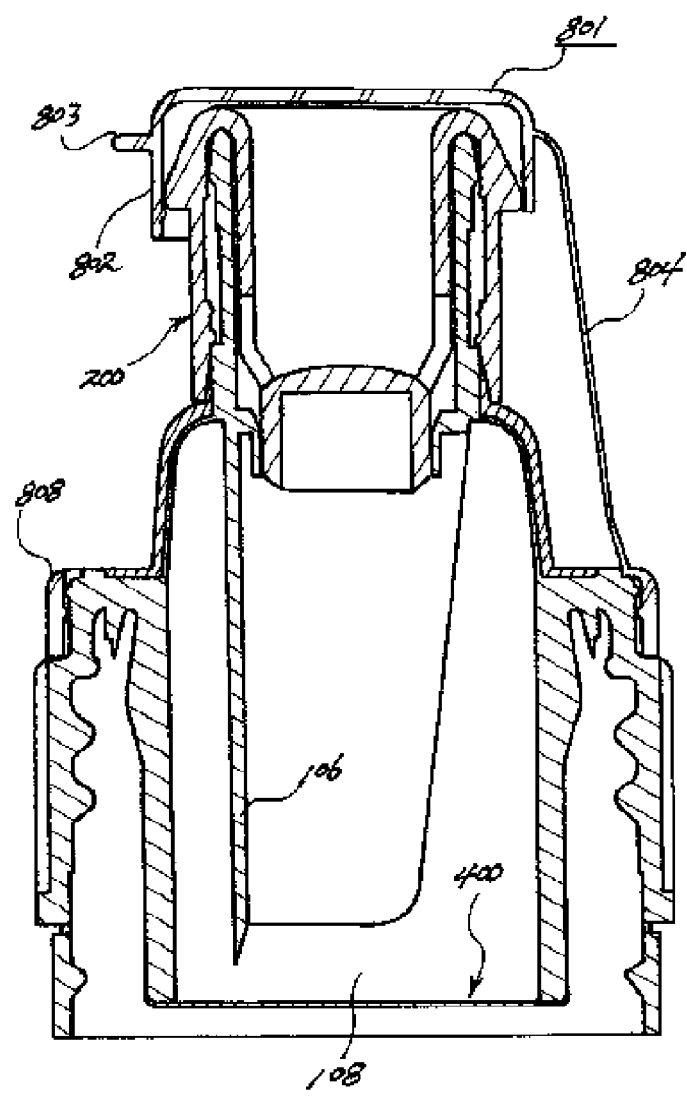

[Fig. 37]
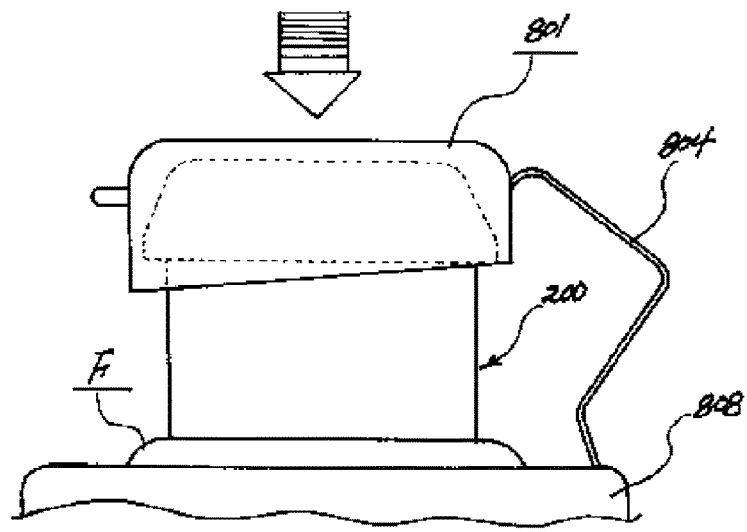
[Fig. 38]
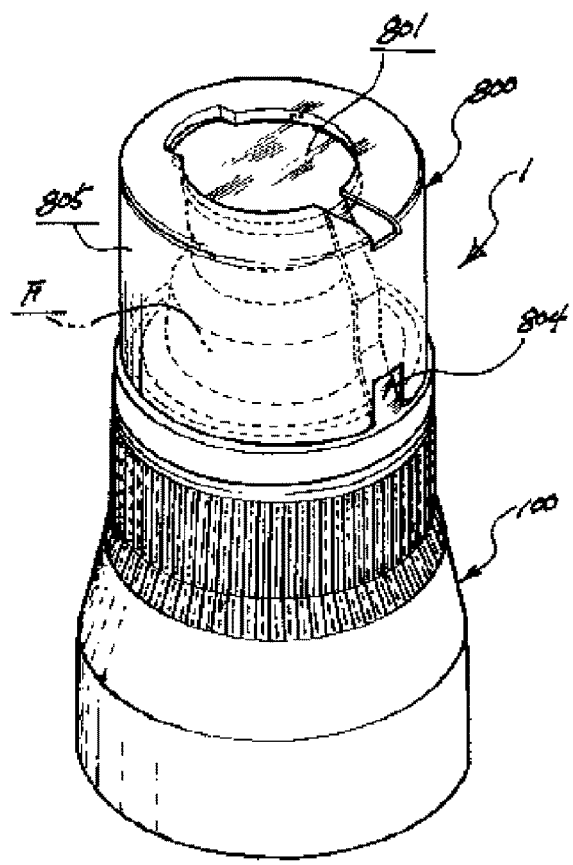

[Fig. 39]
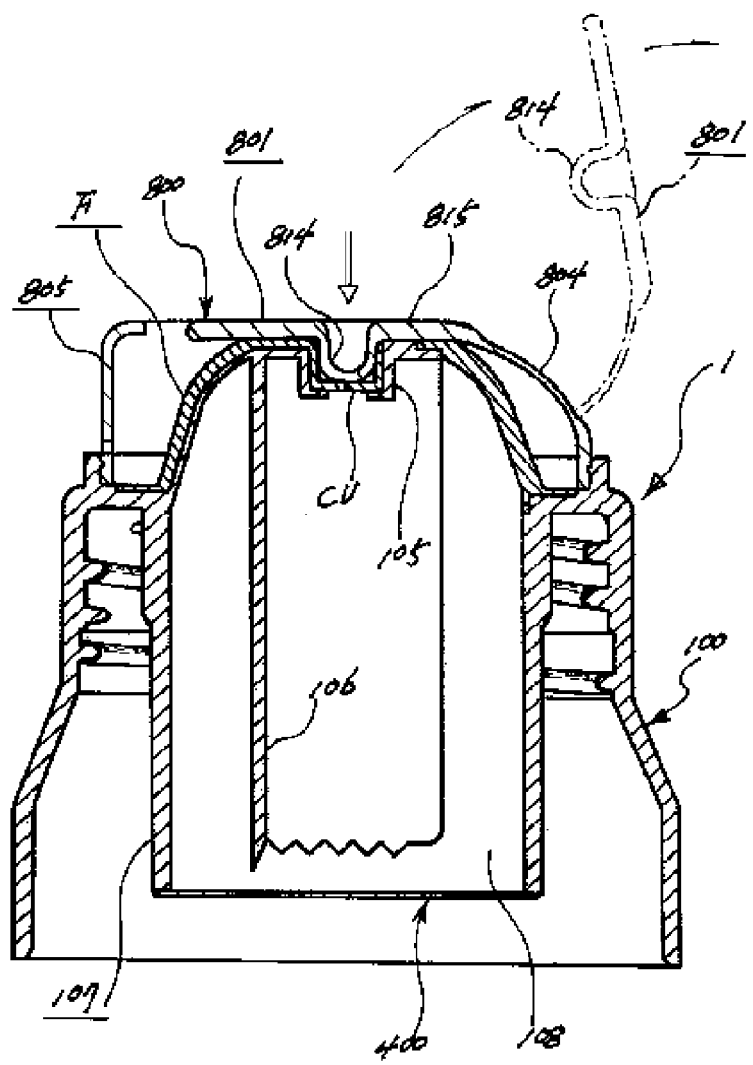

[Fig. 40]
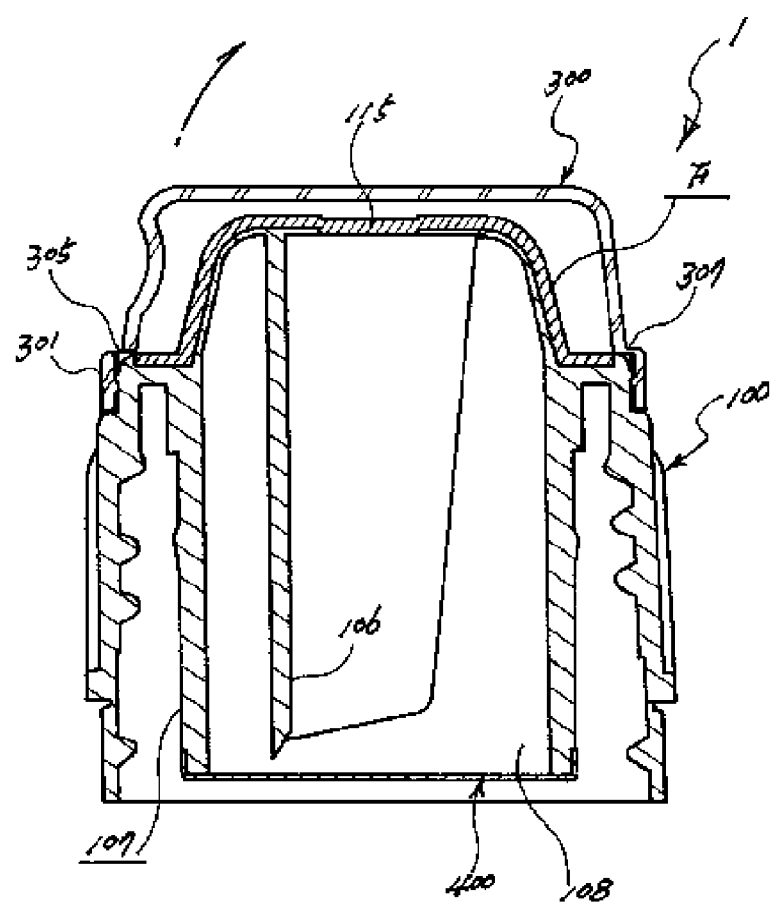

[Fig. 41]
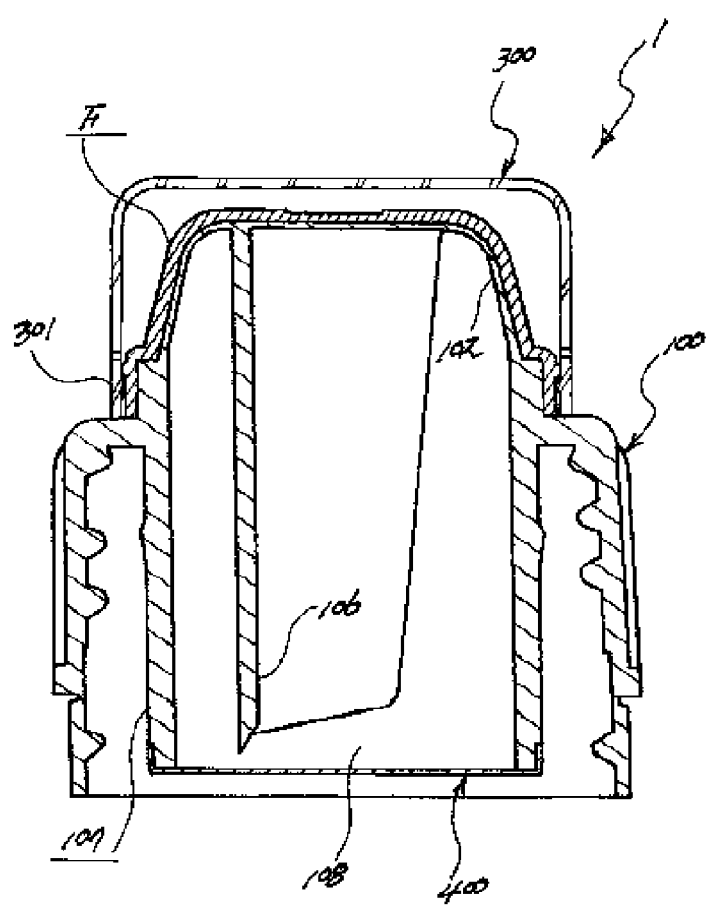

[Fig. 42]
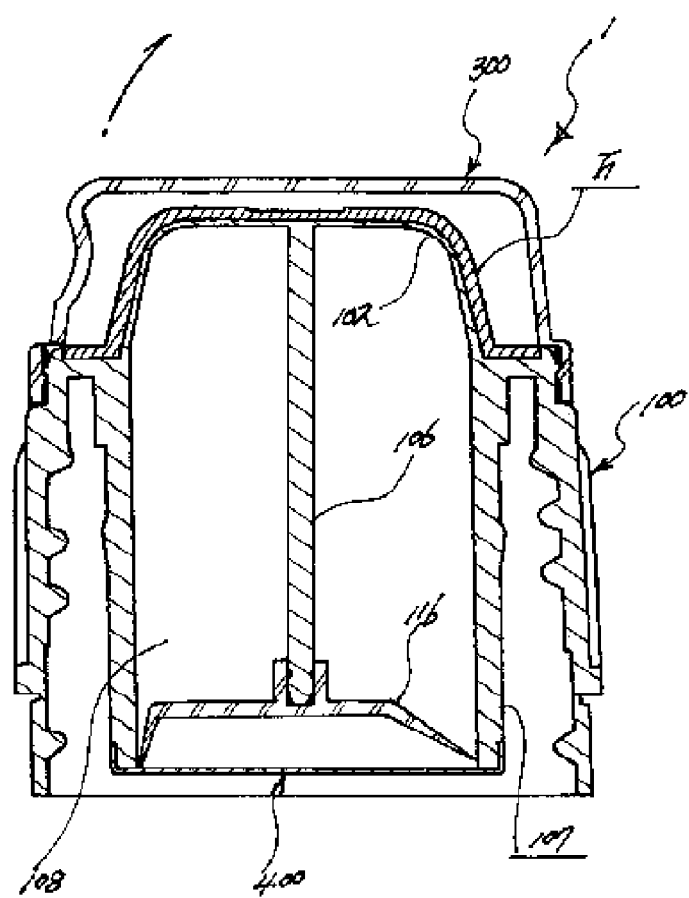

[Fig. 43]
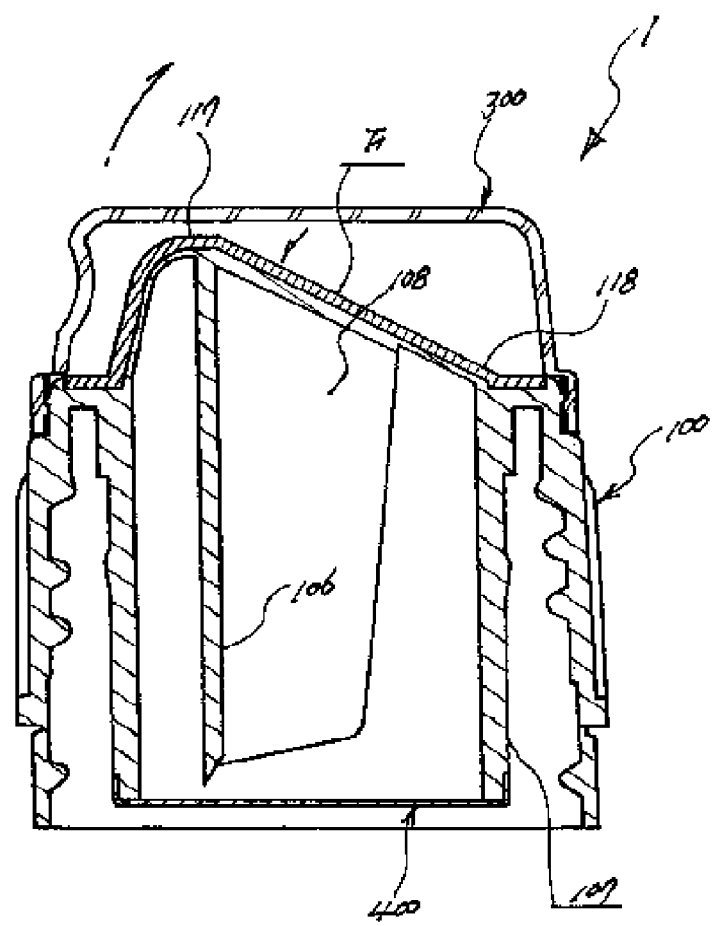

[Fig. 44]
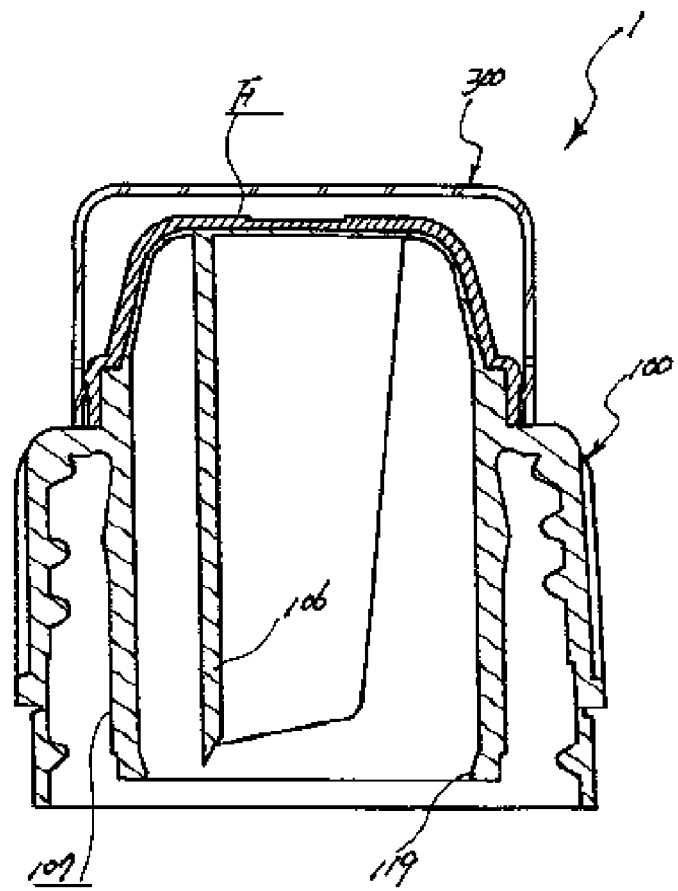
[Fig. 45a]
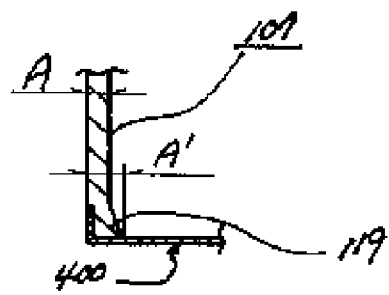
[Fig. 45b]
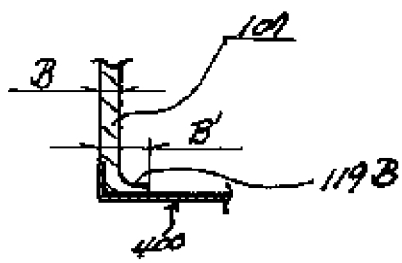

[Fig. 45c]
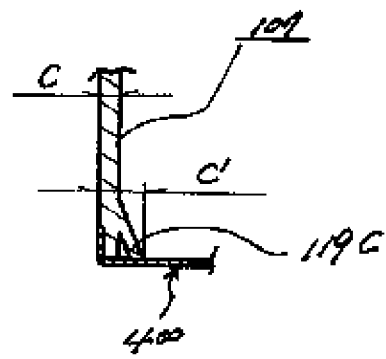
[Fig. 46]
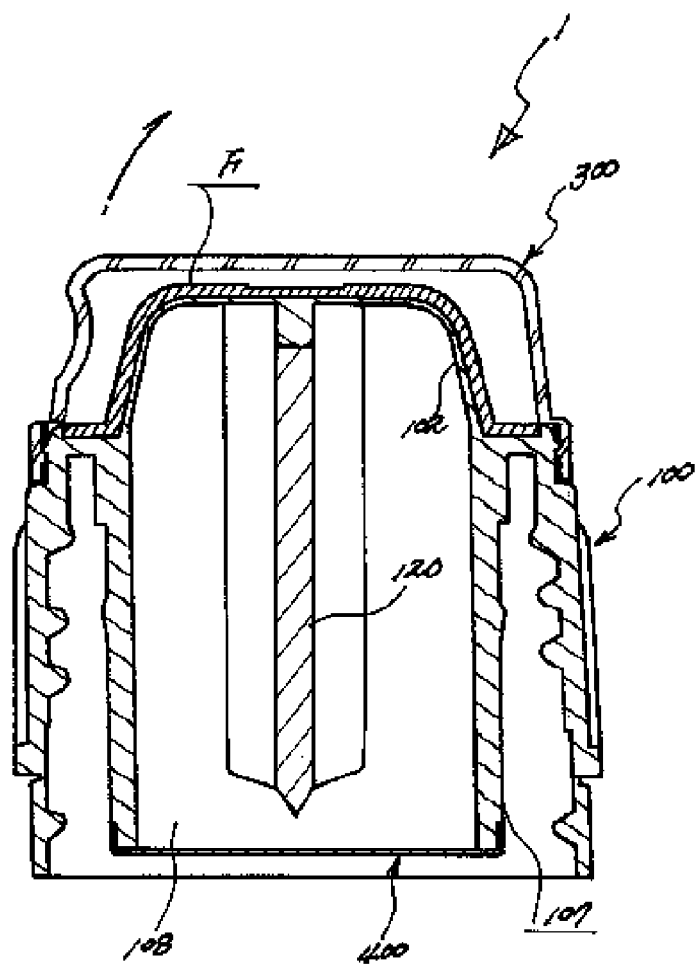

[Fig. 47]
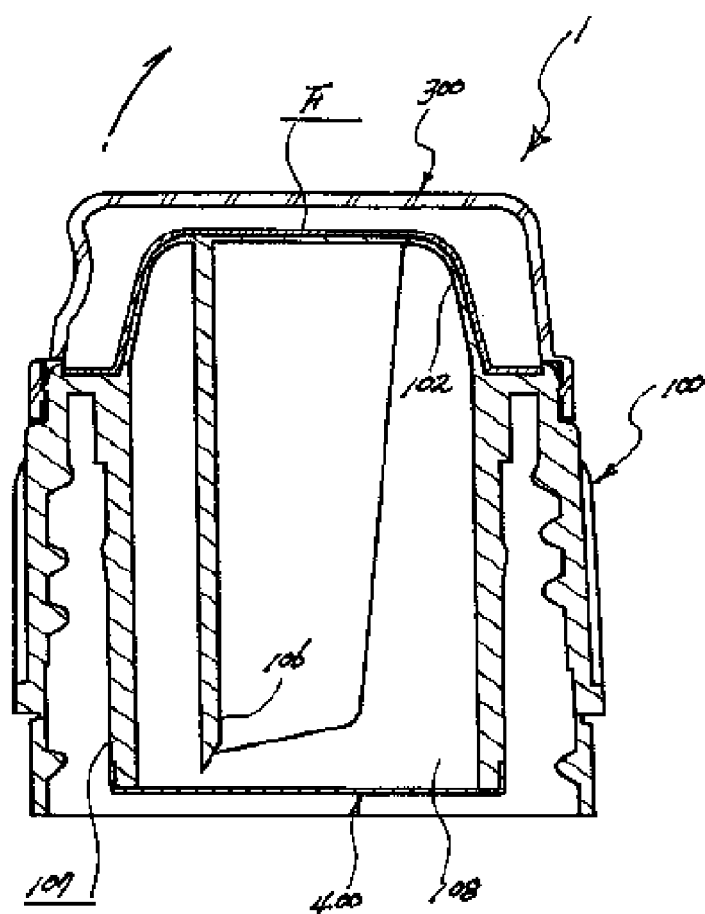

[Fig. 48]
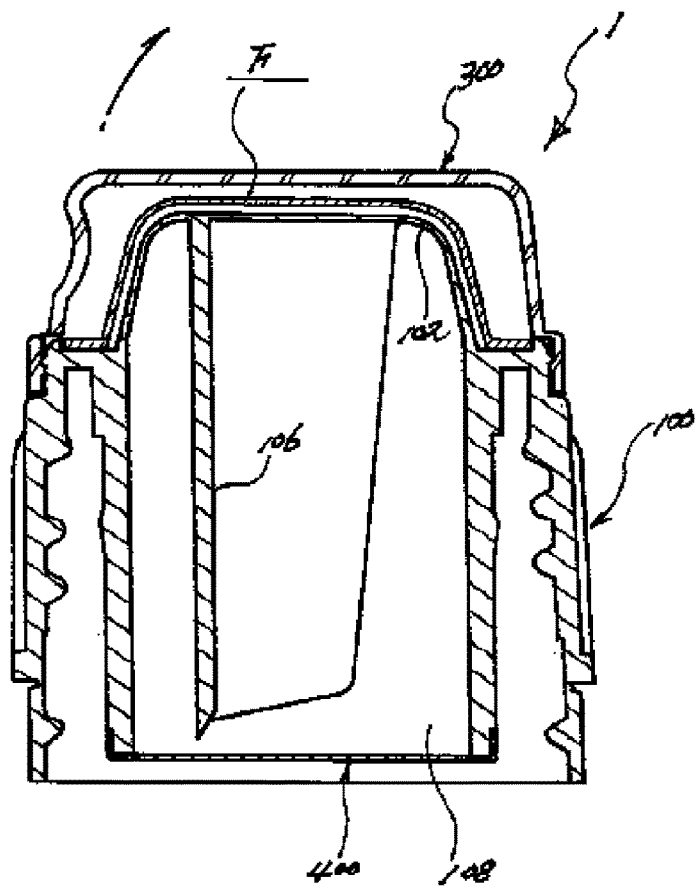
[Fig. 49]
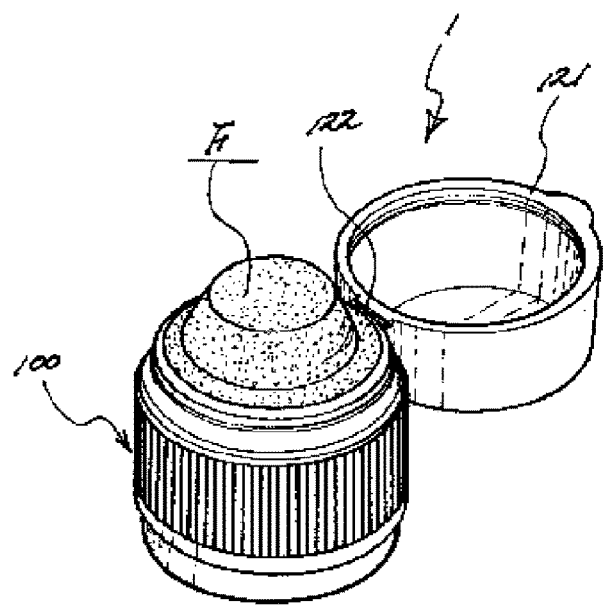

[Fig. 50]
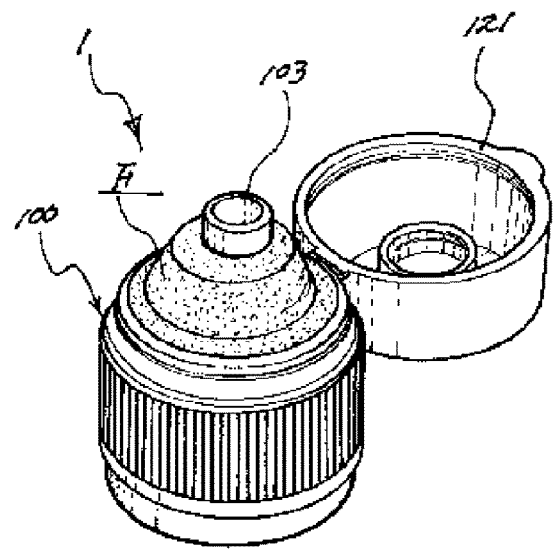
[Fig. 51]
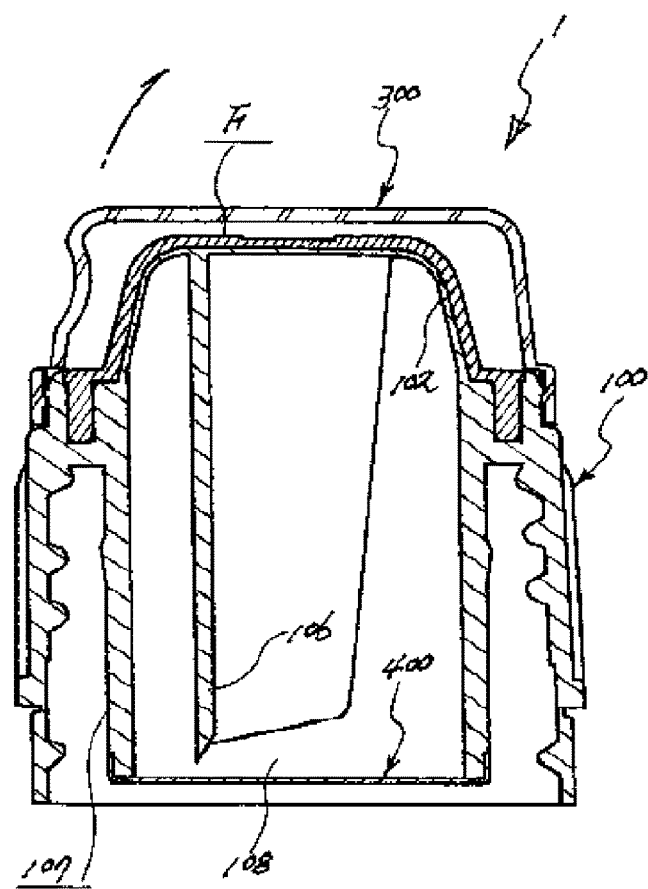

[Fig. 52]
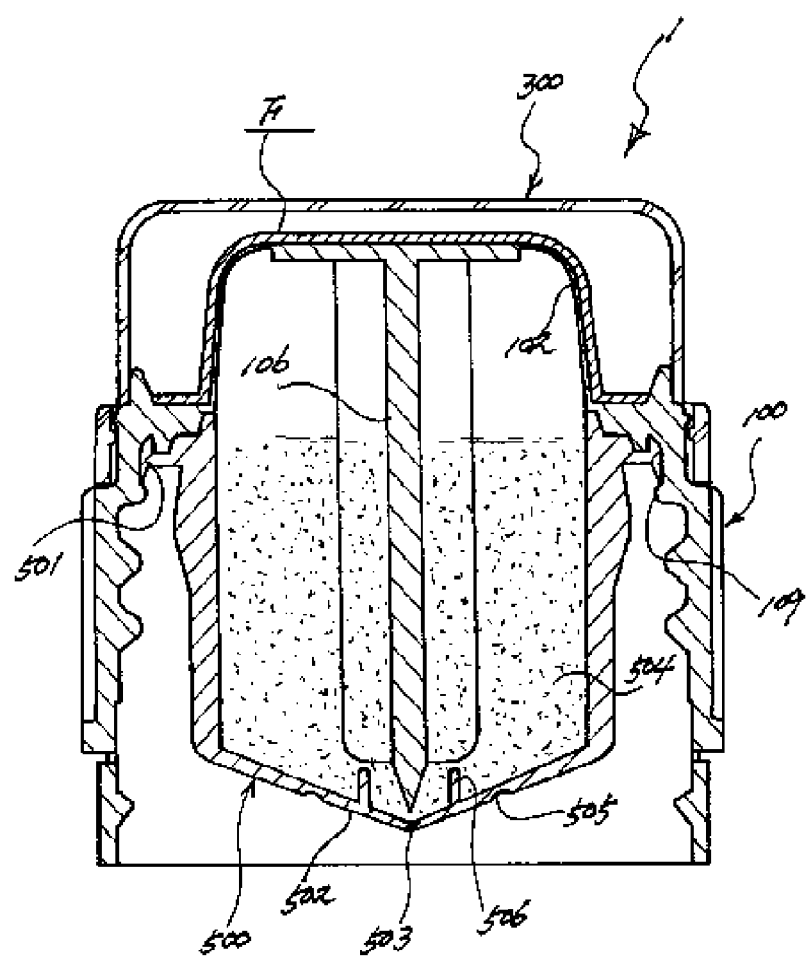

[Fig. 53]
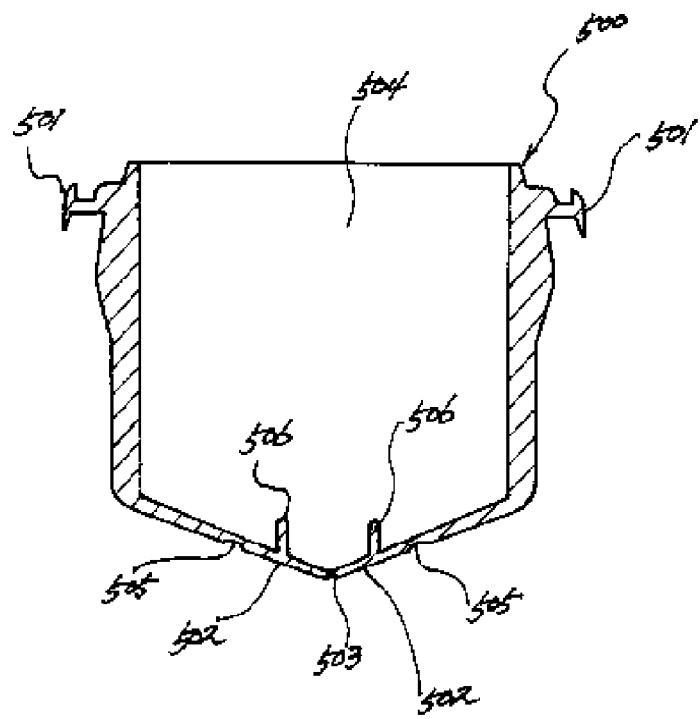
[Fig. 54]
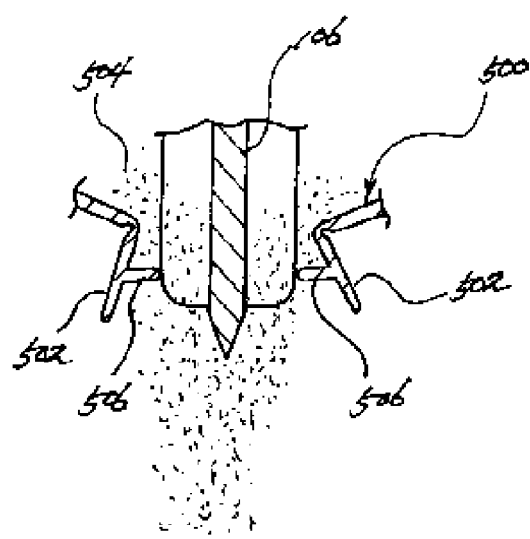

[Fig. 55]
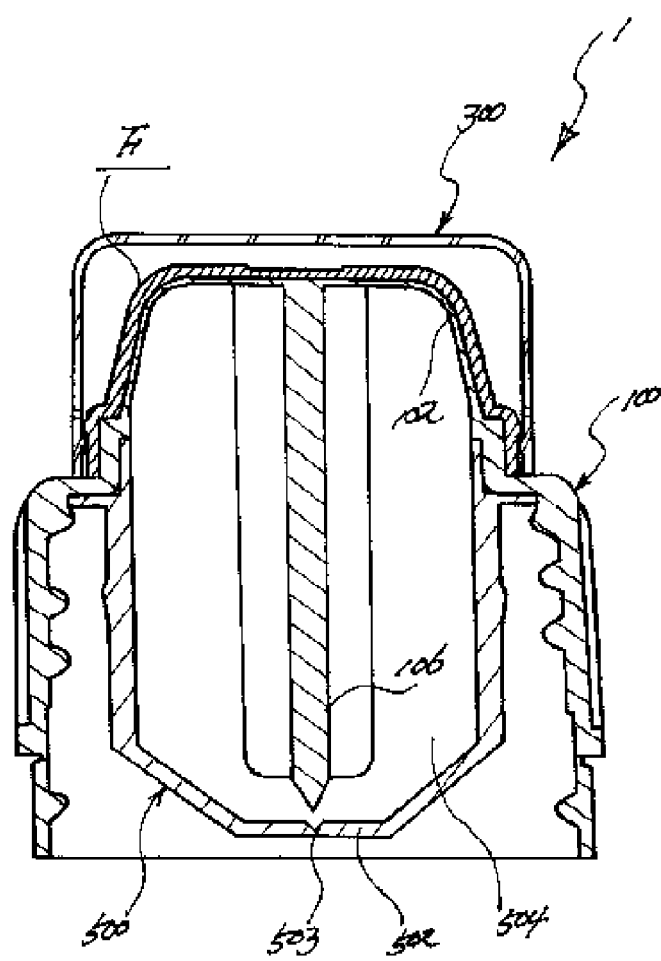

[Fig. 56]
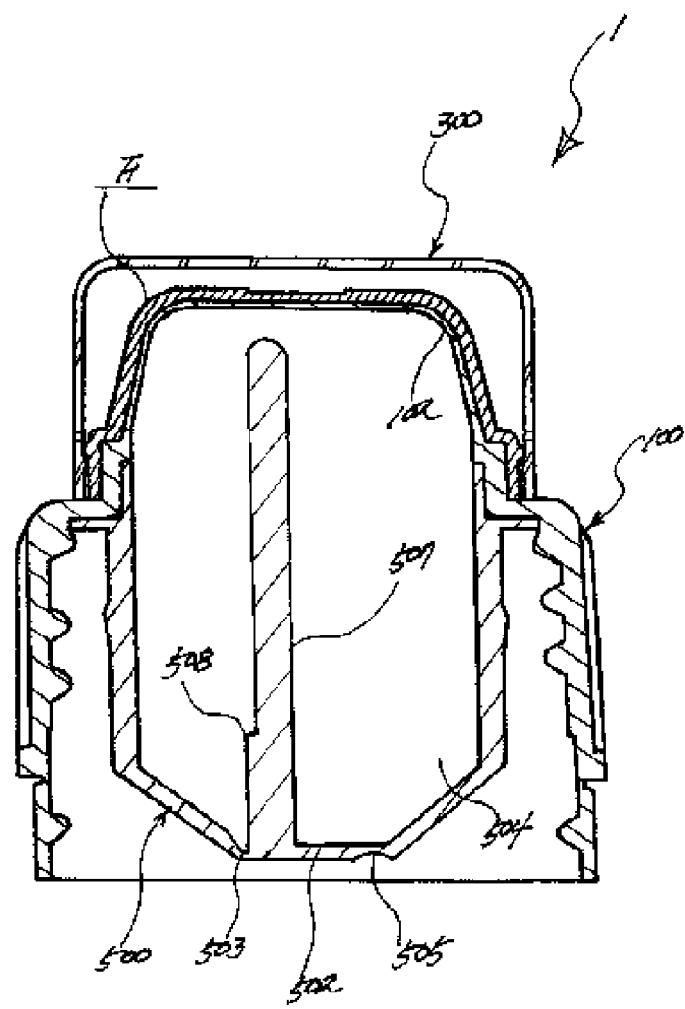

[Fig. 57]
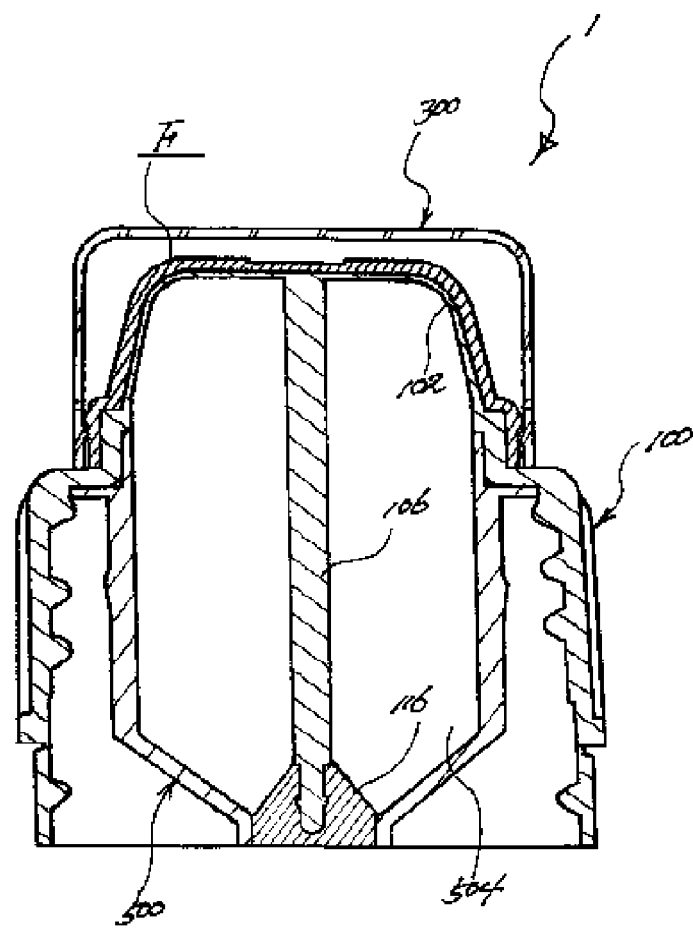

[Fig. 58]
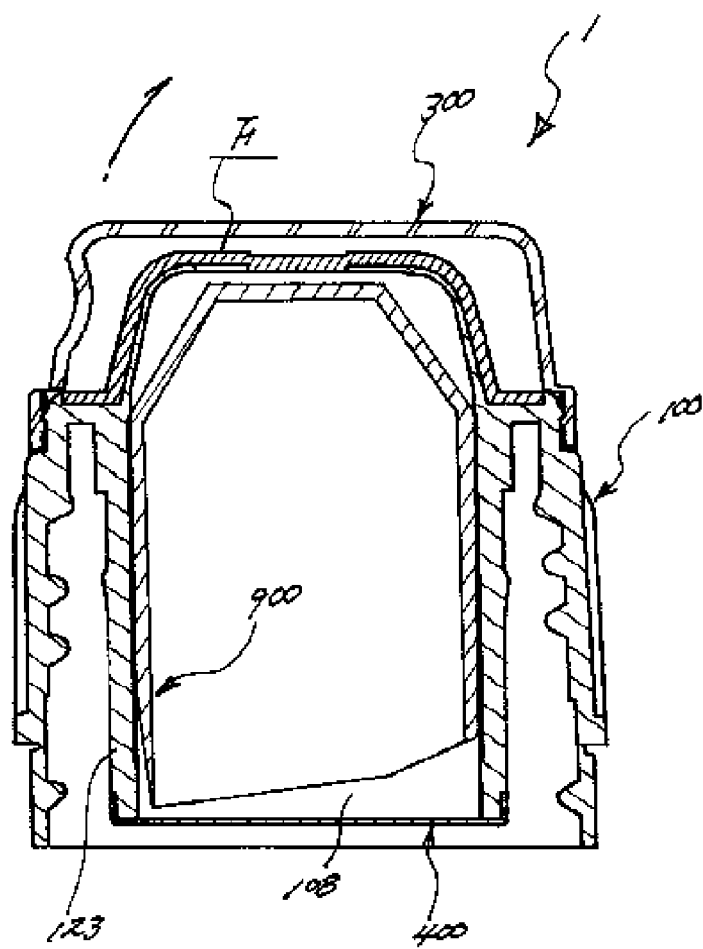

[Fig. 59]
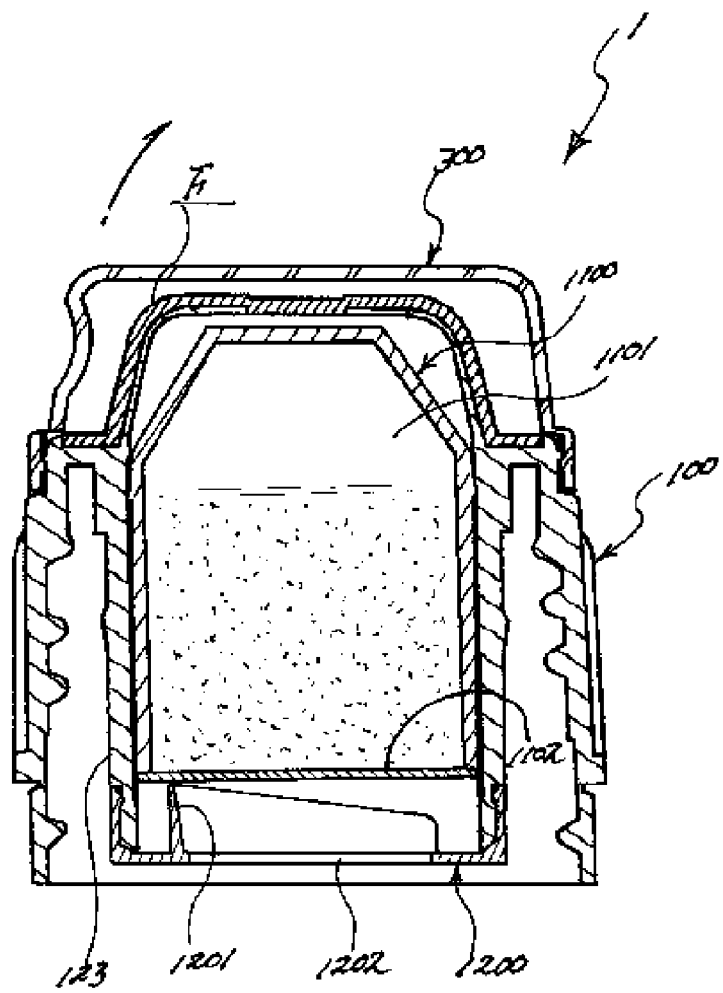

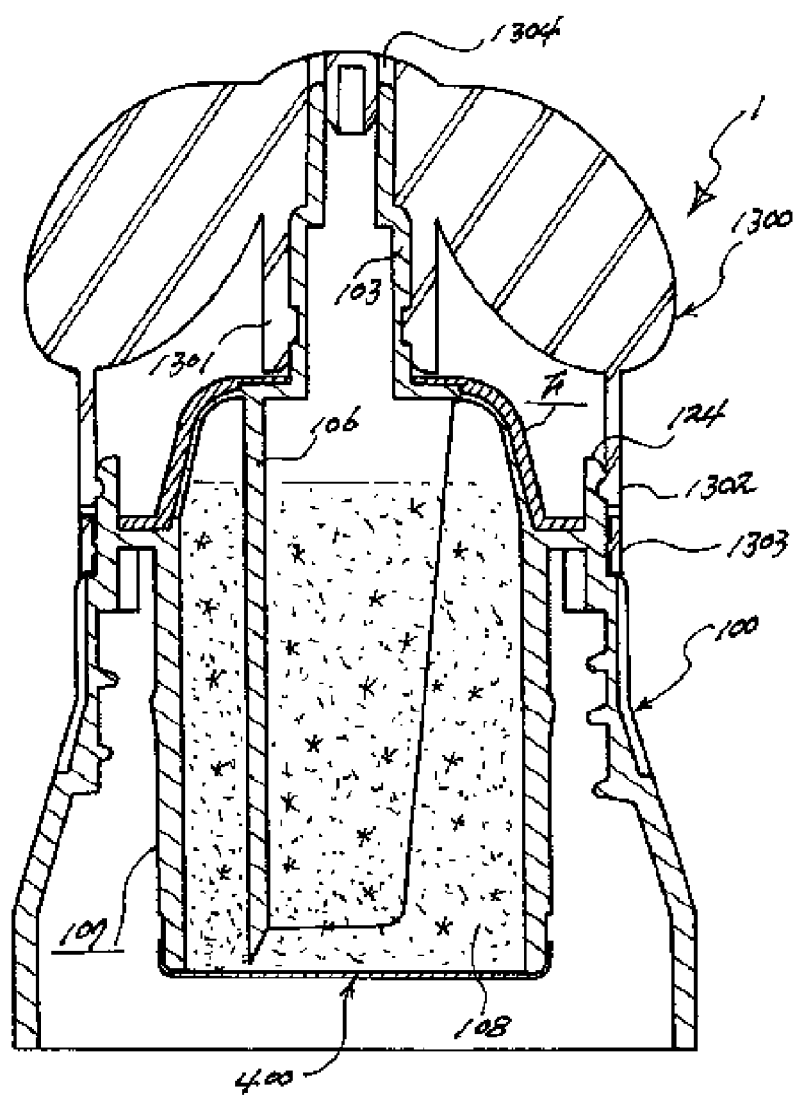
[Fig. 60]

[Fig. 61]
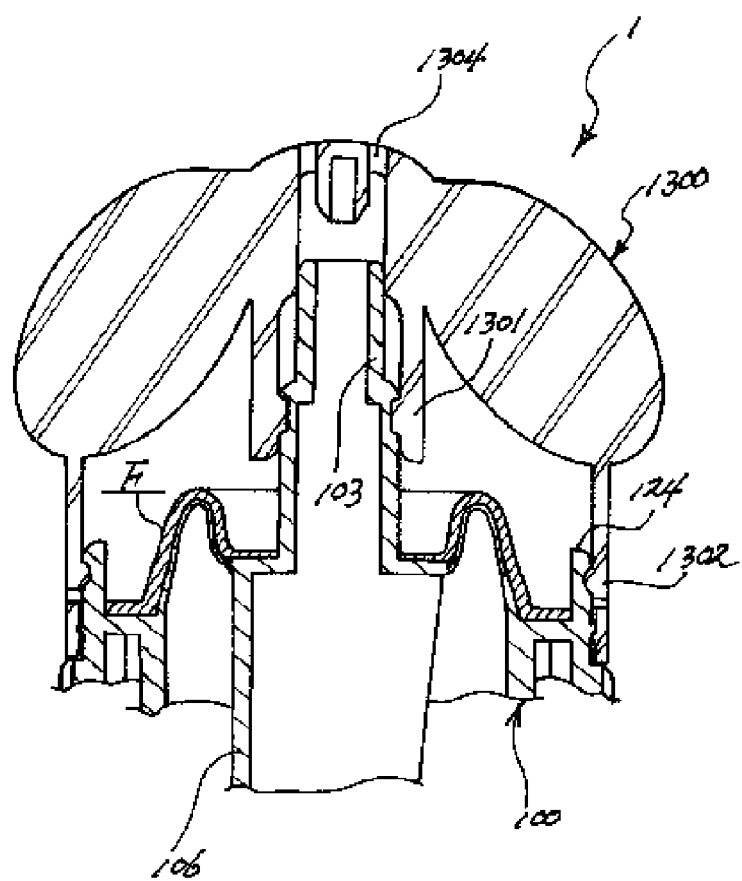

[Fig. 62]
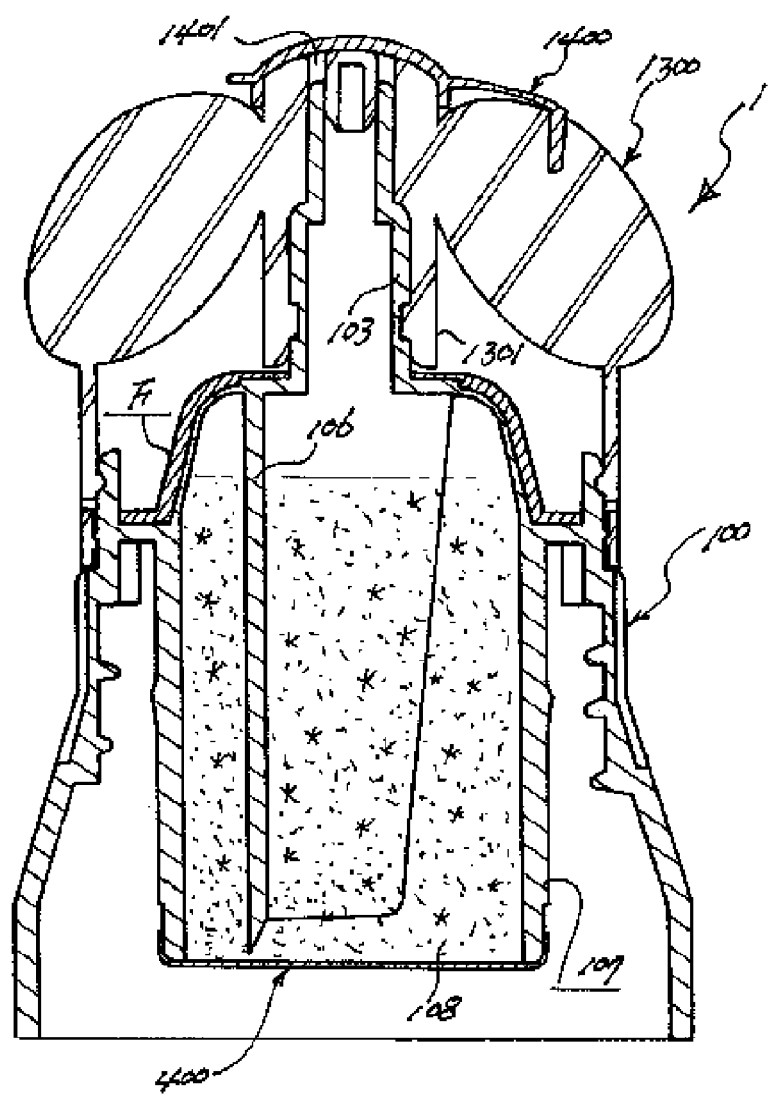

[Fig. 63]
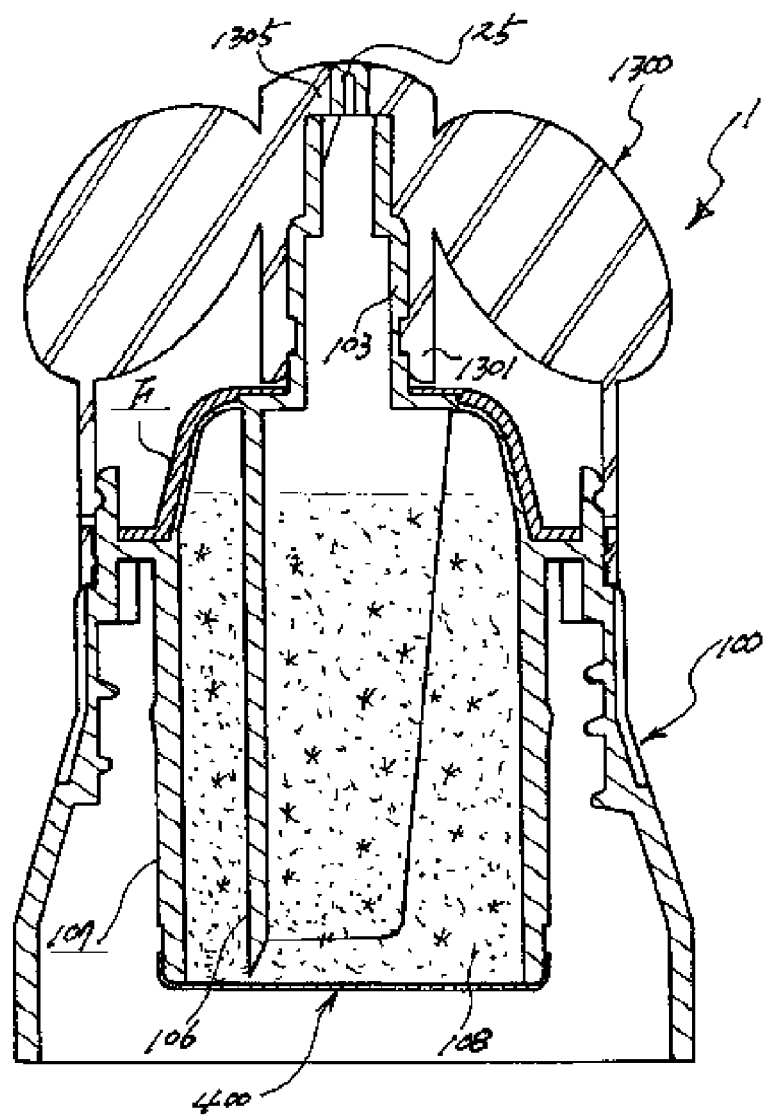

[Fig. 64]
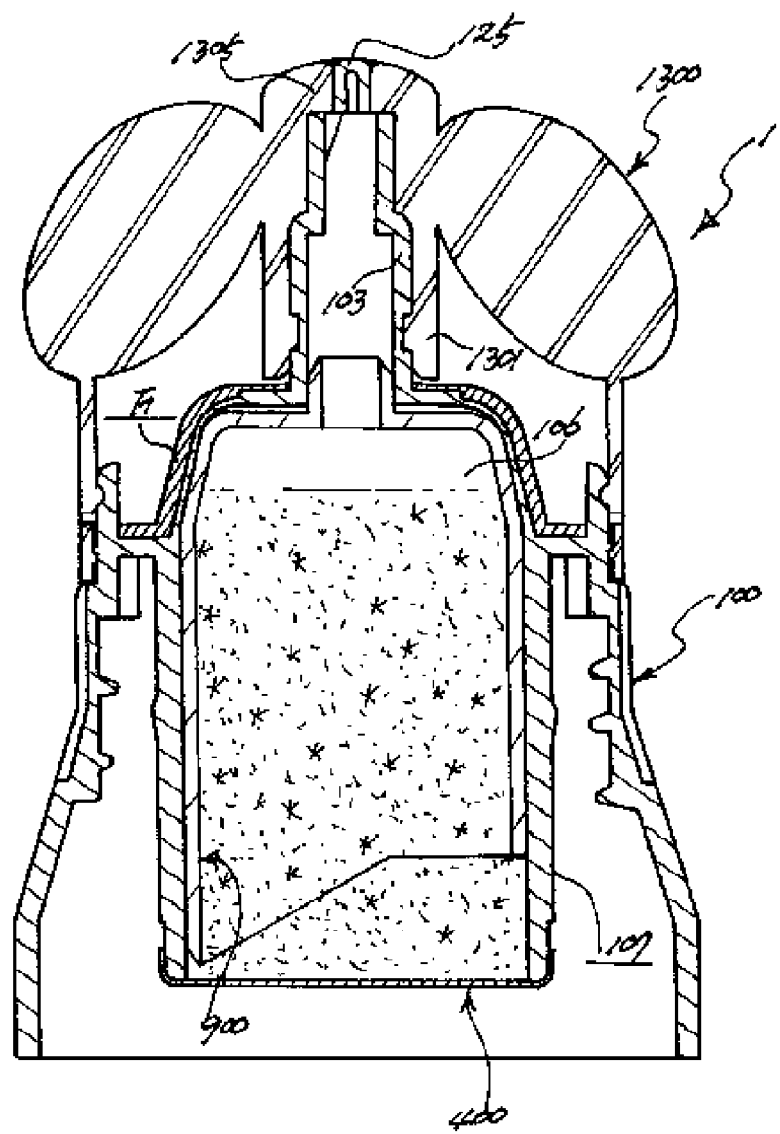

[Fig. 65]
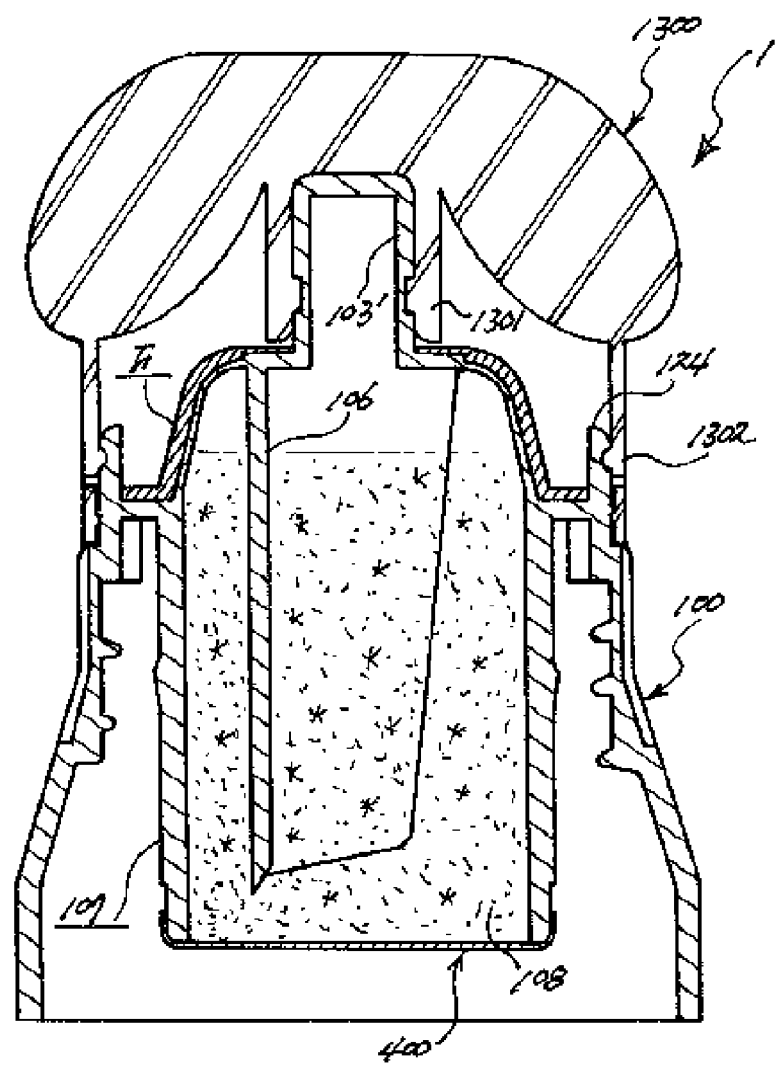

[Fig. 66]
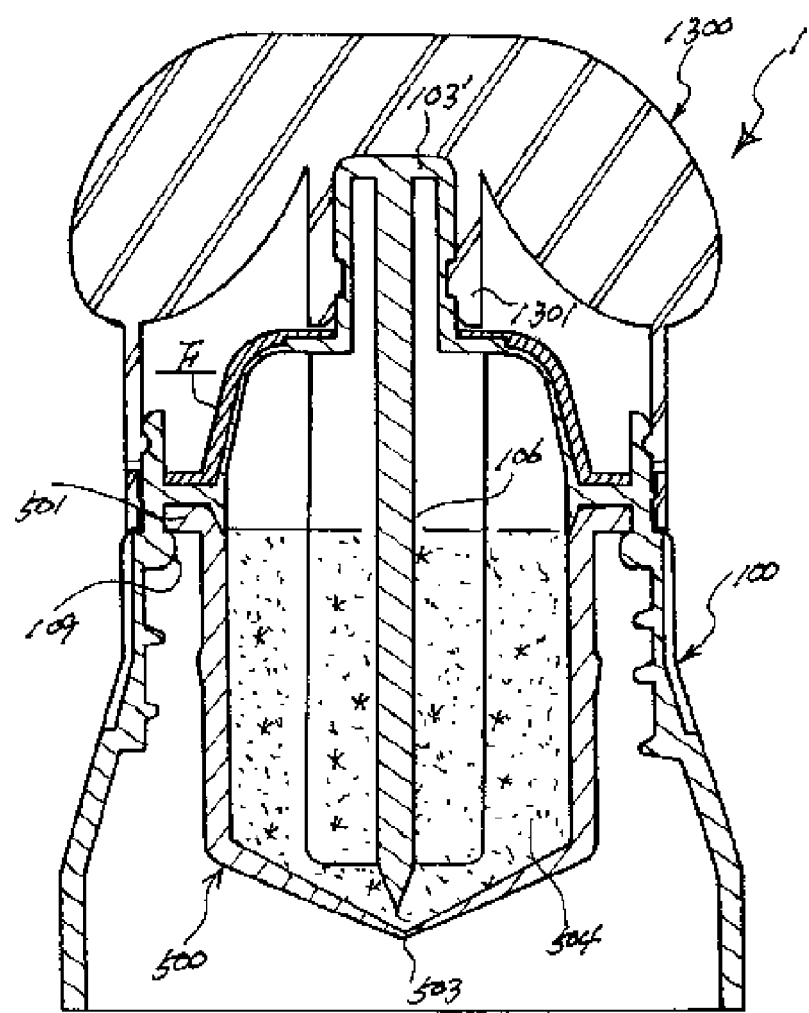

[Fig. 67]
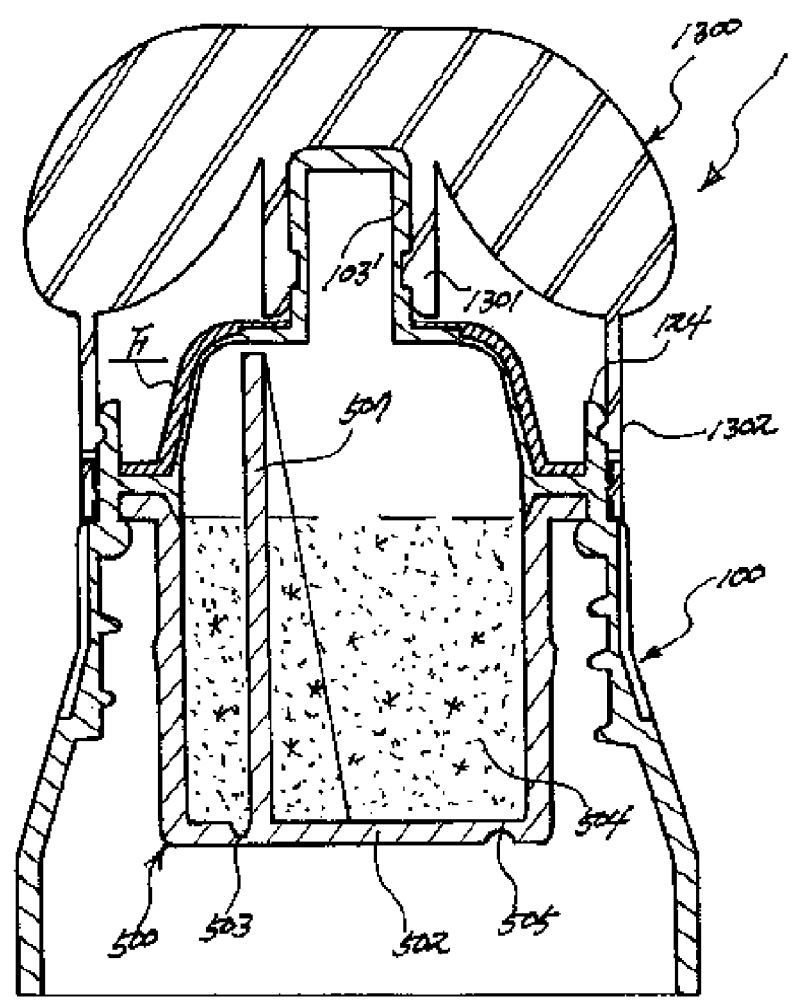

[Fig. 68]
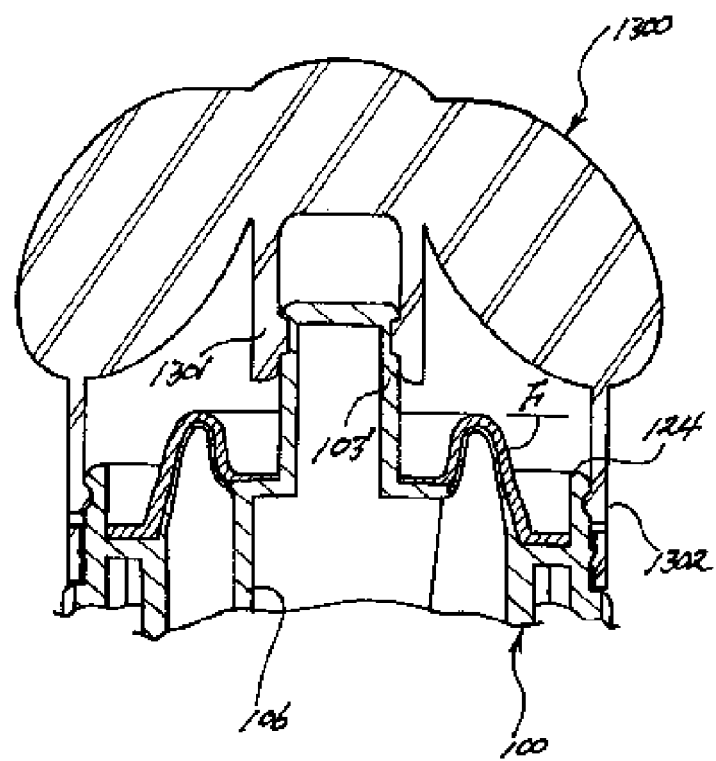

[Fig. 69]
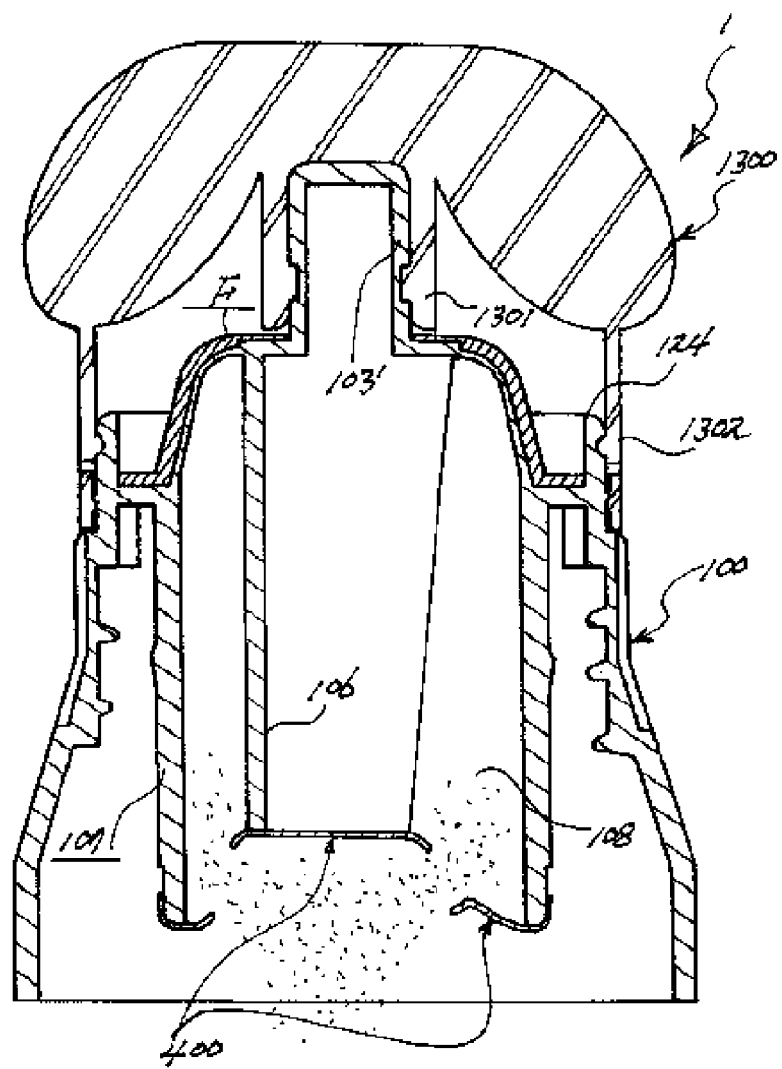

[Fig. 70]
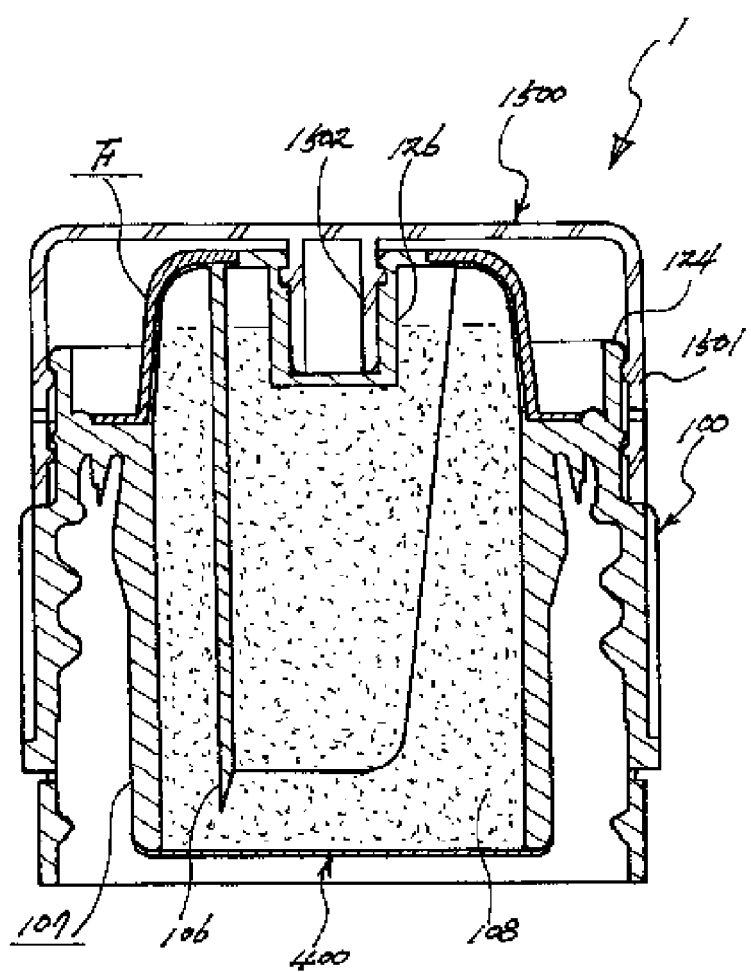

[Fig. 71]
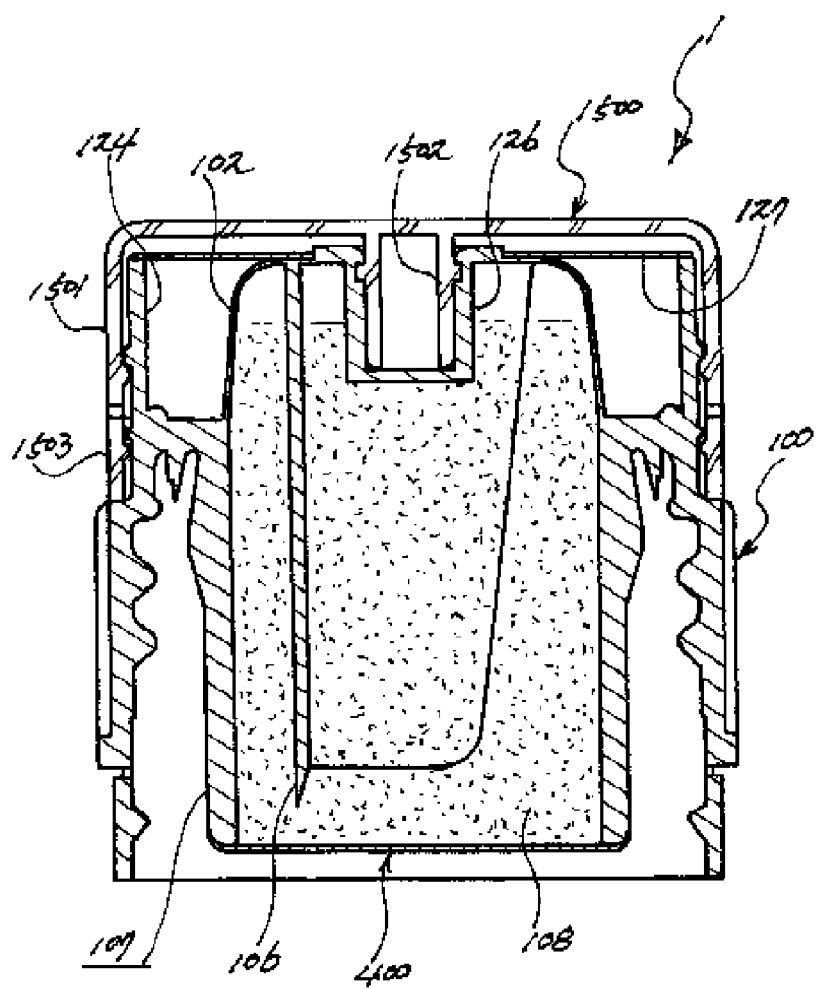

[Fig. 72]
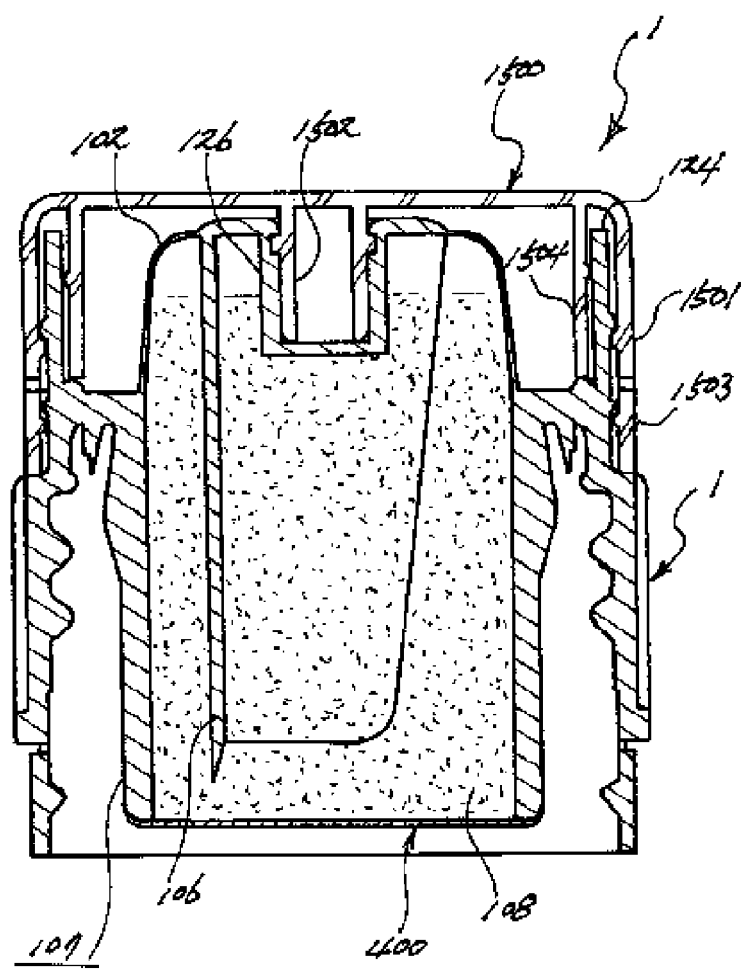

[Fig. 73]
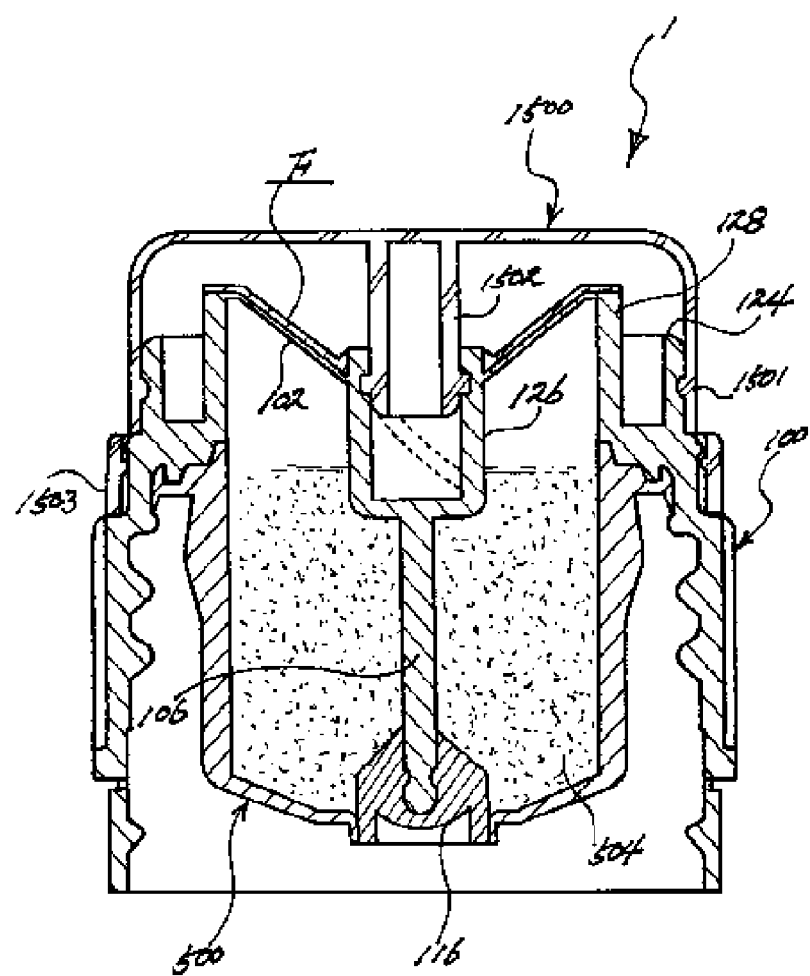

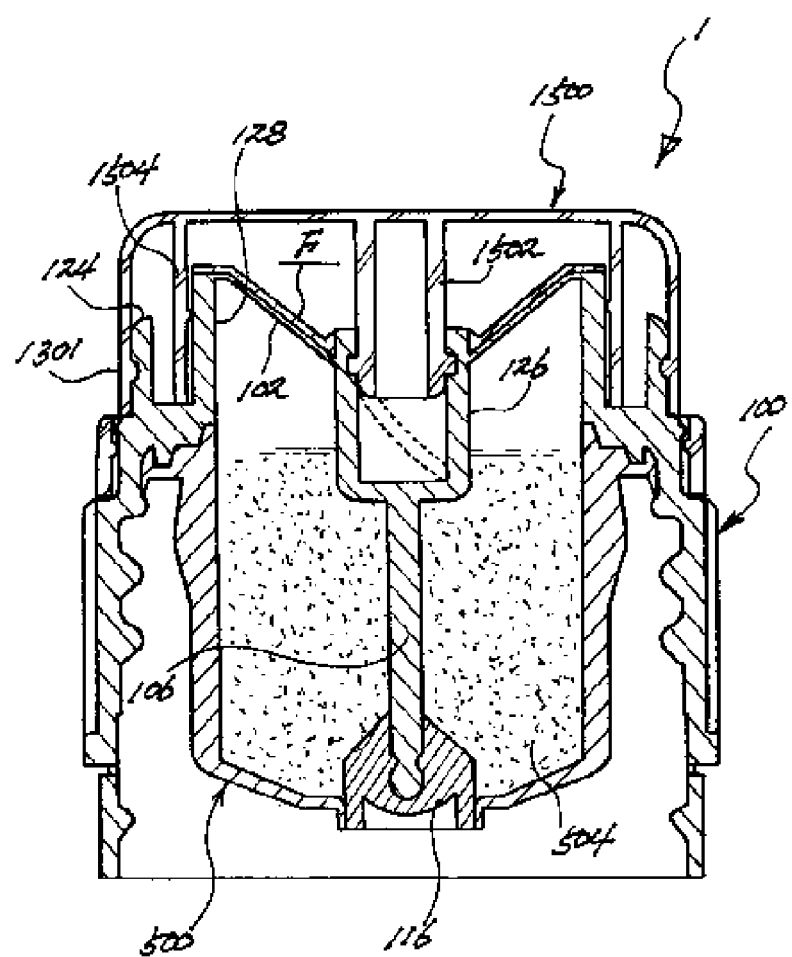
[Fig. 74]

[Fig. 75]
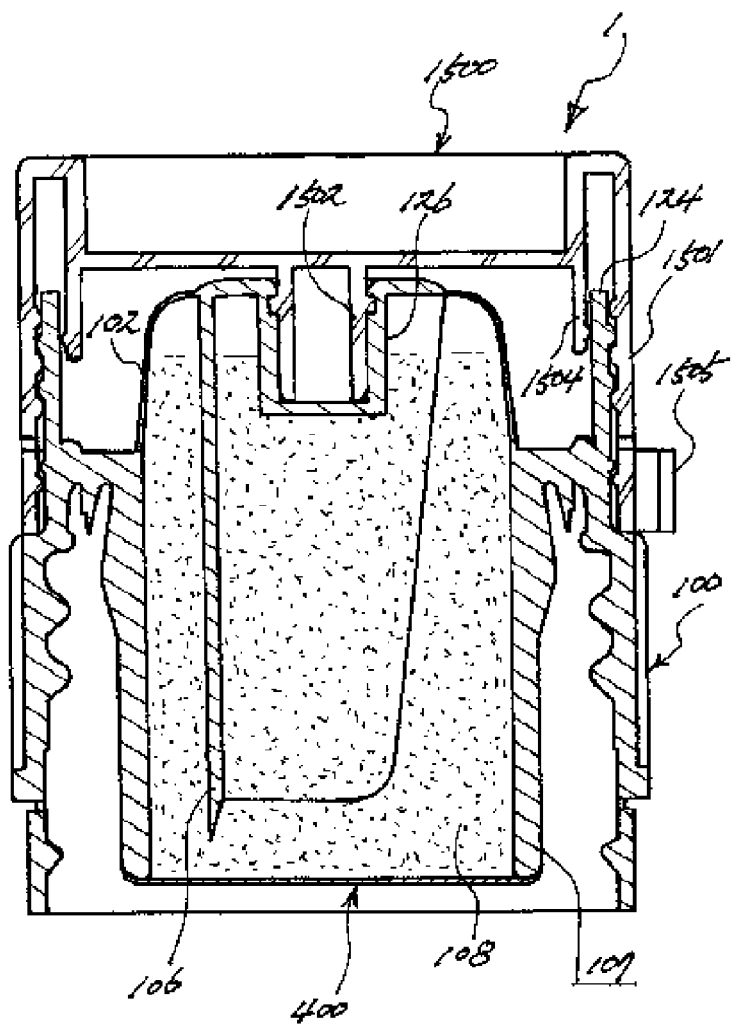

[Fig. 76]
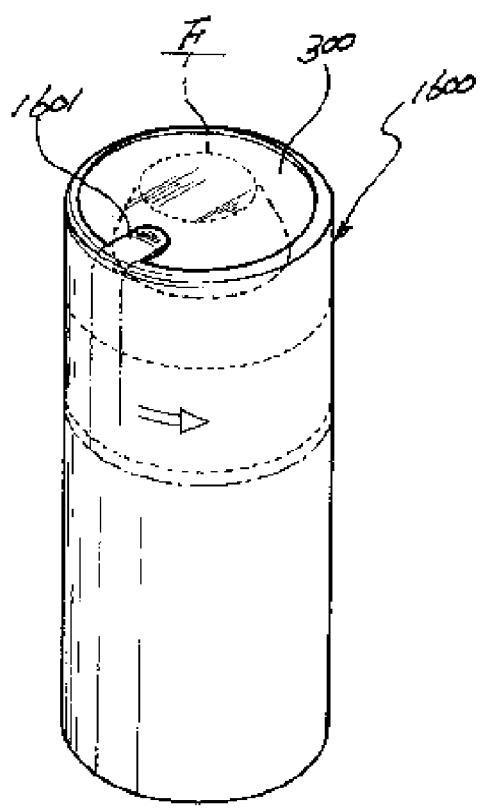

[Fig. 77]
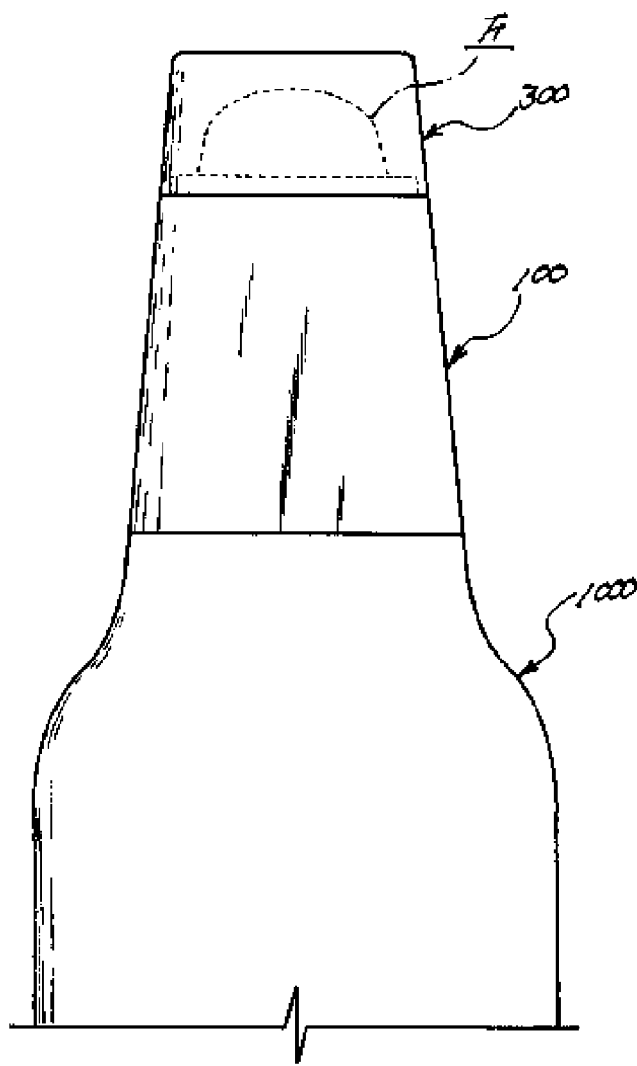

[Fig. 78]
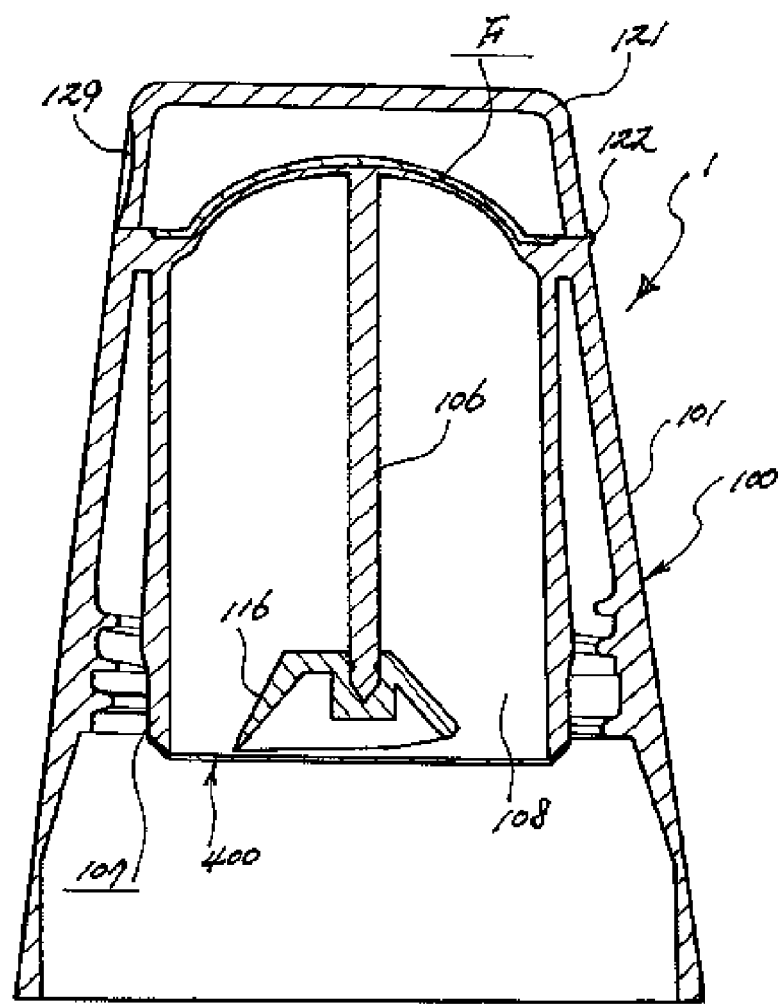

[Fig. 79]
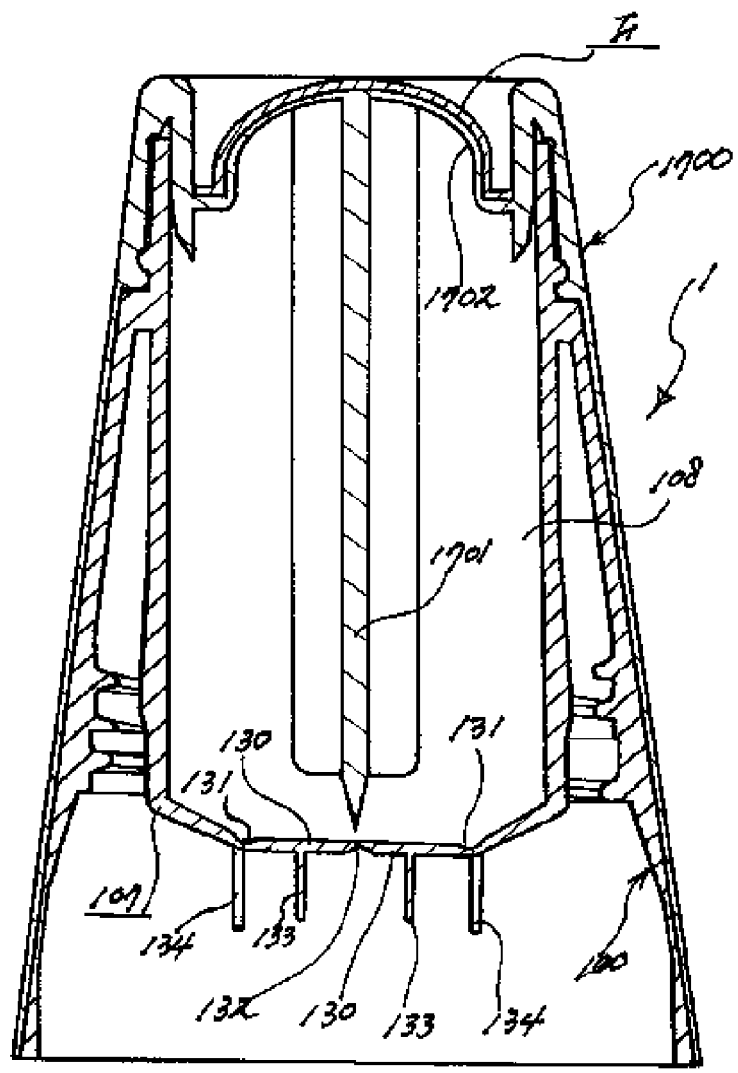

[Fig. 80]
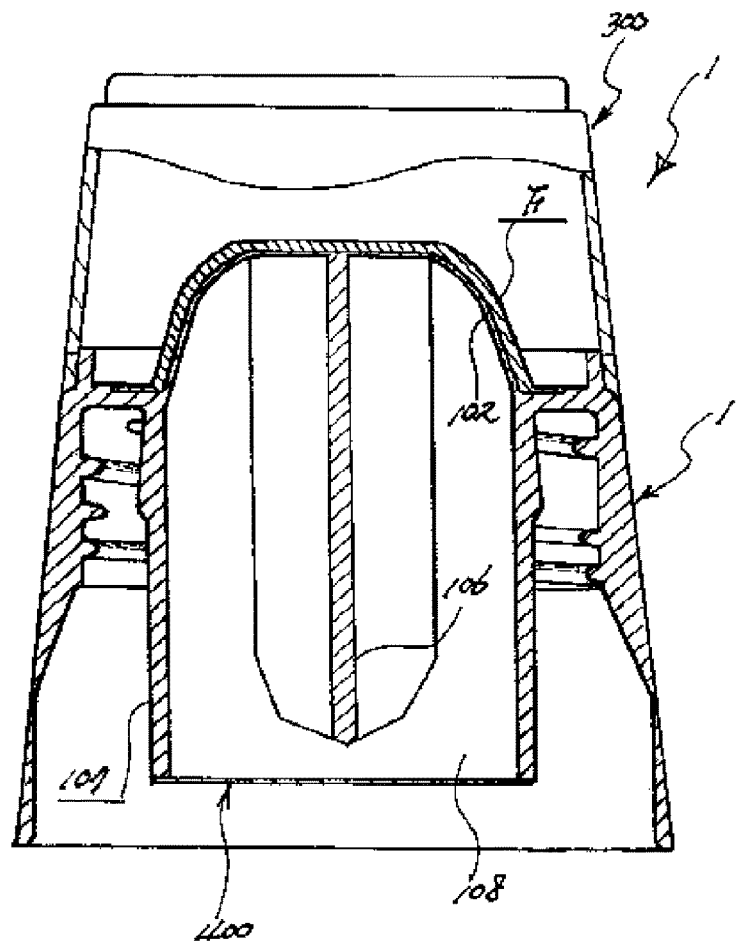
[Fig. 81]
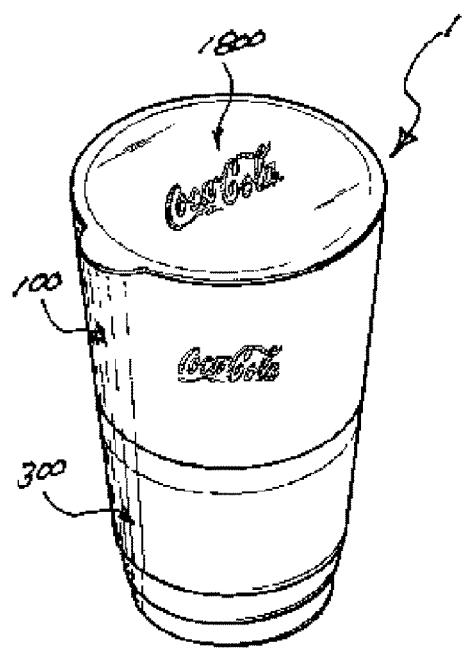

[Fig. 82]
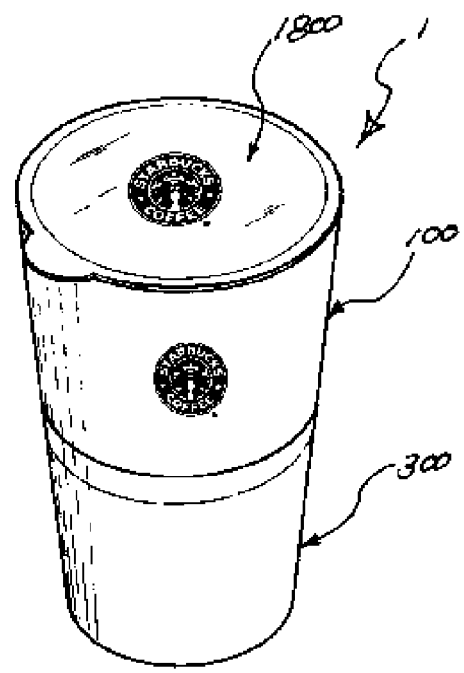

[Fig. 83]
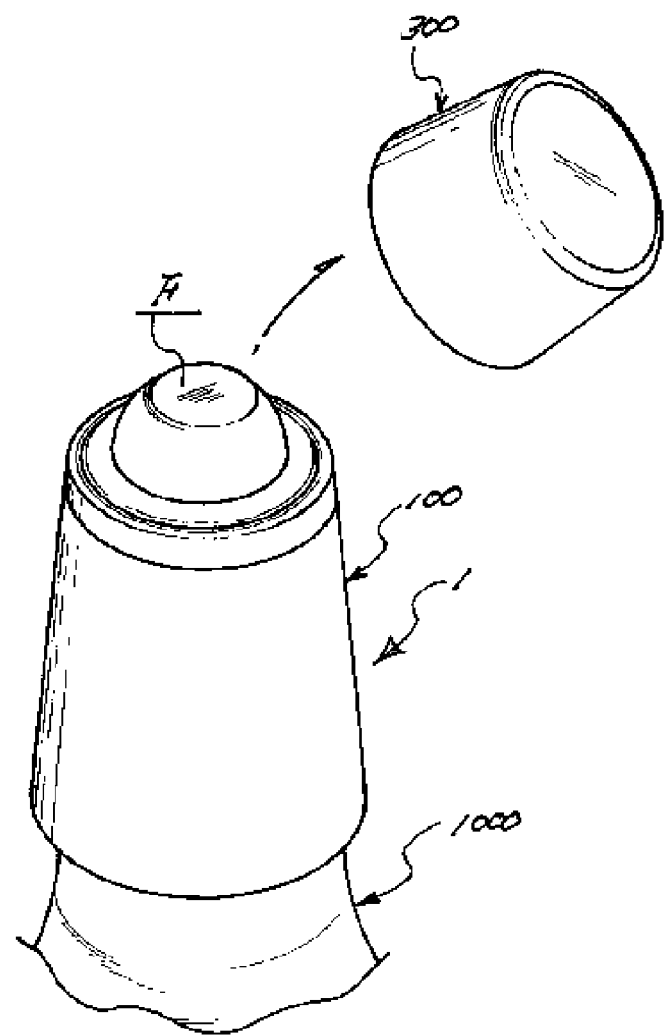

[Fig. 84]
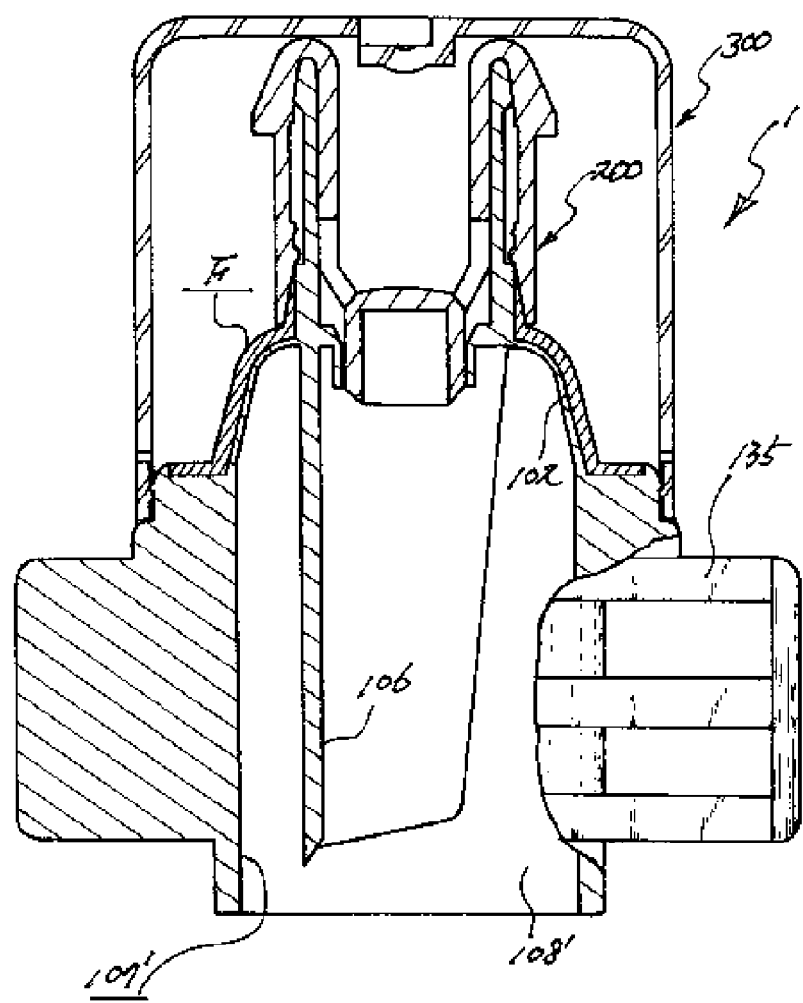

[Fig. 85]
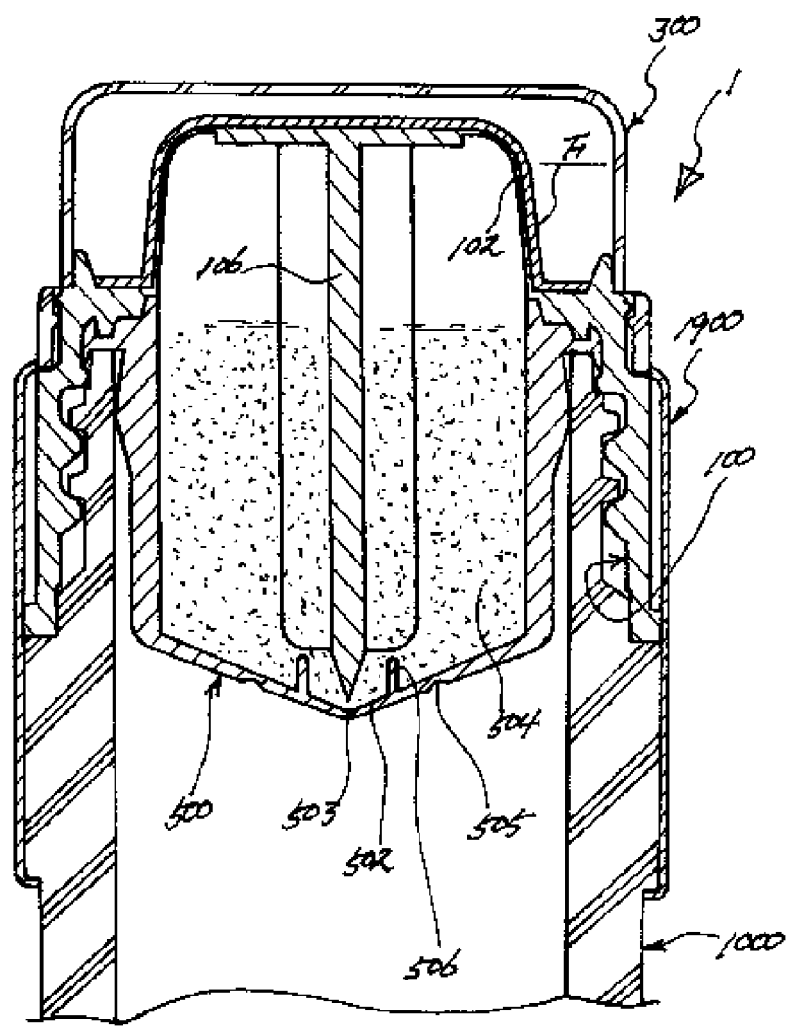

[Fig. 86]
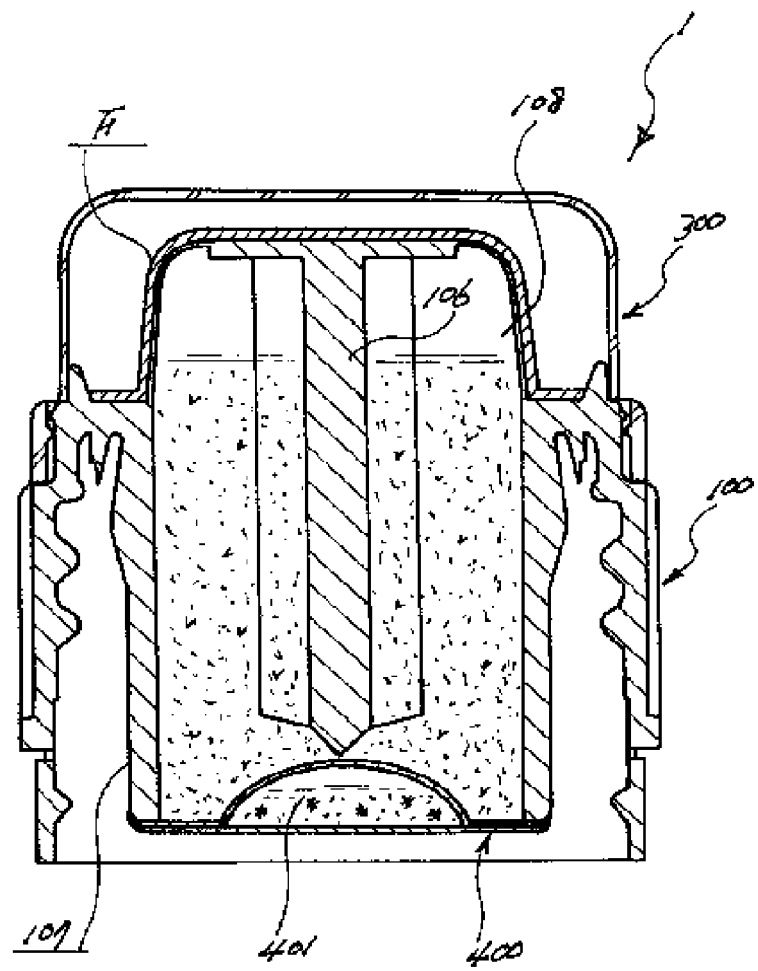
[Fig. 87]
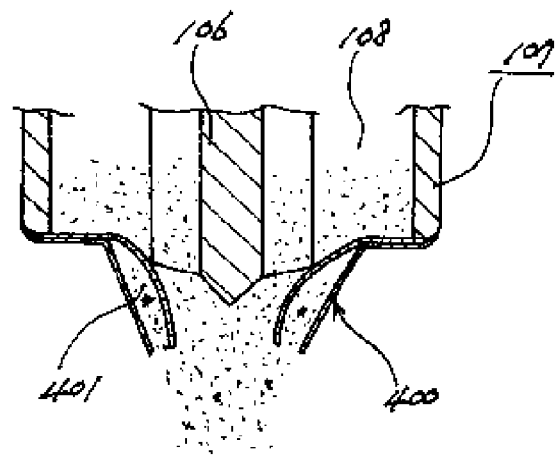

[Fig. 88]
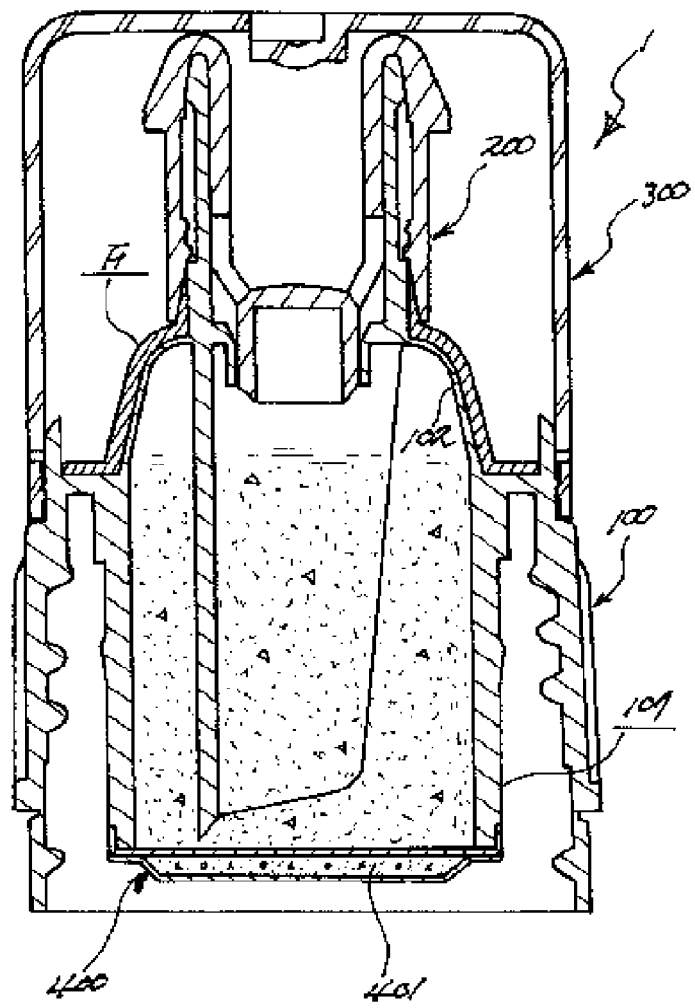

[Fig. 89]
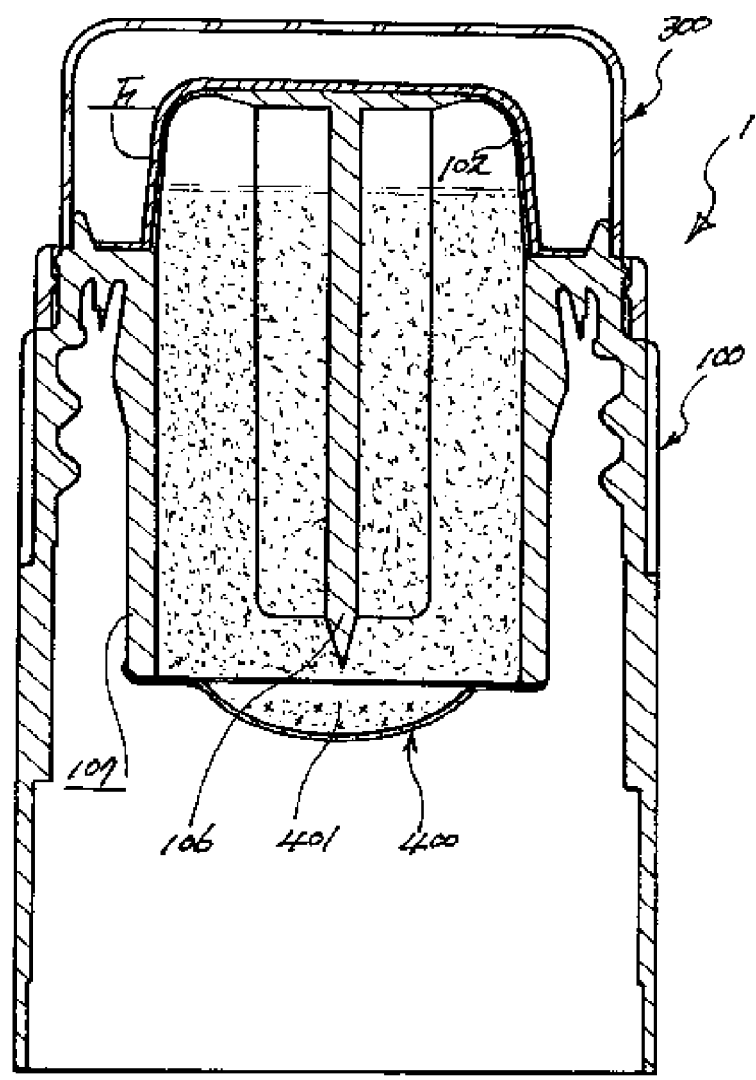

[Fig. 90]
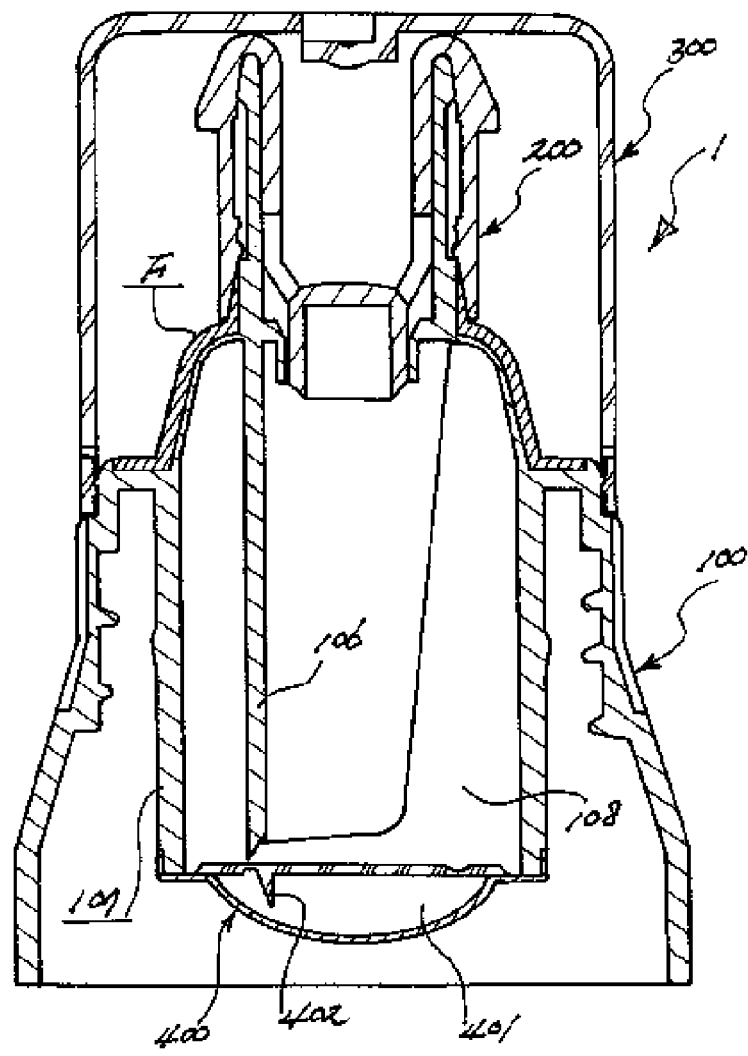

[Fig. 91]
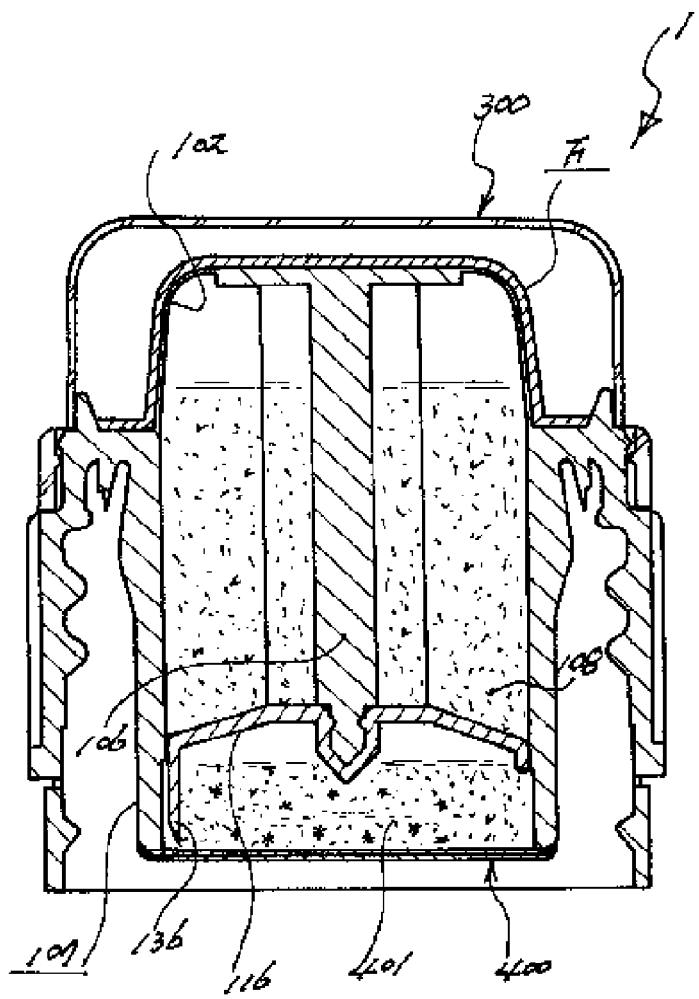

[Fig. 92]
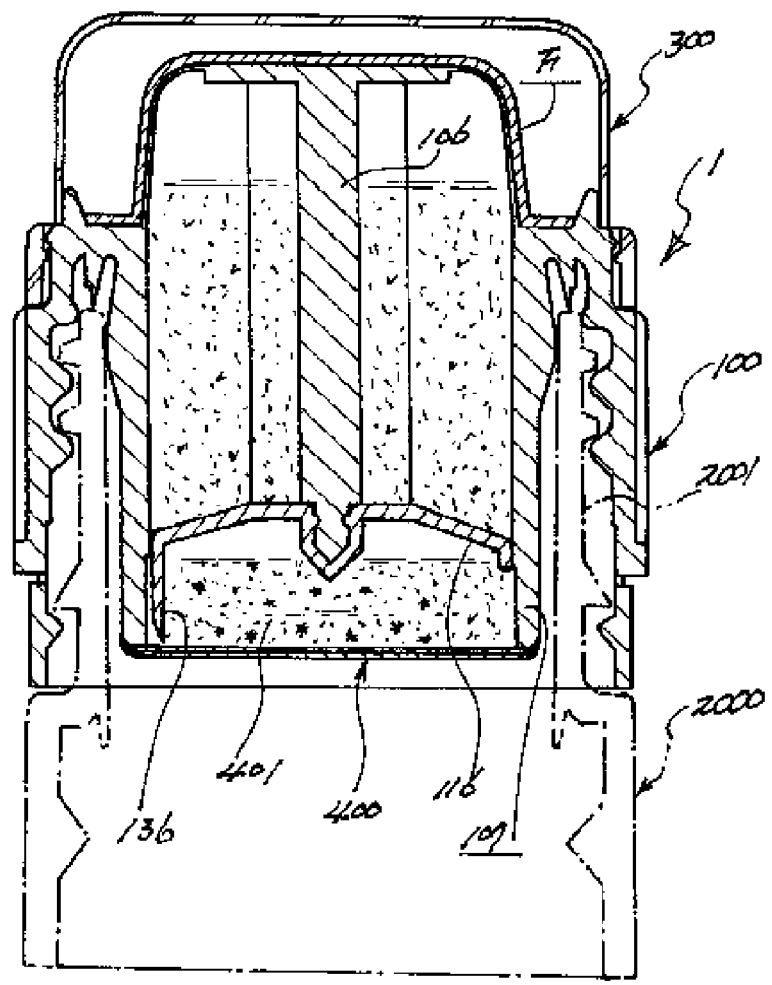

[Fig. 93]
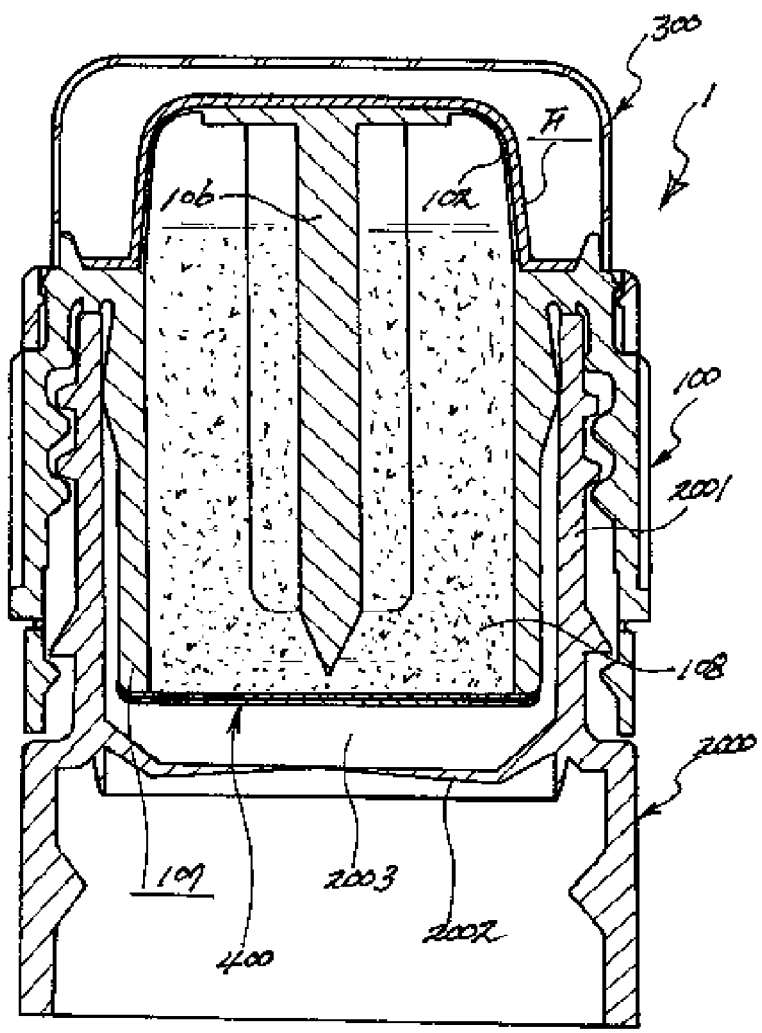

[Fig. 94]
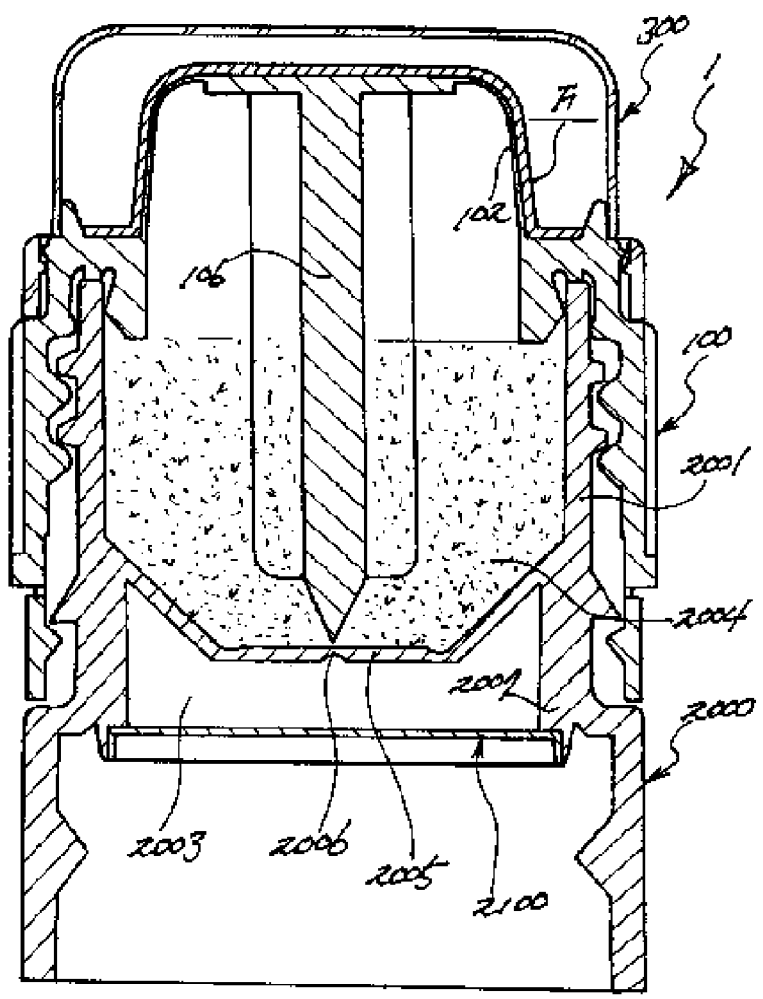

[Fig. 95]
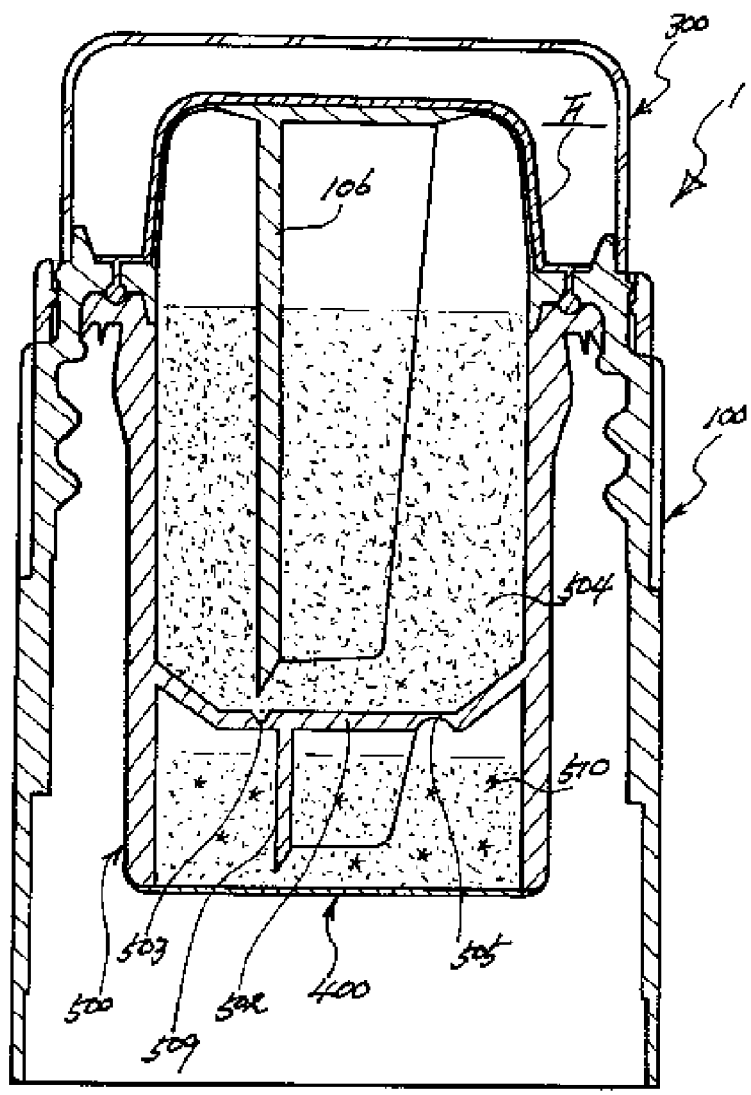

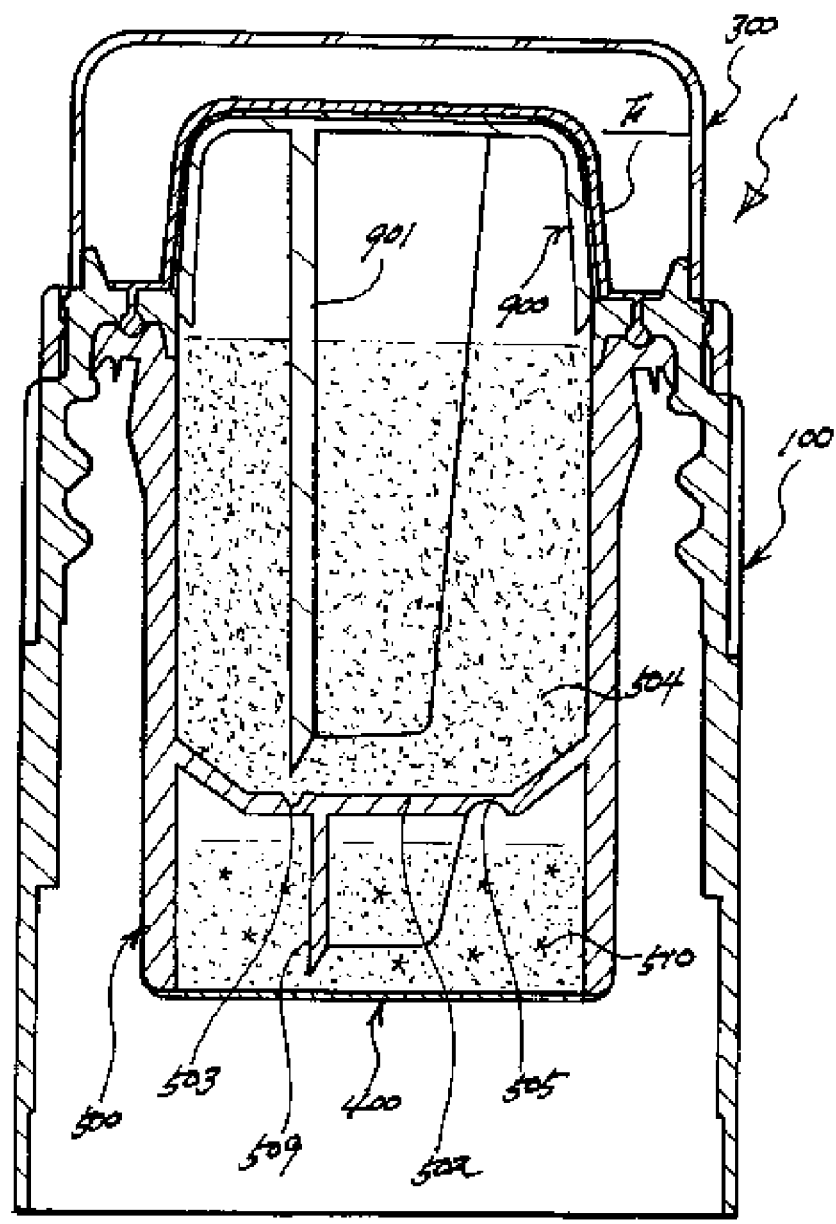
[Fig. 96]

[Fig. 97]
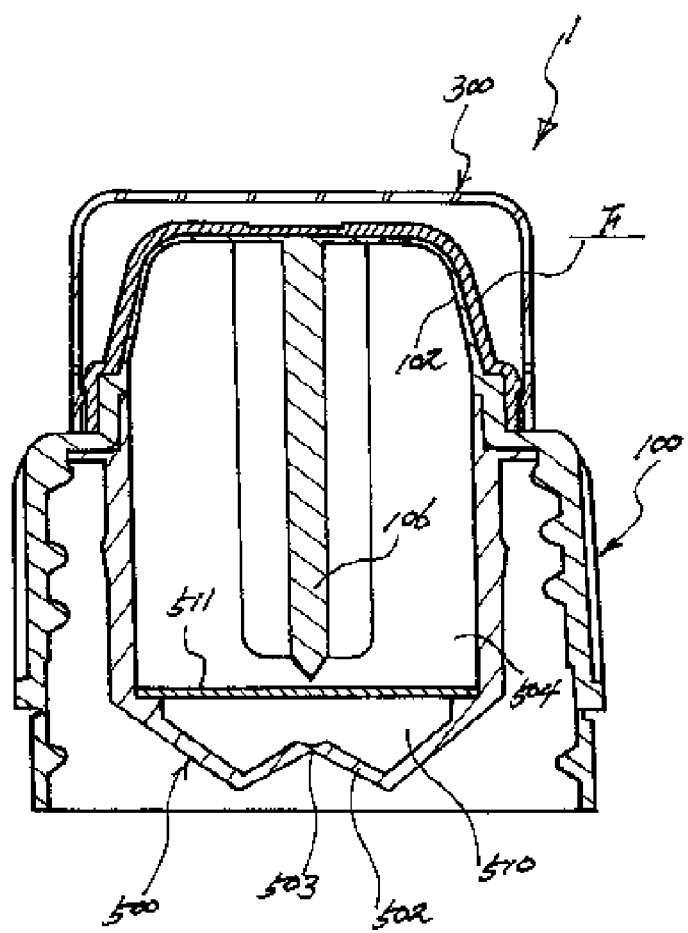

[Fig. 98]
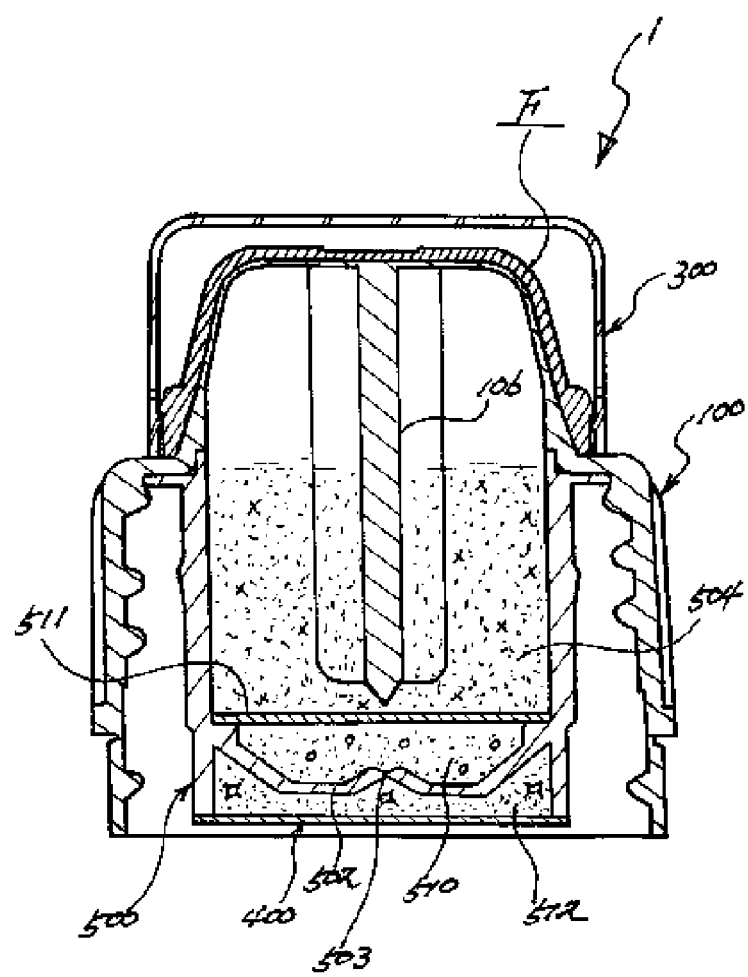

[Fig. 99]
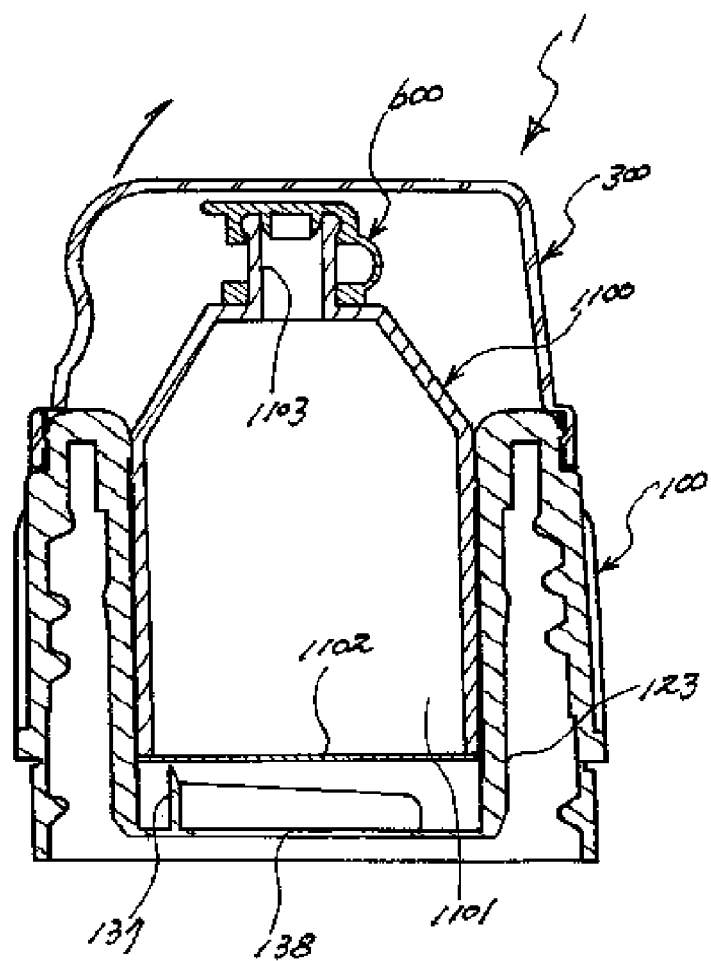

[Fig. 100]
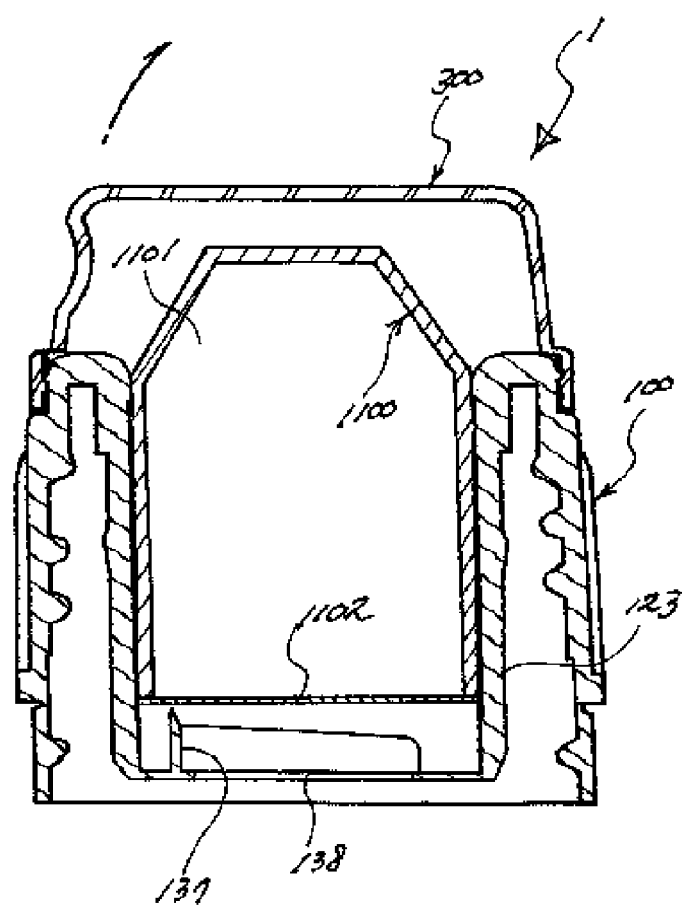

[Fig. 101]
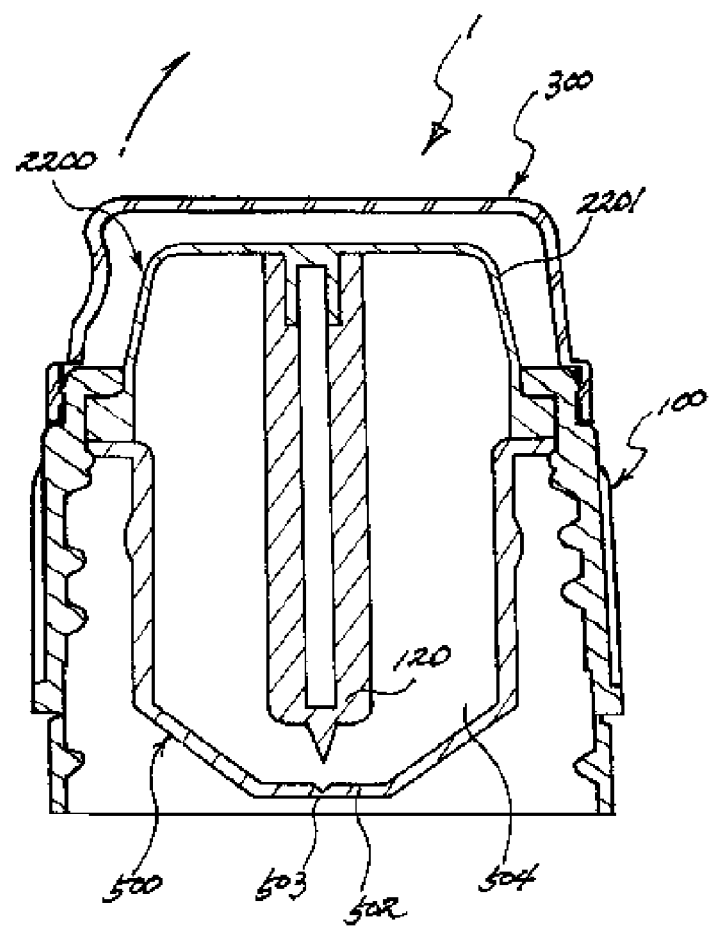

[Fig. 102]
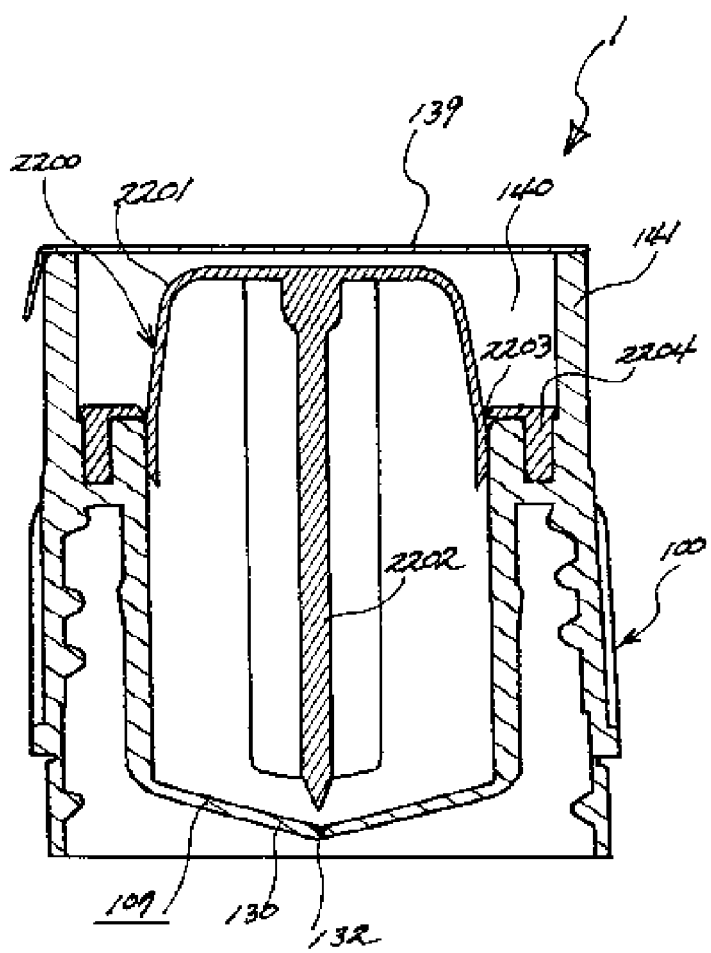

[Fig. 103]
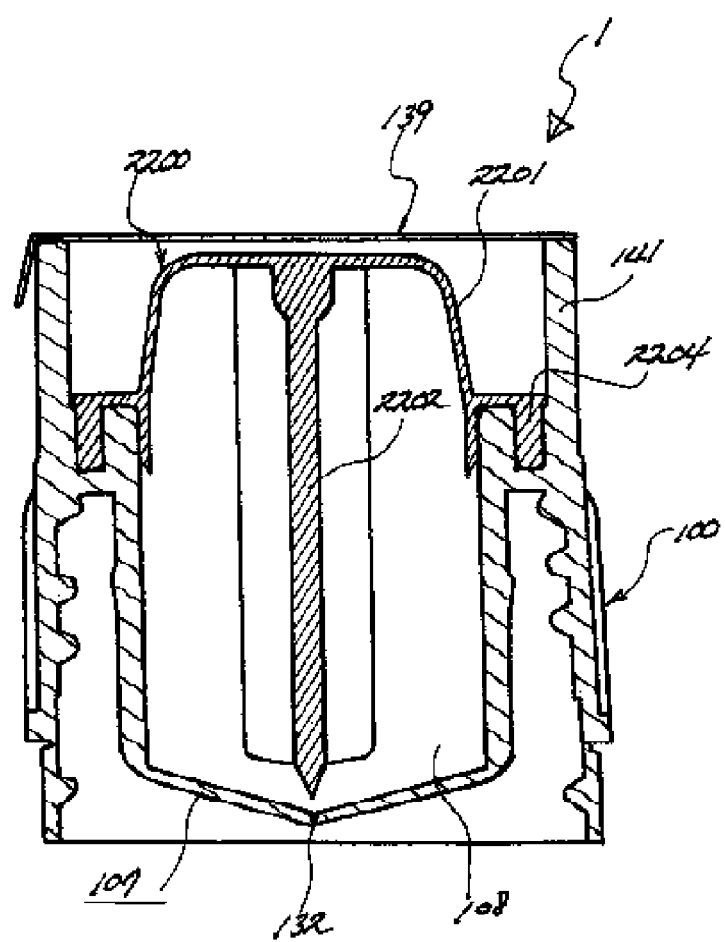

[Fig. 104]
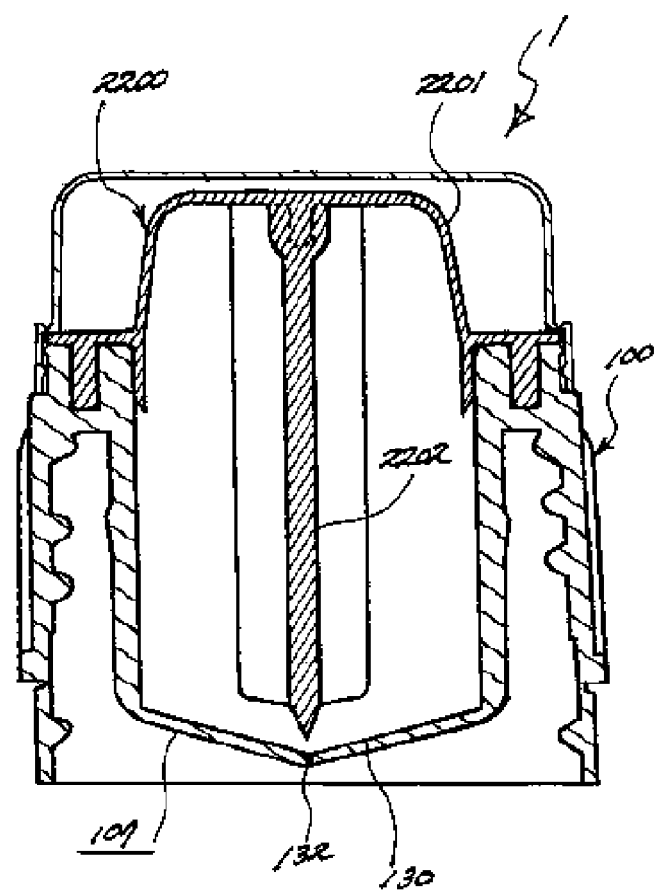

[Fig. 105]
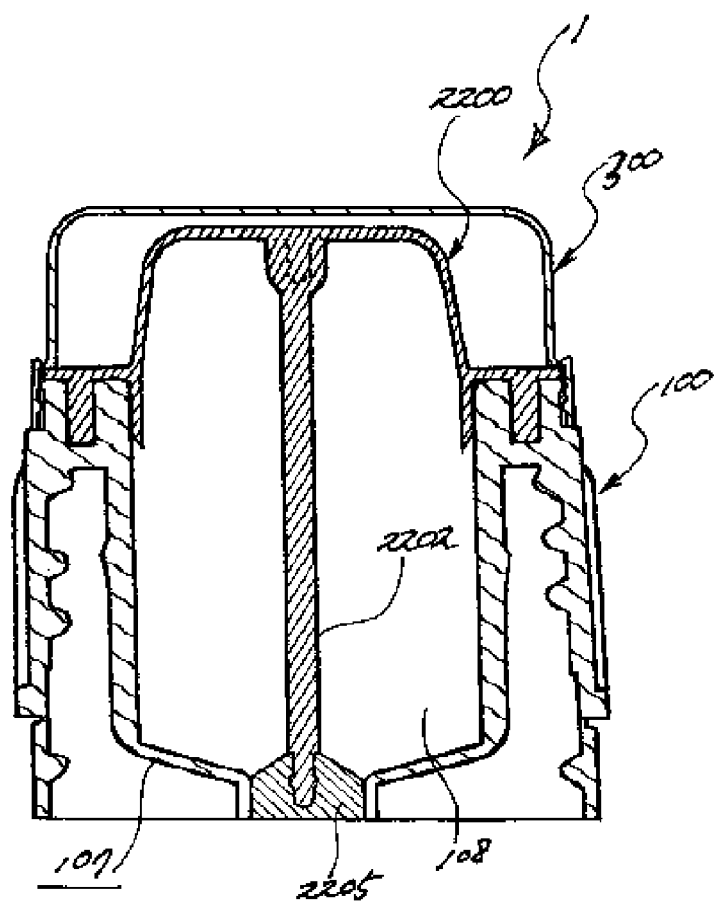

[Fig. 106]
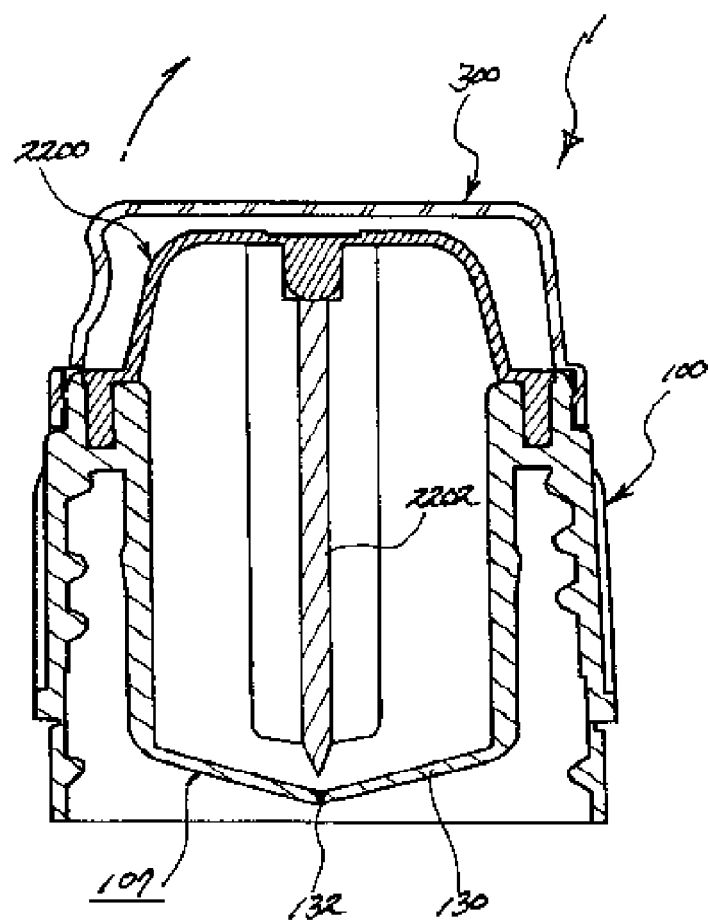

[Fig. 107]
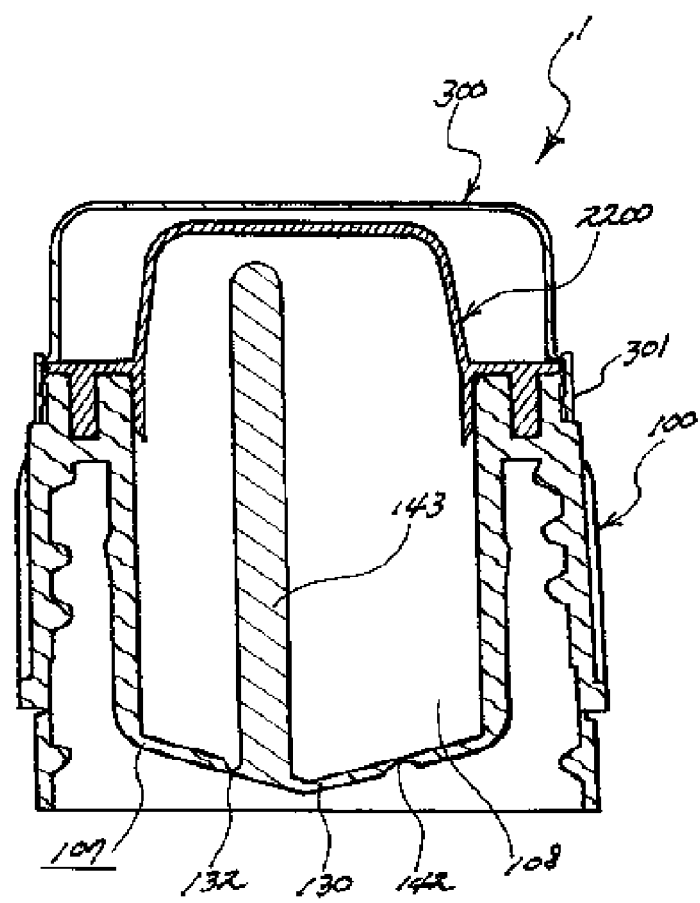

[Fig. 108]
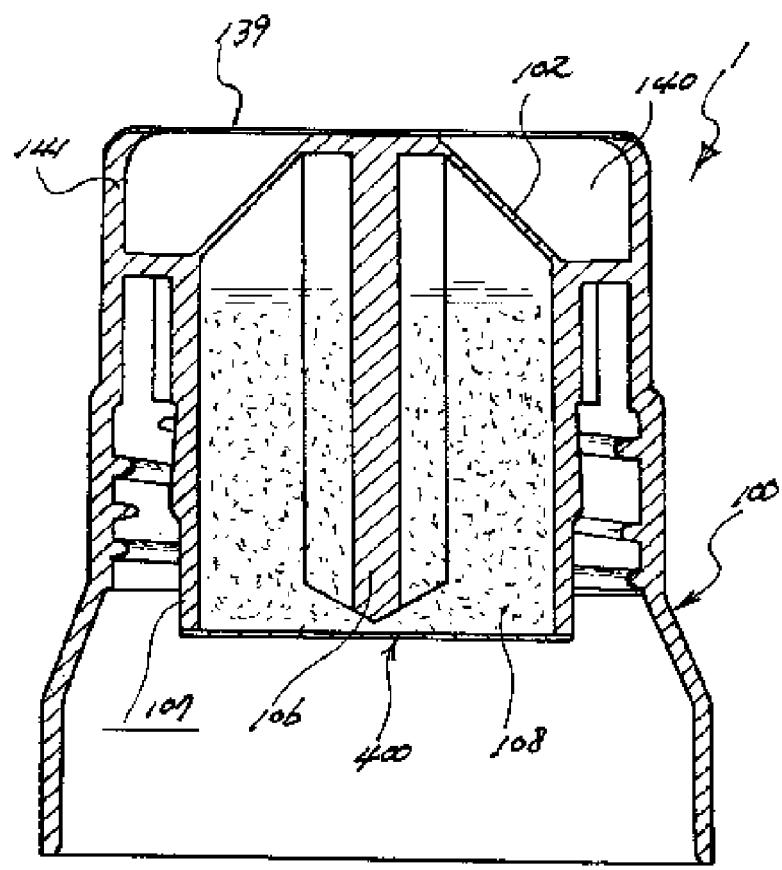

[Fig. 109]
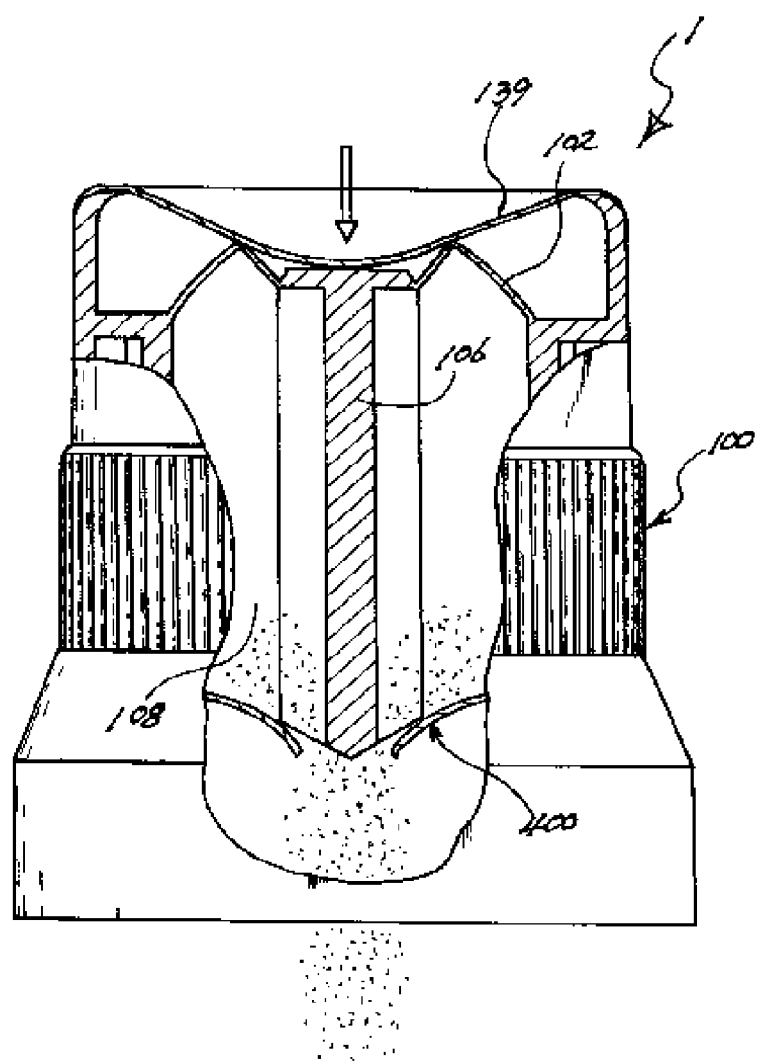

[Fig. 110]
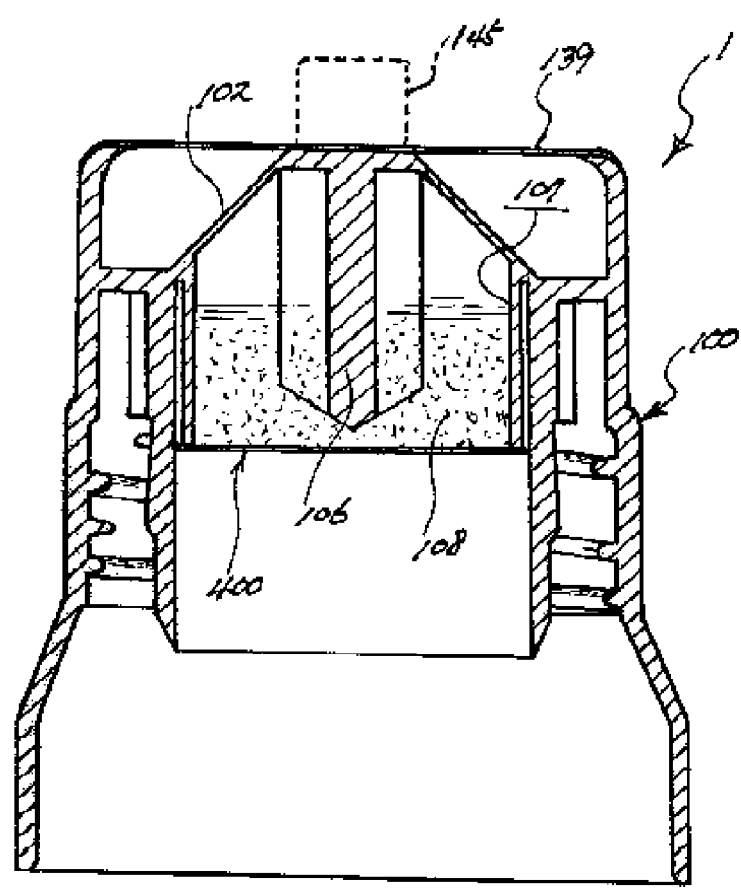

[Fig. 111]
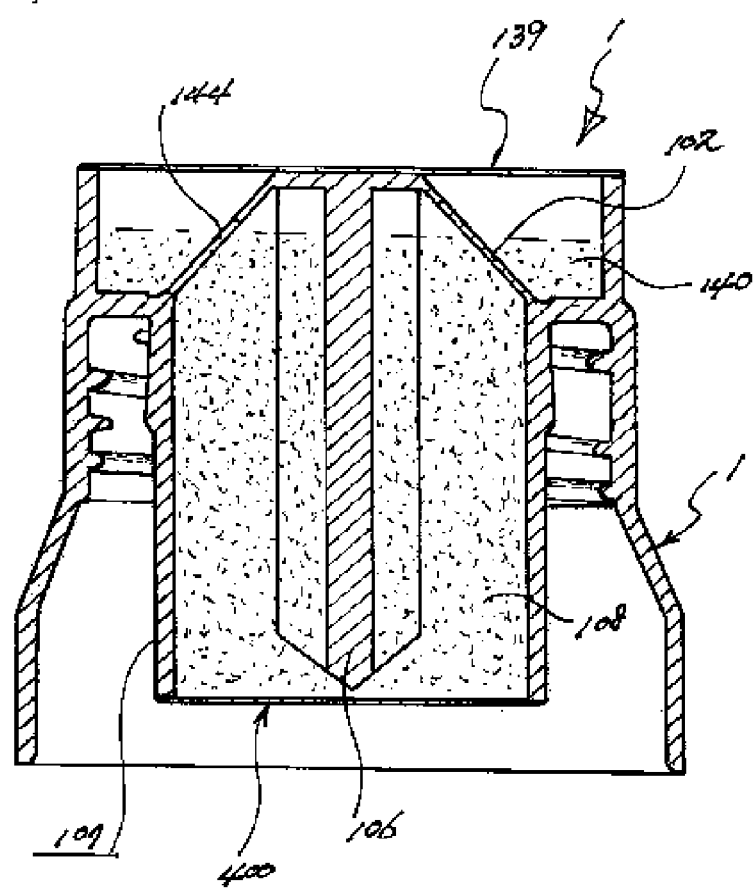

[Fig. 112]
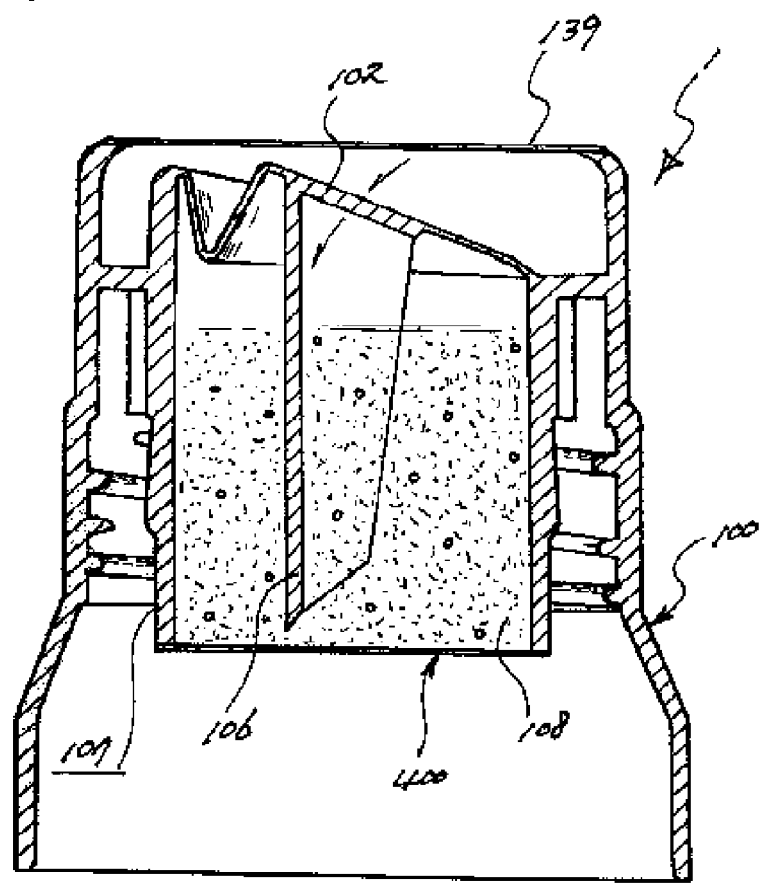

[Fig. 113]
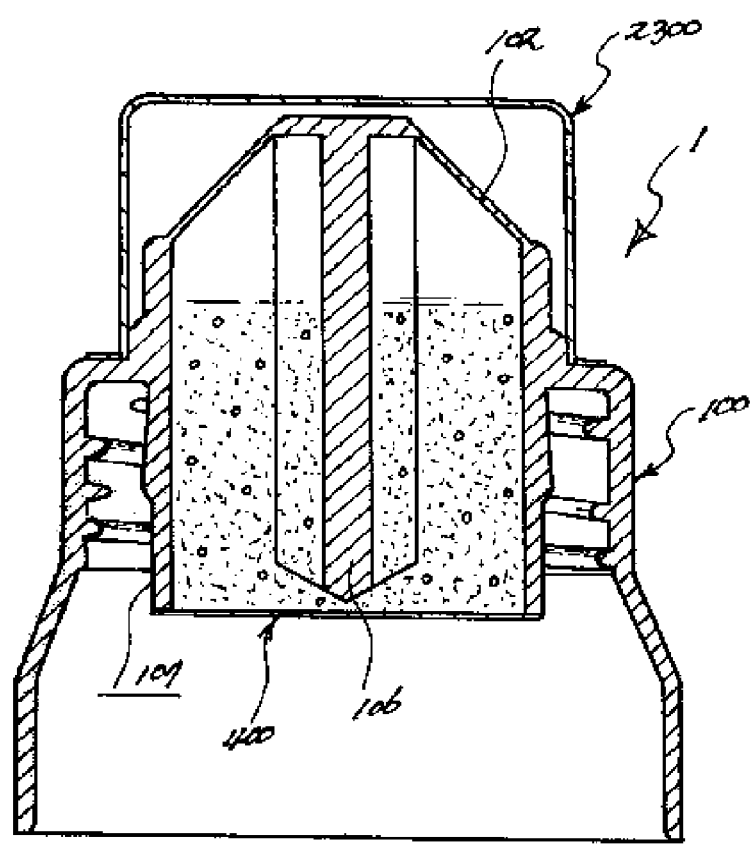

APPARATUS FOR RECEIVING HETEROGENEOUS MATERIALS

CROSS-REFERENCE TO RELATED APPLICATION

This Application is a Section 371 National Stage Application of International Application No. PCT/KR2011/009238, filed Nov. 30, 2011 and published as WO 2012/074301 on Jul. 6, 2012, not in English, the contents of which are hereby incorporated by reference in their entirety.

TECHNICAL FIELD

The present invention relates to a heterogeneous material receiving apparatus in which the other foldable part is integrally injection-molded to a main body.

BACKGROUND ART

There are related arts disclosed in Japanese Patent Application No. 3,432,533 and PCT/KR2009/00072.

DISCLOSURE OF THE INVENTION

Technical Problem

Japanese Patent No. 3,432,533 (Japanese Patent Application, 1992.09.10) (see FIGS. 37 to 40) discloses a technology in which a receiving part is defined in a foldable part having a dome shape, and when the receiving part is pressed, the foldable part is folded downward, and simultaneously, heterogeneous materials stored in a storage space having a dome shape drop down into a container, thereby mixing the content with the heterogeneous material. The present invention has improved restoring and barrier properties by double injection-molding a foldable having a dome shape with a soft material such as silicon.

Particularly, in a case of a general foldable part, there is a disadvantage that the foldable part is not easily folded downward when the foldable part is integrated with a main body. This is done because, if the foldable part has a thin thickness, the foldable part is easily folded, but the barrier property is deteriorated to spoil a content, and thus the foldable part is injection-molded with a thickness greater than a predetermined thickness.

In addition, when the foldable part is thin, a receiving part for storing heterogeneous materials is manufactured by using separate aluminum sheets, and then a content is stored in a storage space defined by the aluminum sheets facing each other. Thus, the storage space may be narrowed.

Also, a foldable part having a physical property equal to that of robber may be separately manufactured and then be fitted into an upper portion of the main body. In this case, a separate coupling part is needed.

PCT/KR2009/00072 discloses a technology in which, when an upper sealing part having a sheet shape is removed, and a foldable part is pressed, a storage space is opened. This invention relates to an improvement invention of the invention disclosed in Japanese Patent No. 3,432,533.

For another example, US Patent Publication No. 2010-960 discloses a feature in which a soft material is assembled with an upper portion of a main body. This invention has the same idea as that disclosed in U.S. Pat. No. 3,347,410 or 6,305,576.

The inventions disclosed in US Patent Publication No. 2011-174642 and U.S. Pat. No. 7,874,420 relate to a dependent invention of the invention disclosed in PCT/KR2009/00072.

In case of U.S. Pat. No. 6,305,576, although a foldable part itself is coupled to an inner stopper part in a prefabricated manner, it is not easy to screw-couple the foldable part formed of a soft material to the inner stopper part. Also, it takes a long time to couple the foldable part to the inner stopper part after a content is put into a storage space. Here, sealability is significantly different depending on the assembling method of the foldable part.

Technical Solution

In one embodiment, an apparatus for receiving a heterogeneous material, which is coupled to a hole part of a container containing a content such as liquid includes: a main body coupled and fixed to a hole part of the container; and a receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material, and a foldable soft resin is added to the foldable connection part.

The foldable part may be molded on an upper portion of the foldable connection part by using the soft resin in a co-injection manner, a main body hole part may be disposed on an upper portion of the foldable connection part, and a check valve may be disposed within the main body hole part.

An openable sealing stopper or a hinge-type sealing stopper may be coupled to the main body hole part, and a prefabricated receiving part may be coupled to the inside of the main body.

In another embodiment, an apparatus for receiving a heterogeneous material, which is coupled to a hole part of a container containing a content such as liquid includes: a main body coupled and fixed to a hole part of the container; and a receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material.

When a foldable part is added to the foldable connection part, the foldable part is selected from miniatures, characters, letters, figures, or various shapes.

The foldable part may be molded by co-injection.

In further another embodiment, an apparatus for receiving a heterogeneous material, which is coupled to a hole part of a container containing a content such as liquid includes: a main body coupled and fixed to a hole part of the container; and a receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material, and a configuration part is disposed on the foldable connection part, When the foldable part is added to the foldable connection part, the configuration part may be selected from miniatures, characters, letters, figures, or various shapes, and the foldable part may be injection-molded by a co-injection molding machine.

The foldable connection part may be coated with a material having a barrier property or adheres through deposition or thermal contraction, and a cover may be coupled to an upper portion of the main body.

The foldable connection part may include an auxiliary foldable part on a side opposite to a foldable reference surface so that the foldable part is folded in one side direction with respect to the foldable reference surface.

In further another embodiment, an apparatus for receiving a heterogeneous material, which is coupled to a hole part of a container containing a content such as liquid includes: a main body coupled and fixed to a hole part of the container; and a receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material, and the foldable connection part is injection-molded by a co-injection molding machine.

A rotational sealing stopper may be coupled to the main body hole part, and the rotational sealing stopper may be protected by a cover part on the upper portion of the main body.

A protective cover may be coupled to the main body hole part.

The protective cover may have a top surface and a side surface, and a cover body may be disposed on a center of the protective cover, wherein the cover body may form a boundary with an outer cover by a cover top surface cutoff line and be configured so that a cover sealing part sealing the main body hole part is connected to a portion of a cover antiforgery frame constituting a lower end of the outer cover by a cover connection part.

A portion of the foldable part added to the upper portion of the foldable connection part may include a soft part in which a syringe needle is insertable.

In further another embodiment, an apparatus for receiving a heterogeneous material, which is coupled to a hole part of a container containing a content such as liquid includes: a main body coupled and fixed to a hole part of the container; and a receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material, and the foldable connection part is injection-molded by a co-injection molding machine.

In further another embodiment, an apparatus for receiving a heterogeneous material, which is coupled to a hole part of a container containing a content such as liquid includes: a main body coupled and fixed to a hole part of the container; and a prefabricated receiving part having a storage space within the main body, wherein the inner storage space of the receiving part is configured so that a foldable connection part and an opening part defined under the foldable connection part breaks a receiving part sealing part sealing a lower end of the receiving part to allow the content within the receiving part storage space to drop into the container, thereby mixing the content with the heterogeneous material, and the foldable connection part is injection-molded by a co-injection molding machine.

The prefabricated receiving part may be configured so that, while the foldable connection is folded downward, a cutoff protrusion piece breaks a receiving part cutoff line defined in the receiving part to open the storage space of the receiving part.

In further another embodiment, an apparatus for receiving a heterogeneous material, which is coupled to a hole part of a container containing a content includes: a main body coupled and fixed to a hole part of the container; and a foldable part formed of a material having a barrier property on an upper portion of the main body, wherein a prefabricated opening end designed to move downward is disposed on a lower portion of the foldable part, and a lower end of an opening end guide of the main body on which the prefabricated opening end is disposed is sealed by a receiving part sealing part.

The foldable part may be molded by a co-injection machine.

In further another embodiment, an apparatus for receiving a heterogeneous material, which is coupled to a hole part of a container containing a content includes: a main body coupled and fixed to a hole part of the container; and a foldable part formed of a material having a barrier property on an upper portion of the main body, wherein an insertable receiving part designed to move downward is disposed on a lower portion of the foldable part, and the heterogeneous material is stored within the insertable receiving part, and an end of the insertable receiving part is sealed by a lower sealing part, wherein the lower sealing part is punched by an opening guide pin disposed on an opening end guide part of the main body.

In further another embodiment, an apparatus for receiving a heterogeneous material, which is coupled to a hole part of a container containing a content includes: a main body coupled and fixed to a hole part of the container; and a receiving part having a storage space, the receiving part being integrated or assembled with the inside of the main body, wherein the storage space of the receiving part is sealed by a foldable part, and the foldable part is configured so that, when a rotational operable sealing stopper rotatably assembled with an upper portion of the main body rotates, a receiving part sealing part sealing the storage space of the receiving part is opened.

In further another embodiment, an apparatus for receiving a heterogeneous material, which is coupled to a hole part of a container containing a content includes: a main body coupled and fixed to a hole part of the container; and a receiving part having a storage space, the receiving part being integrated or assembled with the inside of the main body, wherein the storage space of the receiving part is sealed by a foldable part or a foldable connection part, and the foldable part or the foldable connection part is configured so that, when a rotational operable sealing cover rotatably assembled with an upper portion of the main body rotates, a receiving part sealing part or an opening part of a prefabricated receiving part which seals the storage space of the receiving part is opened.

A second storage space may be defined in a lower portion of the storage space of the receiving part, and the second storage space may be defined within the receiving part sealing part sealing a lower end of the receiving part.

Advantageous Effects

The soft foldable part may be pressed to mix the heterogeneous material to improve convenience. In addition, the foldable part may be manufactured through the double injection molding (co-injection molding) by using the material having the barrier property to improve conservative property of the content.

BRIEF DESCRIPTION OF THE DRAWINGS

FIGS. 1 to 16 are views illustrating a first embodiment of the present invention, and FIG. 1 is a cross-sectional view of a main body, FIG. 2 is a cross-sectional view illustrating a state in which an upper portion of a primarily injection-molded foldable connection part of the main body is secondarily injection-molded, FIG. 3 is a view of a state in which a check valve is integrally injection-molded to an inside portion of a sealing corresponding part of the main body, FIG. 4 is a view of a state in which a sealing stopper is assembled around a main body hole part of the main body, FIG. 5 is a view of a state in which a heterogeneous material is being put into a storage space after a cover is assembled to an upper portion of the main body, FIG. 6 is a view of a state in which an end of a receiving part is sealed using a receiving part sealing part after a content is put into the storage space of the main body, FIG. 7 is a perspective view of a finished receiving apparatus, FIG. 8 is a view illustrating a modified example of a main body of the receiving apparatus, FIG. 9 is a perspective view of FIG. 8, FIG. 10 is a cross-sectional view of a main part showing an example in which the foldable part is folded, FIG. 11 is a cross-sectional view of a main part in a state where the sealing stopper is opened, FIG. 12 is a cross-sectional view of an exemplary example in which a cover coupled to an upper portion of the main body of the receiving apparatus is variously modified, FIG. 13 is a view of an exemplary example in which the foldable part is widely changed in structure, FIG. 14 is a cross-sectional view of an exemplary example in which the receiving part defined within the main body is substituted with a prefabricated receiving part, FIG. 15 is a view of an exemplary example in which the foldable part applied to the upper portion of the main body has various shapes for pressing the foldable part having a protruding dome shape, FIG. 16 is a view of a state in which the receiving part sealing part is opened, FIGS. 17 to 22 are views of a foldable part according to various embodiments of the present invention, and FIGS. 17 to 19 are perspective views of the foldable part on which various miniatures or characters are displayed, FIG. 20 is a view of an example in which a transparent window is provided in a central portion of the foldable part, FIG. 21 is a view of an example in which a cover is coupled to the foldable part, FIG. 22 is a view of an example in which the foldable part is eccentrically folded, FIGS. 23 and 39 are views of another embodiment of the present invention, and FIGS. 23 to 25 are cross-sectional views of an example in which a check valve or a discharge device (a sealing stopper) having various shapes is provided to a main body hole part of a main body, FIGS. 26 to 39 are views of an example of a protective cover coupled around the main body hole part of the main body, and FIG. 26 is a perspective view of a receiving apparatus to which a protective cover is assembled, FIG. 27 is a cross-sectional view of the main body, FIG. 28 is a perspective view of the protective cover, FIG. 29 is a perspective view illustrating a modified example of the protective cover, FIG. 30 is a cross-sectional view of the receiving apparatus to which the protective cover is assembled with an upper portion of the main body, FIG. 31 is a view of a state in which an outer cover is removed in the state of FIG. 30, FIG. 32 is a perspective view of an example in which the receiving apparatus is coupled to a container as shown in FIG. 31, FIG. 33 is a perspective view of a state in which an upper portion of a cover main body is pushed to mix heterogeneous material in a container space part in the state of FIG. 32, FIG. 34 is a view of a state in which a cover sealing part is opened in the state of FIG. 33, FIGS. 35 to 37 are cross-sectional views illustrating a slightly modified example of a protective cover, and FIG. 35 is a cross-sectional view of the receiving apparatus, FIG. 36 is a view of a state in which the outer cover is removed in the state of FIG. 35, FIG. 37 is a view of a state in which a cover main body is pressed in the state of FIG. 36, FIG. 38 is a view of an example in which the protective cover is coupled to a receiving apparatus including a main body having a modified shape, FIG. 39 is a cross-sectional view of the receiving apparatus in which a protective cover changed in design is coupled to the main body having various shapes, FIGS. 40 to 46 are views illustrating possibility of various objects through a modified example of the present invention, and FIG. 40 is a cross-sectional view of a state in which an openable cover having a hinge (connection part) shape is assembled with an upper portion of the main body of the receiving apparatus, FIG. 41 is a view illustrating a possibility in which the foldable part disposed on the upper portion of the main body is injection-molded in various manners by partially changing a design as necessary, FIG. 42 is a view illustrating an exemplary configuration of an opened end for opening the receiving part sealing part, FIG. 43 is a view illustrating possibility in which the foldable part is folded in one direction, FIGS. 44 and 45 are cross-sectional views illustrating a variation of an adhesion section of the receiving part, and FIG. 44 is a cross-sectional view of the receiving apparatus.

FIGS. 45A to 45C are views of a main part showing variously modified examples of a receiving part adhesion section, FIG. 46 is a cross-sectional view of the receiving apparatus in which an opening part for opening the receiving part sealing part is substituted with a prefabricated opening part, FIGS. 47 to 51 are view of further another embodiment of the present invention, and FIG. 47 is a view illustrating possibility in which a foldable part disposed on an upper portion of a foldable connection part is coated with a foil or other materials having a barrier property or vacuum-deposited or thermally adheres, FIG. 48 is a view of a state in which the foldable part formed of a material having a barrier property is thermally bonded to an upper portion of the foldable connection part of the main body, FIGS. 49 to 50 are views of a state in which the material having the barrier property is coated, deposited, or bonded to the upper portion of the foldable connection part, FIG. 51 is a view of a state in which a foldable part is coupled to the upper portion of the foldable connection part in a fitting manner, FIGS. 52 to 57 are views of a further another example of the present invention, and FIG. 52 is a view of an example in which the receiving part is substituted with a prefabricated receiving part within the main body, FIG. 53 is a cross-sectional view of the prefabricated receiving part according to FIG. 52, FIG. 54 is a cross-sectional view of a main part in a state in which a sealing surface of the prefabricated receiving part is broken and then opened when the foldable part is pressed, FIG. 55 is a cross-sectional view of one application example of the prefabricated receiving part, FIG. 56 is a view illustrating a modified example of the prefabricated receiving part, FIG. 57 is a cross-sectional view of the modified prefabricated receiving part and a receiving apparatus having a different structure of the prefabricated receiving part, FIGS. 58 and 59 is a cross-sectional view of a receiving apparatus in which a prefabricated opening end or an insertable receiving part is coupled to the inside of a main body, FIGS. 60 to 75 are cross-sectional views illustrating a state in which an operable sealing stopper and a rotational operable cover are coupled to the upper portion of the main body, FIG. 61 is a cross-sectional view of a min part in a state in which the foldable part is folded downward when the operable sealing stopper rotates, FIG. 62 is a view of a state in which a sanitary cover is added, FIG. 63 is a view illustrating a modified example of the operable sealing stopper, FIG. 64 is a view of a state in which the prefabricated opening end is coupled to the inside of the main body of the receiving apparatus, FIG. 65 is a view illustrating an another modified example of the operable sealing stopper, FIGS. 66 and 67 are views of an example in which the prefabricated receiving part is coupled to the inside of the main body, FIGS. 68 and 69 are views of an example in which a main body hole part moves upward, and the foldable part is spread upward to break the receiving part sealing part of the receiving part when the operable sealing stopper operates, FIG. 70 is a view of a state in which the rotational operable cover is coupled to the upper portion of the main body, FIG. 71 is a view of a state in which a material having a barrier property is added to an upper portion of a foldable connection part, FIG. 72 is a view of a state in which an inner sealing part is added to the inside the rotational operable cover to improve the barrier property, FIGS. 73 and 74 are views of an example designed so that the foldable part moves upward, and a storage space is opened when the rotational operable cover rotates, FIG. 75 is a view of an example designed so that the foldable part is further coupled to the main body to open the storage space when the rotational operable cover rotates, FIGS. 76 to 84 are views of a further another modified example of the receiving apparatus, and FIG. 76 is a view of an example in which the receiving apparatus is assembled with a container, and then a contraction film is enclosed to improve safety of a product, FIG. 77 is a view of a state in which the receiving apparatus having a cup shape is coupled to a container, FIGS. 78 to 80 are views of an example in which the receiving apparatus is manufactured in the cup shape, FIGS. 81 and 82 are views perspective view of the receiving apparatus having the cup shape, FIG. 83 is a view illustrating a use example of the receiving apparatus, FIG. 84 is a view of an example in which a film adhesion surface is provided to the receiving apparatus so that a pouch container is applicable, FIG. 85 is a view of an example in which the receiving apparatus is coupled to the container through an external metal packaging formed of aluminum or the like, FIGS. 86 to 98 are views of an example in which a plurality of storage spaces are defined within the receiving apparatus, FIGS. 99 and 100 are views of a state in which an insertable receiving part is coupled to the inside of the main body, FIGS. 101 and 107 are views of an example in which a prefabricated foldable part is provided to the main body in various manners, and FIGS. 108 to 113 are views of various examples in which a material having a barrier property is added to an upper portion of a foldable connection part.

BEST MODE FOR CARRYING OUT THE INVENTION

Hereinafter, embodiments of the present invention will be described with reference to FIGS. 1 to 16.

An apparatus 1 for receiving a heterogeneous material, which is coupled to a hole part of a container containing a content such as liquid includes a main body 100 coupled and fixed to the hole part of the container and a receiving part 107 having a storage space 108 within the main body 100. The storage space 108 within the receiving part 107 is configured so that a foldable connection part 102 disposed in an upper portion of the storage space 108 and an downward opened opening part 106 of the foldable connection part 102 breaks a receiving part sealing part 400 sealing a lower end of the receiving part 107 to allow a content within the storage space of the receiving part 107 to drop into the container, thereby mixing the content with the heterogeneous material.

Also, a foldable soft resin is added to the foldable connection part 103. Here, a rubber material such as silicone or a soft synthetic resin may be injection-molded by using a co-injection mold to form a foldable part F.

That is, a soft resin is injection-molded on the upper portion of the foldable connection part 102 through the co-injection molding to form the foldable part F.

A main body hole part 103 is disposed on an upper portion of the foldable connection part 102. As necessary, as shown in FIG. 3, a check valve CV is disposed within the main body hole part 103.

Also, an openable sealing stopper 200 or a hinge type sealing stopper is coupled to the main body hole part 103.

As described above, when coupled to the container in a state of FIG. 6, FIG. 6 illustrates a screw thread having a specific shape and disposed on an inner wall of a side surface part 101 of the main body 100. The screw thread is configured to be easily coupled to a neck of each of various containers.

When a cover 300 is removed in a state of FIG. 6 or 8, the cover is removed from an anti-forgery frame 301.

When the sealing stopper 200 is pressed in the above-described state, the foldable part F is folded as shown in FIG. 10, and simultaneously, the opening part 106 cuts the receiving part sealing part 400. In this process, heterogeneous material contained in the storage space 108 may drop into the container and then be mixed with each other.

As described above, when the mixed content push the sealing stopper 200 upward, as shown in FIG. 11, the sealing part 201 of the sealing stopper 200 gets out of a sealing corresponding part 105.

In this state, the mixed content within the container is discharged through a discharge space 202 of the sealing stopper 200.

Also, FIG. 12 illustrates a cover 300 having a different shape, and FIG. 13 illustrates possibility in which the foldable part F has various shapes.

FIG. 14 is a view of a state in which a prefabricated receiving part 500 is coupled to the inside of the main body 100. In detail, the prefabricated receiving part 5000 is assembled with a hook frame 109 in a manner in which an assembling frame is fitted into the hook frame 109.

Also, a sealing surface 502 disposed on a lower end of the prefabricated receiving part 500 is partitioned by a receiving part cutoff line 503, and a receiving part storage space 504 is defined above the sealing surface 502.

As described above, in use, an end of the opening part 106 breaks the receiving part cutoff line 503. In this process, the sealing surface 502 is opened, and simultaneously, the content within the receiving part storage space 504 drop down and are mixed.

Also, as shown in FIGS. 17 to 20, the foldable part F is added to the foldable connection part. The foldable part F may be selected from miniatures, characters, letters, figures, or various shapes. Also, the foldable part F may be molded by co-injection.

Also, as shown in FIG. 20, a transparent wind 111 is disposed in a center of the foldable part F so that the heterogeneous material within the storage space is distinguished.

In the present invention as described above, the foldable connection part 102 may be coated with a material having a barrier property or adhere through deposition or thermal contraction.

Also, the cover 300 is coupled to the upper portion of the main body 100 to protect the foldable part F.

As shown in FIG. 22, the foldable connection part (the foldable part F) may include an auxiliary foldable part 113 disposed on a side opposite to a foldable reference surface 114 so that the foldable part F is folded toward one side with respect to the foldable reference surface 114. In use, when the auxiliary foldable part 113 is pressed, the receiving part sealing part 400 of the opening part 106 is opened.

Also, as shown in FIG. 23, the check valve CV is disposed in the main body hole part 103, and the cover 300 is assembled with an upper portion of the main body hole part 103. Here, a hold part sealing part 306 of the cover 300 is closely attached to the check valve CV.

In a case of FIG. 23, when an opening guide part 305 of the cover 300 is lifted, a separation cutoff line 305 is broken, and thus the hole part sealing part 306 ascends. The cover 300 is fixed to the main body 100 by a cover connection part 307.

In a case of FIG. 24, a hinge type sealing stopper 600 is coupled to the main body hole part 103 of the main body 100. In use, when the cover 300 assembled with the upper portion of the main body hole part 103 is removed to lift the guide part 601, the hinge type sealing stopper 600 is opened. Thus, the hinge type sealing stopper 600 is connected to the main body hole part 103 by a stopper connection part 602.

Also, as shown in FIG. 25, a rotational sealing stopper 700 is coupled to the main body hole part 103. The rotational sealing stopper 700 is disposed on the upper portion of the main body 100 and protected by the cover part 702.

As described above, in use of the present invention, when a rotational sealing stopper body 701 is pressed, the cover part cutoff line 703 is broken, and simultaneously, the opening part 106 descends to mix the content of the receiving part 107.

Alternatively, the cover part 702 may be removed first, and then the rotational sealing stopper 700 may be pressed.

In another embodiment, as shown in FIGS. 26 to 39, a protective cover 800 is coupled to the main body hole part 103. The protective cover 800 has a top surface 807 and a side surface 806. Also, the cover body 801 is disposed on a center of the protective cover 800. The cover body 801 forms a boundary with an outer cover 805 by a cover top surface cutoff line 809. In the cover body 801, a cover sealing part 802 sealing the main body hole part 103 is connected to a portion of the cover anti-forgery frame 808 constituting a lower end of the outer cover 805 by the cover connection part.

As described above, according to the present invention, when the outer cover 805 is removed, a state shown in FIG. 32 may become. In this state, when the cover body 801 is pressed, as shown in FIG. 33, the foldable part F is folded, and thus, the content drops into an inner container space part 1002 of a container 1000 and are mixed with each other.

Also, when it is intended to discharge the mixed content, if the cover guide part 803 is lifted, as shown in FIG. 34, the cover sealing part 802 is opened.

Also, as shown in FIG. 30, if a vertical space 810 is defined in an upper side, and a horizontal space 811 is defined in a side surface to form the cover connection part 804, a mold may be easily manufactured, and also, the injection molding may be easily performed.

FIGS. 35 to 37 illustrate a state in which the protective cover 800 is used for the receiving apparatus 1 in a similar manner, and also, FIG. 37 illustrates a use state.

FIG. 38 illustrates a state in which the protective cover 800 is coupled to the main body 100 of the receiving apparatus 1 in other similar manner.

FIG. 39 illustrates a state in which the check valve CV is disposed on a portion of the sealing corresponding part 105, and the protective cover 800 in which a cover body sealing part 814 seals an upper portion of the check valve CV is coupled to an upper portion of the check valve CV.

In use, when the outer cover 805 is removed, and a sealing floating surface 815 is pressed, the opening part 106 opens the receiving part sealing part 400.

FIG. 4 illustrates a state in which a soft part 115 in which a syringe can be usable is disposed in a center of the foldable part F.

FIG. 42 illustrates a state in which an opening end 116 is disposed on an end of the opening part 106, and FIG. 43 illustrates a state in which the foldable reference surface 118 is disposed on a side opposite to a foldable pressing surface 117 protruding so that the foldable part F is folded toward one side.

In FIG. 44, an adhesion sectional surface 119 is provided as shown in FIG. 45A to expand a sectional area of the adhesion sectional surface 119 of the receiving part 107. As shown in FIG. 44, the receiving part 106 has a thickness "A" greater than that "A" of the adhesion sectional surface 119.

Also, in case of FIGS. 45B and 45C, a adhesion sectional surface 199B has a thickness B' greater than that B of the receiving part 107. In this case of 45C, a adhesion sectional surface 119C has a thickness C' greater than that C of the receiving part 107.

FIG. 46 illustrates a state in which a prefabricated opening part 120 is provided, and FIG. 47 illustrates a state in which a material having a barrier property is coated or deposited on the upper portion of the foldable connection part 102.

FIG. 48 illustrates a state in which a material having a barrier property such as a tray is disposed (coupled or adheres) to the upper portion of the foldable connection part 102.

FIGS. 49 and 50 illustrate an example in which the foldable part F formed of the material having the barrier property is formed through the coating or adhesion.

FIG. 51 illustrates an example in which the foldable part F is fitted into the upper portion of the foldable connection part 102. In this case, the barrier property may be improved.

In case of FIG. 52, the receiving apparatus 1 for receiving a heterogeneous material, which is coupled to a hole part of a container containing a content such as liquid includes a main body 100 coupled and fixed to the hole part of the container and a receiving part having a receiving part storage space 504 within the main body 100 and coupled to a prefabricated receiving part 500. The inner receiving part storage space 504 within the prefabricated receiving part 504 is configured so that a foldable connection part 102 disposed in an upper portion of the storage space 500 and an downward opened opening part 106 of the foldable connection part 102 breaks a receiving part sealing part 502 sealing a lower end of the prefabricated receiving part 500, i.e., a sealing surface 502 to allow contents within the receiving part storage space 504 of the prefabricated receiving part to drop into the container, thereby mixing the content with the heterogeneous material.

The foldable connection part 102 and a foldable part F are injection-molded by a co-injection molding machine.

Alternatively, an upper protrusion 506 is disposed on the sealing surface 502 so that the opening part 106 easily seals the sealing surface 502. In this case, a state shown in FIG. 54 may become.

FIG. 53 illustrates the prefabricated receiving part 500. Here, a prefabricated frame 501 is hung on a hook 109 of the main body, and a sealing surface connection part 505 is disposed on a side opposite to a receiving part cutoff line 503 so that the sealing surface 502 is easily opened.

In case of FIG. 55, while the opening part 106 breaks the receiving part cutoff line 503, the receiving part storage space 504 is opened.

Also, in case of FIG. 56, the prefabricated receiving part 500 is configured so that a cutoff protrusion piece 507 breaks the receiving part cutoff line 503 formed on the prefabricated receiving part 500 while the foldable connection part 102 is folded downward to open the receiving part storage space 504 of the prefabricated receiving part 500. An elastic piece 508 is not closed after being opened.

FIG. 57 illustrates a configuration which an opening end 116 is provided to allow the receiving part storage space 504 to be easily opened.

FIG. 58 illustrates a configuration in which, when the foldable part F is pressed, a prefabricated opening end 900 breaks the receiving part sealing part 400 sealing a lower end of an opening end guide 123.

Preferably, the apparatus 1 for receiving the heterogeneous material, which is coupled to the hole part of the container containing contents, includes a main body 100 coupled to the hole part of the container and a foldable part F formed of a material having a barrier property and disposed on an upper portion of the main body 100. The prefabricated opening end 900 designed to move downward is disposed on a lower portion of the foldable part F. A lower end of the opening end guide 123 of the main body 100 on which the prefabricated opening end 900 is disposed is sealed by the receiving part sealing part 400.

FIG. 59 illustrates a configuration in which, when the foldable part F is pressed, an insertable receiving part 1100 within the opening end guide 123 descends, and in this case, a lower sealing part 1102 is broken by an opening guide pin 1201 to open an insertable receiving part storage space 1101 of the insertable receiving part 1100.

In other words, the apparatus 1 for receiving the heterogeneous material, which is coupled to the hole part of the container containing contents, includes the main body 100 coupled to the hole part of the container and the foldable part F disposed on an upper portion of the main body 100. The prefabricated opening end 1100 designed to move downward is disposed on the lower portion of the foldable part F. The heterogeneous material is contained within the insertable receiving part 1100, and an end of the insertable receiving part 1100 is sealed by the lower sealing part 1102. The lower sealing part 1102 is punched by the opening guide pin 1201 disposed on the opening end guide 123 of the main body.

The apparatus 1 for receiving the heterogeneous material, which is coupled to the hole part of the container containing contents, a main body 100 coupled to the hole part of the container and an integrated or assembled receiving part 107 having the storage space 108 within the main body 100. The storage space 108 of the receiving part 107 is opened by the foldable part F disposed on the upper portion of the main body 100. The foldable part F is configured so that, when a rotational operable sealing stopper 1300 assembled with the upper portion of the main body 1000 rotates, the receiving part sealing part 400 sealing the storage space 108 of the receiving part 107 is opened.

Referring to FIG. 60, when the operable sealing stopper 130 rotates, a main body hole corresponding part 1301 corresponds to a screw thread or screw groove so that the main body hole 103 descends as shown in FIG. 61.

In this process, the opening part 106 opens the receiving part sealing part 400.

Also, the operable sealing stopper 1300 is configured so that the opening part 106 descends while a support part 1302 rotates on a support corresponding part 124. When operating, since an operable sealing stopper anti-forgery frame 1303 is broken, it may be confirmed whether the apparatus 1 is tampered.

Also, the mixed content is discharged through a sealing stopper discharge hole 1304.

FIG. 63 illustrates a state in which a sealing stopper upper discharge surface 1305 seals a discharge surface sealing part 125.

FIG. 64 illustrates a state in which the prefabricated opening end 900 is assembled with the inside of the receiving part 107.

FIG. 66 illustrates a configuration of the prefabricated receiving part 500 in which a prefabricated frame 501 is hung on the hook 109 of the main body 100.

FIG. 67 illustrates a configuration of the foldable part F in which the cutoff protrusion piece 507 breaks the receiving part cutoff line 503.

In other words, the apparatus 1 for receiving the heterogeneous material, which is coupled to the hole part of the container containing contents, a main body 100 coupled to the hole part of the container and an integrated or assembled receiving part 107 having the storage space 108 within the main body 100. The storage space 108 of the receiving part 107 is opened by the foldable part F or the foldable connection part 102 which is disposed on the upper portion of the main body 100. The foldable part F or the foldable connection part 102 is configured so that, when a rotational operable sealing stopper 1300 assembled with the upper portion of the main body 1000 rotates, the opening part, i.e., the sealing surface 502 of the receiving part sealing part 400 or the prefabricated receiving part 500 which seals the storage space 108 of the receiving part 107 is opened.

As shown in FIGS. 68 to 69, while the opening part 106 ascends, the receiving part sealing part 400 may be opened.

Referring to FIG. 70, when a rotational operable cover 1500 rotates, a foldable spacing part 1502 pushes a spacing part corresponding part 126 downward, and simultaneously, the foldable part F descends. In this process, the opening part 106 opens the receiving part sealing part 400.

As shown in FIG. 71, an upper auxiliary sealing part 127 formed of a material having a barrier property may be added.

As shown in FIG. 73, when the rotational operable cover 1500 rotates, the spacing part corresponding part 126 corresponds the screw thread or the screw groove to allow the foldable spacing part 1502 to lift the opening end 116 upward. In this process, the receiving part storage space 504 is opened (see FIG. 74).

FIG. 75 illustrates a principle in which, when the rotational operable cover 1500 rotates, the opening part 106 descends.

FIGS. 77 to 83 illustrate a receiving apparatus 1 having a cup shape.

FIG. 85 illustrates a state in which the receiving apparatus 1 is coupled to an outer package 1900 formed of a metal material.

FIGS. 86 to 98 illustrate an example in which a storage space of the receiving part is provided in plurality.

FIGS. 101 and 102 illustrate a state in which a prefabricated foldable part 2200 is coupled. Particularly, in case of FIG. 102, when an upper foldable part 2201 is pressed, a fitting part cutoff line 2203 is broken to descend.

In case of FIG. 108, a main body top surface sealing part 139 formed of a material having a barrier property adheres above the foldable connection part 120. In use, as shown in FIG. 109, when the main body top surface sealing part 139 is not removed, but is pressed, the opening part 106 breaks the receiving part sealing part 400.

Thus, the main body top surface sealing part 139 may have superior flexibility.

Also, FIG. 111 illustrates a state in which a moving space 144 is defined in the foldable connection part 102 to storage contents in an upper side thereof.

Also, in case of FIG. 113, a protective cover 2300 formed of a material having a barrier property such as a train is disposed on an upper portion of the foldable connection part 102. In use, when the protective cover 2300 is pressed, the foldable connection part 102 together with the protective cover 2300 is folded.

In non-explained reference numerals, a reference numeral 120 represents a prefabricated opening part, a reference numeral 121 represents an integrated cover, a reference numeral 122 represents an integrated cover connection part, a reference numeral 124 represents a support corresponding part, a reference numeral 126 represents a spacing corresponding part, a reference numeral 127 represents an upper auxiliary sealing part, a reference numeral 128 represents a foldable receiving surface, a reference numeral 129 represents an integrated cover guide part, a reference numeral 130 represents a main body receiving part sealing surface, a reference numeral 131 represents a main body sealing surface connection part, a reference numeral 132 represents a main body receiving part cutoff line, a reference numeral 133 represents a lower protrusion, a reference numeral 134 represents a lower protrusion hook part, a reference numeral 135 represents a film adhesion surface, a reference numeral 136 represents a punching pin, a reference numeral 138 represents a main body opening guide space, a reference numeral 139 represents a main body top surface sealing part, a reference numeral 140 represents a foldable upper space, a reference numeral 141 represents a main body upper end guide, a reference numeral 142 represents a main body cutoff connection part, a reference numeral 143 represents a main body cutoff protrusion piece, a reference numeral 145 represents a protrusion pressing part, a reference numeral 302 represents a prefabricated protrusion, a reference numeral 303 represents a top surface cutoff line, a reference numeral 305 represents a separable cutoff line, a reference numeral 306 represents a hole part sealing part, a reference numeral 307 represents a cover connection part, a reference numeral 401 represents a first storage space, a reference numeral 402 represents a second storage space cutoff piece, a reference numeral 506 represents an upper protrusion, a reference numeral 508 represents a protrusion piece, a reference numeral 509 represents a prefabricated receiving part lower punching part, a reference numeral 510 represents a prefabricated receiving part second storage space, a reference numeral 511 represents a storage space hole part boundary surface, a reference numeral 512 represents a lower storage space, a reference numeral 602 represents a stopper connection part, a reference numeral 701 represents a rotational sealing stopper body, a reference numeral 702 represents a cover part, a reference numeral 703 represents a cover part cutoff line, a reference numeral 812 represents a separable cutoff line, a reference numeral 813 represents a separable space, a reference numeral 814 represents a cover body sealing part, a reference numeral 815 represents a sealing part top surface, a reference numeral 901 represents a prefabricated opening end punching pin, a reference numeral 1001 represents a container neck, a reference numeral 1100 represents an insertable receiving part, a reference numeral 1103 represents an insertable receiving part hole part, a reference numeral 1200 represents an opening guide, a reference numeral 1201 represents an opening guide pin, a reference numeral 1301 represents a main body hole part corresponding part, a reference numeral 1302 represents a support part, a reference numeral 1303 represents an operable sealing stopper anti-forgery frame, a reference numeral 1304 represents a sealing stopper discharge hole, a reference numeral 1305 represents a sealing stopper discharge surface, a reference numeral 1400 represents a sanitary cover, a reference numeral 1401 represents a sanitary cover sealing surface, a reference numeral 1501 represents a cover support part, a reference numeral 1502 represents a foldable spacing part, a reference numeral 1503 represents a rotational operable cover anti-forgery frame, a reference numeral 1504 represents an inner sealing part, a reference numeral 1505 represents an anti-forgery frame removing piece, a reference numeral 1600 represents a contraction film, a reference numeral 1601 represents a contraction film removing piece, a reference numeral 1700 represents a main body upper portion coupling cover, a reference numeral 1701 represents a cover opening part, a reference numeral 1702 represents a connection part, a reference numeral 1800 represents a sanitary sealing part, a reference numeral 1900 represents an outer package, a reference numeral 2000 represents an auxiliary main body, a reference numeral 2001 represents an auxiliary main body hole part, a reference numeral 2002 represents an auxiliary main body storage space sealing surface, a reference numeral 2203 represents a fitting part cutoff line, a reference numeral 2004 represents a fitting part, and a reference numeral 2205 represents a prefabricated foldable part opening end sealing surface.

INDUSTRIAL APPLICABILITY

In the apparatus for discharging the heterogeneous material, a content such as extract or powder may drop into and be mixed with various products such as special beverages, particularly, water, alcoholic beverages, and the like to allow a user to drink the mixture. Also, the apparatus may be variously used for chemical products which are used again after being separated or other daily supplies.

The invention claimed is:

1. An apparatus for receiving a heterogeneous material, which is coupled to a hole part of a container containing a content such as liquid, the apparatus comprising:
   a main body coupled and fixed to a main body hole part of the container; a receiving part providing a storage space within the main body; and
   a foldable part that has a lower portion that is connected to an upper portion of the receiving part, and wherein the foldable part has an upper portion that is connected to an upper portion of an opening part and a lower portion of the main body hole part,
   wherein the foldable part comprises a foldable connection part which is disposed on an upper portion of the storage space such that downward displacement of the foldable connection part breaks a receiving part sealing part for sealing a lower end of the receiving part to allow the content within the storage space of the receiving part to drop into the container, thereby mixing the content with the heterogeneous material, and
   wherein the foldable part is comprised of a soft resin added to the foldable connection part.

2. The apparatus of claim 1, wherein the foldable part is molded on the upper portion of the foldable connection part by using the soft resin in a co-injection manner.

3. The apparatus of claim 1, wherein an openable sealing stopper or a hinge-type sealing stopper is coupled to the main body hole part.

4. The apparatus of claim 1, wherein a prefabricated receiving part is coupled to the inside of the main body.

5. The apparatus of claim 1, wherein a cover is coupled to an upper portion of the main body.

6. The apparatus of claim 1, wherein a rotational sealing stopper is coupled to the main body hole part.

7. The apparatus of claim 6, wherein the rotational sealing stopper is protected by a cover part on the upper portion of the main body.

8. The apparatus of claim 1, wherein a protective cover is coupled to the main body hole part.

9. The apparatus of claim 8, wherein the protective cover has a top surface and a side surface, and a cover body is disposed on a center of the protective cover, and wherein the cover body forms a boundary with an outer cover by a cover top surface cutoff line and is configured so that a cover sealing part sealing the main body hole part is connected to a portion of a cover anti-forgery frame constituting a lower end of the outer cover by a cover connection part.

10. The apparatus of claim 1, wherein a portion of the foldable part added to the upper portion of the foldable connection part comprises a soft part in which a syringe needle is insertable.

11. The apparatus of claim 1, wherein a second storage space is defined in a lower portion of the storage space of the receiving part.

12. The apparatus of claim 11, wherein the second storage space is defined within the receiving part sealing part sealing the lower end of the receiving part.

13. An apparatus for receiving a heterogeneous material, which is coupled to a hole part of a container containing a content such as liquid, the apparatus comprising:
   a main body coupled and fixed to a main body hole part of the container; a receiving part providing a storage space within the main body; and
   a foldable part that has a lower portion that is connected to an upper portion of the receiving part, and wherein the foldable part has an upper portion that is connected to an upper portion of an opening part and a lower portion of the main body hole part,
   wherein the foldable part comprises a foldable connection part which is disposed on the storage space such that downward displacement of the foldable connection part breaks a receiving part sealing part for sealing a lower end of the receiving part to allow the content within the storage space of the receiving part to drop into the container, thereby mixing the content with the heterogeneous material, and
   wherein the foldable part is comprised of a soft resin added to the foldable connection part.

14. An apparatus for receiving a heterogeneous material, which is coupled to a hole part of a container containing a content such as liquid, the apparatus comprising:
   a main body coupled and fixed to a main body hole part of the container;
   a receiving part providing a storage space within the main body;
   a foldable part that has a lower portion that is connected with an upper portion of the receiving part, and wherein the foldable part has an upper portion that is connected to an upper portion of an opening part and a lower portion of the main body hole part,
   wherein the foldable part comprises a foldable connection part such that downward displacement of the foldable connection part breaks a receiving part sealing part for sealing a lower end of the receiving part to allow the content within the storage space to drop into the container, thereby mixing the content with the heterogeneous material, and
   wherein the foldable part is comprised of a soft resin added to the foldable connection part.

15. The apparatus of claim 14, wherein the foldable connection part comprises an auxiliary foldable part on a side opposite to a foldable reference surface so that the foldable part is folded in one side direction with respect to the foldable reference surface.

16. An apparatus for receiving a heterogeneous material, which is coupled to a hole part of a container containing a content, the apparatus comprising:
- a main body coupled and fixed to a hole part of the container;
- a foldable part formed of a material having a barrier property on an upper portion of the main body and wherein the foldable part directly contacts an upper perimeter of a receiving part, wherein a prefabricated opening end designed to move downward is disposed on a lower portion of the foldable part;
- a lower end of an opening end guide of the main body on which the prefabricated opening end is disposed is sealed by a receiving part sealing part and configured such that when the foldable part is moved downwardly, the prefabricated opening end is pushed through the receiving part sealing part and the upper perimeter of the receiving part is moved downwardly into a storage space within the receiving part to move the content through the receiving part sealing part; and
- a foldable connection part configured to break the receiving part sealing part to allow the content to drop into the container, and
- wherein the foldable part is comprised of a soft resin added to the foldable connection part.

17. An apparatus for receiving a heterogeneous material, which is coupled to a hole part of a container containing a content, the apparatus comprising:
- a main body coupled and fixed to a hole part of the container;
- a foldable part formed of a material having a barrier property on an upper portion of the main body,
- wherein the foldable part directly contacts an upper perimeter of a receiving part,
- wherein an insertable receiving part designed to move downwardly is disposed on a lower portion of the foldable part,
- wherein the heterogeneous material is stored within the insertable receiving part, wherein an end of the insertable receiving part is sealed by a lower sealing part, and
- wherein the lower sealing part is punched by an opening guide pin disposed on an opening end guide part of the main body when the foldable part is moved downwardly and the upper perimeter of the receiving part is moved downwardly into the receiving part to move the content through the receiving part sealing part; and
- a foldable connection part, wherein the foldable part is comprised of a soft resin added to the foldable connection part.

18. An apparatus for receiving a heterogeneous material, which is coupled to a hole part of a container containing a content, the apparatus comprising:
- a main body coupled and fixed to a hole part of the container;
- a receiving part having a storage space, the receiving part being integrated or assembled with the inside of the main body,
- wherein the storage space of the receiving part is sealed by a foldable part which directly contacts an upper perimeter of the receiving part, and the foldable part is configured so that, when a rotational operable sealing stopper rotatably assembled with an upper portion of the main body rotates, a receiving part sealing part sealing the storage space of the receiving part is opened: and
- a foldable connection part wherein the foldable part is comprised of a soft resin added to the foldable connection part.

19. An apparatus for receiving a heterogeneous material, which is coupled to a hole part of a container containing a content, the apparatus comprising:
- a main body coupled and fixed to a hole part of the container; and
- a receiving part having a storage space, the receiving part being integrated or assembled with the inside of the main body,
- wherein the storage space of the receiving part is sealed by a foldable part or a foldable connection part, and the foldable part or the foldable connection part is configured so that, when a rotational operable sealing cover rotatably assembled with an upper portion of the main body rotates, a receiving part sealing part or an opening part of a prefabricated receiving part which seals the storage space of the receiving part is opened, and
- wherein the foldable part is comprised of a soft resin added to the foldable connection part.

\* \* \* \* \*